(12) United States Patent
Odom et al.

(10) Patent No.: US 6,393,426 B1
(45) Date of Patent: *May 21, 2002

(54) METHOD FOR MODELING, STORING AND TRANSFERRING DATA IN NEUTRAL FORM

(75) Inventors: Paul S. Odom; Michael J. Massey, both of Houston, TX (US)

(73) Assignee: Pliant Technologies, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,533
(22) PCT Filed: Jan. 28, 1998
(86) PCT No.: PCT/US98/01630
  § 371 Date: Jul. 9, 1999
  § 102(e) Date: Jul. 9, 1999
(87) PCT Pub. No.: WO98/35317
  PCT Pub. Date: Aug. 13, 1998

Related U.S. Application Data

(63) Continuation of application No. 08/789,860, filed on Jan. 28, 1997, now Pat. No. 5,842,213.

(51) Int. Cl.[7] .............................................. G06F 17/30
(52) U.S. Cl. ..................... 707/100; 707/101; 707/102; 707/103; 707/202; 707/203
(58) Field of Search ................. 707/100, 203, 707/101, 202, 103, 102, 200

(56) References Cited

U.S. PATENT DOCUMENTS

| 4,864,497 | A | * | 9/1989 | Lowery et al. | 364/300 |
|---|---|---|---|---|---|
| 5,278,979 | A | * | 1/1994 | Foster et al. | 707/203 |
| 5,303,367 | A | * | 4/1994 | Leenstra | 707/100 |
| 5,355,493 | A | * | 10/1994 | Silberbauer et al. | 395/700 |
| 5,357,629 | A | * | 10/1994 | Dinnis et al. | 707/101 |
| 5,511,188 | A | * | 4/1996 | Pascucci et al. | 707/202 |
| 5,640,559 | A | * | 6/1997 | Silberbauer et al. | 707/101 |
| 5,655,121 | A | * | 8/1997 | Delagi et al. | 395/704 |
| 5,680,615 | A | * | 10/1997 | Marlin et al. | 707/103 |
| 5,842,213 | A | * | 11/1998 | Odom et al. | 707/100 |

* cited by examiner

Primary Examiner—Frantz Coby
(74) Attorney, Agent, or Firm—Coe F. Miles

(57) ABSTRACT

The present invention simplifies the data modeling process and enables its full dynamic versioning by employing a non-hierarchical non-integrated structure to the organization of information. This is achieved by expressing data modeling, storage and transfer in a particular non-hierarchical, non-integrated neutral form. The neutral form of the present invention enables complete parallel processing of both data storage and data transfer operations. It also enables the direct integration of separate but related data models and their data without remodeling or reloading. Finally, the present invention enables direct transfer of neutral form information in a manner that includes all of the properties required to independently understand and interpret each transferred data value.

17 Claims, 51 Drawing Sheets

An Instance Segment

Physical form of the data item

Properties of the data item

Set of Instance data items of which this data item is a part

Fig. 3
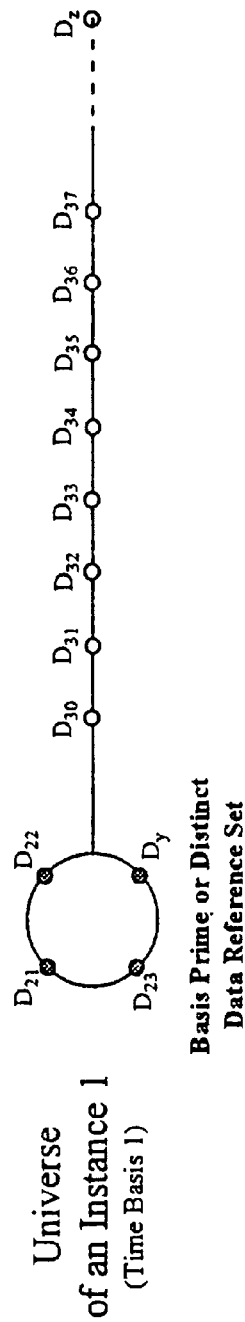
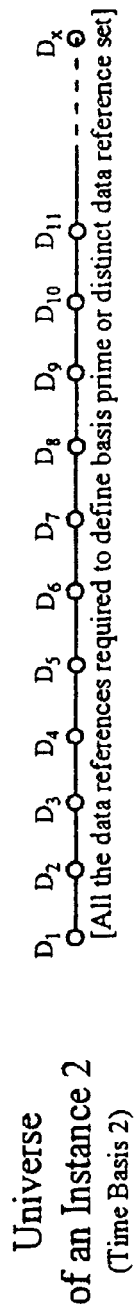

Fig. 8

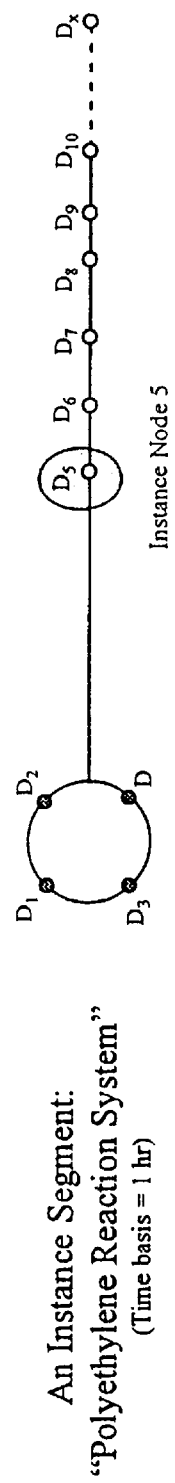

An Instance Segment:
"Polyethylene Reaction System"
(Time basis = 1 hr)

Instance Node 5

FOR: Data Item $D_5 = 127$

Dictionaries

Illustrative Entries for Node $D_5$

Data Type — Numeric data, floating point single precision

Data Reference — Heat exchanger temperature; units in degrees Farenheit; upper limit 250; lower limit 50

Data Organization
- Generic Instance Structure — Data references for Polyethylene Reactor System $D_1$ through $D_x$ ; basis prime or distinct data reference set consisting of $D_1$ Through D4

- Instance Data Set — Instance data set values for Polyethylene Reactor System instance occurring on March 27, 1994 at 8:05 a.m.

Fig. 15
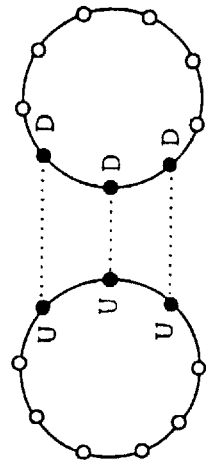
One-to-One Relationship
Associated Cluster 1
Associated Cluster 2
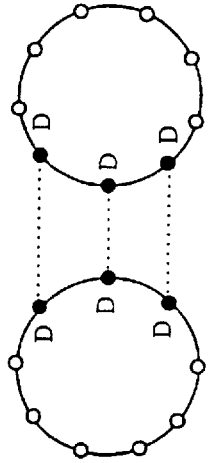
One-to-Many Relationship
Associated Cluster 1
Associated Cluster 2
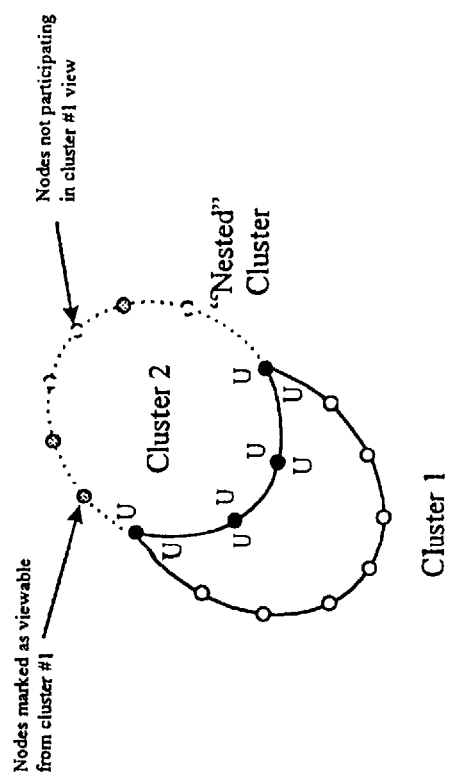
Many-to-Many Relationship
Associated Cluster 1
Associated Cluster 2
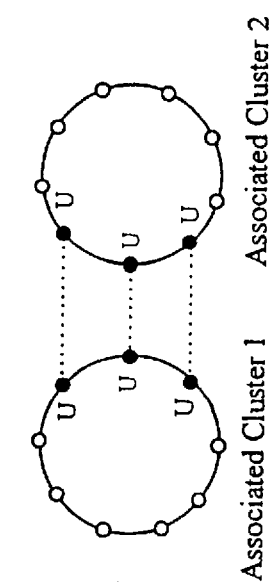
Nodes not participating in cluster #1 view
"Nested" Cluster
Cluster 2
Cluster 1
Nodes marked as viewable from cluster #1

Fig. 18

Data Type Dictionary Entries

| | |
|---|---|
| +X | Alphanumeric Data of Length X |
| -1 | Numeric Data, Integer |
| -2 | Numeric Data, Long Integer |
| -3 | Numeric Data, Single Precision |
| -4 | Numeric Data, Double Precision |
| -5 | Date/Time, Double Precision |
| -6 | Alphanumeric Data |
| -7 | Special Form -- Objects |
| -8 | Special Form -- GIF File |
| -9 | Special Form -- TIF File |
| -10 | Special Form -- PCX File |
| -11 | Special Form -- DOC File |
| -12 | Special Form -- XLS File |
| -xx | Additional Known Special Forms (including objects that may contain executibles) |
| -xy to -999 | Unallocated Data Type Values (including objects that may contain executibles) |

| Element | Illustration of One Approach | Bytes |
|---|---|---|
| Data Type | e.g., number designation for numeric | 2 |
| Data Reference | Three characteristics: $K_{id}$, $S_{id}$, $L_{id}$ | 12 |
| Organization: | | |
| • Structure | Inferred from structure dictionary* | 0 |
| • Instance Set | Link listing of cluster instance nodes | 4 |
| | Total structural tag bytes/data value............ | 18 |

*All cluster structures are unique. Cluster name can therefore be determined by searching structure dictionary for match to link listed set of nodes for the present instance set.

Neutral Form Overhead

Fig. 37

Dictionary Neutral Form Element

| Slot | Type | Reference | Organization | Values |
|---|---|---|---|---|
| *A Data Reference Dictionary Entry:* | | | | |
| 1 | Type ID for data reference name | Kid for data reference name | Pointer to glossary record containing information | Data reference name: e.g., "Last Name" |
| 2 | Type ID Data reference name length | Sid for data reference name | | |
| 3 | | Lid for data reference name | | |
| 4 | | Date/Time of creation | | |
| *A Glossary Entry* | | | | |
| 1 | Type ID for glossary definition | | Forward pointer to continuation record in glossary | Alphanumeric text comprising definition |
| 2 | Glossary definition length | | | |
| *A Structural Dictionary Entry* | | | | |
| 1 | Type ID for structural dictionary | Pointer to transfer record containing node data reference name | Link to next cluster node in transfer set | |
| 2 | | Relative Order | | |
| 3 | | Cluster ID | | |
| 4 | | Model ID | | |
| 5 | | Subcluster ID | | |
| 6 | | Cluster group ID | | |
| 7 | | Prime or distinct data reference set #1 | | |

Fig. 46

| Groupings of Data References | Instance Segment #1<br>Inlet Stream Model | Instance Segment #2<br>Vapor Stream Model | Instance Segment #3<br>Liquid Stream Model | Instance Segment #4<br>Flash Drum Model |
|---|---|---|---|---|
| Scope | Process Stream | Process Stream | Process Stream | Flash Drum |
| Identification | • Inlet Stream (Data) | • Vapor Stream (Data) | • Liquid Stream (Data) | • Unit Name (Data) |
| Unit Operation | | | | • Inlet Stream (Data)<br>• Vapor Stream (Data)<br>• Liquid Stream (Data) |
| Operating Conditions | • Temperature (Data)<br>• Pressure (Data)<br>• Flowrate (Data) | • Temperature (Data)<br>• Pressure (Data)<br>• Flowrate (Data) | • Temperature (Data)<br>• Pressure (Data)<br>• Flowrate (Data) | • Temperature (Data)<br>• Pressure (Data)<br>• Level (Data) |
| Composition | • Chemical #1 Conc. (Data)<br>• Chemical #2 Conc. (Data)<br>• Chemical #3 Conc. (Data) | • Chemical #1 Conc. (Data)<br>• Chemical #2 Conc. (Data)<br>• Chemical #3 Conc. (Data) | • Chemical #1 Conc. (Data)<br>• Chemical #2 Conc. (Data)<br>• Chemical #3 Conc. (Data) | |
| Measurement | • Date -- D,M,Y (Data)<br>• Time -- Hour (Data) | • Date -- D,M,Y (Data)<br>• Time -- Hour (Data) | • Date -- D,M,Y (Data)<br>• Time -- Hour (Data) | • Date -- D,M,Y (Data)<br>• Time -- Hour (Data) |
| Time Basis | Hourly | Hourly | Hourly | Hourly |

Fig. 48

Groupings of Data References — Single Comprehensive Cluster

| Scope = Process Streams & Unit Operation | |
|---|---|
| Identification (Group) | • Unit Name (Data)<br>• Date/Time |
| Configuration (Group) | Inlet Streams (Sub-Group)<br>• Inlet Stream (Data)<br>Outlet Streams (Sub-Group)<br>• Vapor Stream (Data)<br>• Liquid Stream (Data) |
| Operating Conditions (Group) | Unit (Sub-Group)<br>• Pressure (Data)<br>• Temperature (Data)<br>• Level (Data)<br>Inlet Stream (Sub-Group)<br>• Temperature (Data)<br>• Pressure (Data)<br>• Flowrate (Data)<br>Vapor Stream (Sub-Group)<br>• Temperature (Data)<br>• Pressure (Data)<br>• Flowrate (Data)<br>Liquid Stream (Sub-Group)<br>• Temperature (Data)<br>• Pressure (Data)<br>• Flowrate (Data) |

…Continuation of Cluster

| Composition (Group) | Inlet Stream (Sub-Group)<br>• Chemical #1 Conc. (Data)<br>• Chemical #2 Conc. (Data)<br>• Chemical #3 Conc. (Data)<br>Vapor Stream (Sub-Group)<br>• Chemical #1 Conc. (Data)<br>• Chemical #2 Conc. (Data)<br>• Chemical #3 Conc. (Data)<br>Liquid Stream (Sub-Group)<br>• Chemical #1 Conc. (Data)<br>• Chemical #2 Conc. (Data)<br>• Chemical #3 Conc. (Data) |
|---|---|
| Time Basis | Hourly |

| Prime Data Reference Sets | • Unit Name<br>• Inlet Streaam<br>• Vapor Stream<br>• Liquid Stream<br>• Unit Name, Date, Time<br>• Inlet Stream, Date, Time<br>• Vapor Stream, Date, Time<br>• Liquid Stream, Date, Time |
|---|---|
| Basis Data Reference Set | • Unit Name |

Fig. 50

| Property | Data Reference 1: $Kid_a Sid_a Lid_a$ | | Data Reference 2: $Kid_a Sid_b Lid_a$ | |
|---|---|---|---|---|
| Name | Pressure | I.D. = $Kid_a$ | Pressure | I.D. = $Kid_a$ |
| Name Definition | State of being pressed or compressed. | | State of being pressed or compressed | |
| Schema Name | Flash Drum Unit Operation | I.D. = $Sid_a$ | Flash Drum Inlet Stream | I.D. = $Sid_b$ |
| Schema Definition | Vessel wherein pressurized multi-component liquids are partially separated by depressurization and selective vaporization | | Higher pressure inlet stream containing the multicomponent liquid to be partially separated in the flash drum. | |
| Author | T. J. Henry | I.D. = $Lid_a$ | T. J. Henry | I.D. = $Lid_a$ |
| Author Definition | Manager of Data Processing Chemical Company of America 201-255-3698 Ext. 3328 | | Manager of Data Processing Chemical Company of America 201-255-3698 Ext. 3328 | |
| Name Associations: | Pitot-tube; Gauge; Atmospheric; | | Pitot-tube; Gauge; Atmospheric; | |
| Schema Associations | Distillation; Vapor-liquid; Separation; | | Inlet; Input; Process stream; | |
| Units | Atmospheres | | Atmospheres | |
| Upper Limits | 10.00 | | 20.00 | |
| Lower Limits | 5.00 | | 5.50 | |
| Constraints | <= Pressure of Inlet Stream | | >= Pressure of Flash Drum | |
| Format | #.##E+## | | #.##E+## | |

METHOD FOR MODELING, STORING AND TRANSFERRING DATA IN NEUTRAL FORM

This application is a 371 of PCTUS98/01630 filed on Jan. 28, 1998 and is a continuation of U.S. application Ser. No. 08/789,860 now U.S. Pat. No. 5,842,213, filed Jan. 28, 1997.

BACKGROUND OF INVENTION

1. Field of Invention

The present invention relates to a method of modeling, storing and transferring information in a neutral form in a computer. The present invention reduces the complexity and effort presently involved in the modeling and storage of information while creating a storage format which enables complete parallel processing of data. Furthermore it enables not only direct integration of different models and their stored data without remodeling or reloading but dynamic evolution of those models and their data after some earlier implementation.

2. Description of Prior Art

Since their introduction about 40 years ago, computers have increasingly been used as mechanisms for the storage of information. FIG. 1 summarizes the prior art for the computer storage, retrieval and transfer of information. Despite exponentially rising demand and all of the effort that has been expended during the past several decades to develop and apply methods for data modeling storage and transfer, the bulk of organized information is still handled outside of databases. This has been due to the complexity, inflexibility and cost of modeling, storage and transfer of organized data that is inherent in prior art techniques.

Whether they employed data models or not; prior art techniques have, so far as is known been unable to achieve any practical success in data transfer without a user being intimately familiar with both the structure and the definitions of the data involved, and also with the particular application programs and interface languages employed for its storage. The result has been an inherent complexity in data modeling storage and transfer, putting data organization and access beyond the reach of many potential information workers who generate and seek to exchange, interpret and use their data.

Users have been forced to apply the skills of information technology specialists for data organization and information management where they can afford or justify the costs. Otherwise, users have been forced to limit arbitrarily the scale of their work where they cannot afford such specialists. At the current complexity and escalating costs of prior art methods, only a small portion of the generated data that exists is processed into database form.

Un-modeled Data Files

Methods available in the prior art for the storage and transfer of un-modeled collections of information have required a great deal of a-priori knowledge on the part of the user, both of the structure and definitions of the data and the application programs involved. Spreadsheets have been one common method employed for such storage. Its usefulness is restricted to collections of data of limited complexity and size. Storage and transfer has typically been required to be a complete rather than a partial spreadsheet file. Un-modeled information has been typically stored directly in an application program format, e.g., an Excel® or Lotus® spreadsheet file.

Although the information can be downloaded to ASCII or other primitive standard formats for transfer purposes, it is done with significant additional loss of any already limited data definition. Larger and more complex collections of information typically have been stored in the format of the specialized applications programs within which they are generated, e.g., accounting programs, simulation modeling programs, or engineering calculation programs. Here too, retrieval and transfer typically have been limited to complete rather than partial files.

Often, such information has been merely organized into streams of ASCII or comparable format. This has imposed severe limitations on the storage of structure and content of the data as opposed to merely the data values. Transfer of any and all such organized information, including spreadsheets thus has relied heavily upon a user's knowledge in advance of the structure and content of the information. Typically, a user has operated the same application interface program that generated the data to reduce the degree of difficulty involved in the many interpretive aspects of its transfer. The result is a severely restricted exchange of information both within and between data user organizations.

Modeled Data—Database Files

As shown in FIG. 1, data modeling has represented an increase in the degree of organization from a collection of un-modeled organized information. The clear advantage has been that portions of a collection of information can be transferred rather than only the entire file. However, this advantage has been achieved with a major increase in the complexity and cost of the data management.

Data modeling for a collection of information involves a combination of (a) organization of the data values; (b) some system or technique for definition of each data value; and (c) a system for structuring the relationships among various data values for storage in a manner which was capable of supporting accurate retrieval and transfer of targeted subsets of the information. Many modeling methods have been proposed, and of those only a limited number have proven useful enough to receive widespread use. Examples of proposed methods include: entity relationship (ER); Nijssen's information analysis method (NIAM); IDEFIX, a graphical language; EXPRESS, a product information model; and object oriented model (OOM). Discussions of these methods are available in many publications. Chapter 2, pp. 12–30 of Schenck "Information Modeling: The EXPRESS Way" is representative. Only ER and OOM are, so far as is known, presently in widespread use.

All of these prior art modeling methods have imposed a-priori relationships and some form of hierarchy both for the organization and the storage of data. The particulars of such a hierarchy have varied with the data modeling method and with the individual modeler. In each case, however, the hierarchy selected has been incorporated into a structure of the information for storage and has been different and specific to each major modeling-based database and its associated software products.

Thus the storage of information in relational and object oriented databases has been both program dependent and a function of the particular form of relationships and hierarchy chosen during modeling. As a result, the retrieval and transfer of database information have required a significant knowledge of both the hierarchy imposed on the data and the particular data storage structure that has been employed by the database product employed. These have been major limitations of the current technology which have become particularly evident to users involved in the retrieval and transfer of information.

Efforts have been made to reduce the severity of these problems through the development of a standard database software program interface language—standard query language (SQL). This effort has met with some success, in part because of the rapidly changing features of individual database software programs and the data itself.

Both the known data modeling techniques and the standard query language interface scheme (SQL) also have involved a complex set of rules and conventions whose understanding and practice are well beyond the reach of typical data users. See for example Date, "A Guide to the SQL Standard" Appendix A, pp 137–152. As a result, specialists in database management have been required for data modeling, which has given rise to high total database management costs and complicated communication problems between data users and data modeling specialists. The combination of these limitations has resulted in limited application of data modeling for the storage and transfer of organized data.

Each of the prior art data modeling and storage techniques has involved extensive integrated organization of the data and its structure, which has severely limited the capacity for parallel processing in both data storage and in data retrieval and transfer. Major relational and object oriented database vendors have developed complex optimization routines to guide the selection of pathways through these integrated structures. These have provided limited mapped segments that can be stored and retrieved in parallel. These segments have tended to be short relative to the overall retrieval process, prompting numerous mergings and analysis of intermediate results in order to determine the next correct stage of the storage or retrieval.

All of this effort has consumed processor capacity, reducing the amount of computer capacity available for direct data storage or retrieval work. The more parallel paths that were created, the more complex were the paralleling, merging and analysis efforts. The net effect was rapidly rising complexity and a declining percentage of useful storage or retrieval work produced from each parallel storage or retrieval path that was added.

As a result of such inherent diminishing returns, the prior art was able to achieve only limited gains in storage or retrieval performance through parallel processing. The limited gains that were possible came only with major increases in the complexity of overall database storage, retrieval and transfer operations.

Modeled Data—Neutral Form Files

The storage, retrieval and transfer limitations imposed by database program dependent data hierarchies and structures has been particularly evident in large, complex databases involving diverse interactions. Such complexities were common to the engineering and manufacturing life cycle where there has been a great need to share data across applications, across vendor platforms and between contractors, suppliers and customers. As a result, efforts have been made to define a neutral form for data modeling, storage and transfer which would be independent of both the application program from which it was taken and of any application to which it would be applied. After considerable years of effort, the International Standards Organization (ISO) published ISO 10303, Product Data Representation and Exchange. This set a standard for both a neutral form (ISO STEP Neutral Form) and a modeling language (EXPRESS) through which data was to be organized for incorporation into the neutral form for storage and transfer.

Severe practical limitations have so far led to minimal implementation of ISO 10303. ISO STEP and EXPRESS do nothing to reduce the complexity inherent in prior art data modeling and storage. In fact, they have seemingly increased the complexity by adding a layer of requirements on top of those which have already existed. The overhead associated with constructing an ISO STEP neutral form was high, typically between 10 and 20 times the size of the raw data file. Furthermore, there was no technique for exchanging EXPRESS modeling information together with a neutral form file so that the neutral form information could be immediately interpreted upon receipt of the transfer. While eliminating direct application program dependence, the construction and interpretation of the neutral form file has also still been hierarchically dependent on the EXPRESS modeling form of hierarchical representation.

ISO 10303 could possibly offer potential for the effective use of parallel processing of ISO compliant data. The ISO STEP neutral form took the form of groups of the data and their related information, each of which was organized into a separate and independent record in the neutral form file. Because there was no dependency between groups of neutral form records, each could be processed completely in parallel.

U.S. Pat. No. 4,864,497 attempted to address the issue of practical neutral or common data structures for the storage and access of information by multiple application programs. However, the approach taken preserved data hierarchy and integration as the premise for data modeling. It also adopted a convention for neutral file definition that did not apparently reduce the complexity or rigidity present in prior art data structure technology.

Accounting for Relationships Among Data

Prior art methods for addressing and accounting for relationships among data have been inherently complex, rigid, and highly application program dependent. As shown in FIG. 2, a hierarchy and integration of structures consistently have been employed in prior art data structure technology for the storage, retrieval and transfer of information having any significant complexity. At sufficiently low levels of complexity, non-integrated, non-hierarchical methods have been employed, but they have been limited to application dependent program formats or low level formats such as ASCII, the limitations of which have already been discussed above.

Hierarchy and integration in data structure, including all known forms of relational and object oriented technology, has involved the creation of a top-down logical network to describe all of the inter-relationships and precedence orders associated with the flow of information to be data modeled. The information described by this network has then been used to construct data models which have defined integrated structures for data storage. Since there was a direct relationship between the logical network, its corresponding data model, and integrated structure for the storage of actual data, changes in the logical network necessarily changed the data model, and in turn the integrated storage of the data.

Since the networks involved were typically complex, single changes in the network could precipitate extensive changes in data modeling and storage. Any errors in logic introduced during a change, either in the logic network or data model itself or in the protocols used for storage, could result in faulty storage which produced errors in data retrieval and transfer. Any changes in the data model or data storage protocols made after actual data storage had begun created significant problems for future access to such data.

Prior art technology has sought first to define the largest possible universe within which to construct its information network and second to preserve the resulting information network and its related data model and data structure for as long as possible once it has been established. It has been forced to do so because of various factors. These have included: the complexity and interlocking relationships between the hierarchy and integrated structure of the data model; the corresponding complex structure of data storage and the difficulty in changing data hierarchy and structure once it has been established; the inability to first create and then to merge a series of separate more localized information networks, data models and data structures into one final composite or universal set. See for example Teorey, "Database Modeling & Design: The Fundamental Principles," Chapter 3.

In effect, large amounts of time, often man-months to man-years, have had to be spent gathering information to define a single internally consistent universal information network. This has then been translated into a single rigid fixed element data model and in turn into a rigid, fixed element data storage structure. Once the resulting database was placed in service, there was an almost unyielding resistance to change it. Since the work environment was actually changing daily, the result was that a data model and data storage structure were well out-of-date the day they went into service. However, they remained in service unchanged for extended periods of time because of the great complexity and cost associated with changing them.

U.S. Pat. No. 5,303,367 represented an apparent effort to overcome at least a portion of the severe limitations in the prior art technology. However, the concept of hierarchical and integrated networking, modeling and storage of information was retained completely. The complexity underlying the limitations of prior art data structure technology were thus maintained. This complexity was increased by introducing the concept of a networking structure inversion, which had to be carried out each time a new element of structure was added to the system. In addition, a format for data storage that provided all of the information necessary for use in retrieval and transfer without a-priori knowledge of the data was apparently lacking.

Recently, the concept of data warehouses has become a topic of interest. Data warehouses are one of the mediums for the co-mingling of data from different databases. Prior art data structure technology did not permit, as far as is known, the co-mingling of different data models or their associated data without creation of a new model that encompassed each of the different models and their content. Also, substantial effort or "manual cleansing" of data structures and data information was typically required for legacy or new databases in order to incorporate the information into another database. Included in cleansing operations were the rationalization of a wide variety of different but equivalent data formats or configurations. This was done so that all of the values reported in the consolidated field name or set of field names conformed to the same format and configuration. These cleansing operations represented one of the largest expenditures of time and money in the creation of data warehouses.

SUMMARY OF INVENTION

With the present invention and in the preferred method for its implementation, multiple collections of data items are organized and stored in a computer-based environment as sets of information in a neutral, non-hierarchical form. Optionally, application of the neutral and non-hierarchical form can be limited to the organization of the collection, allowing for the use of alternative means for the storage of the collection of itself.

According to the present invention, neutral form means that each data item in each collection has specified and associated with it sufficient information, expressed in a particular universal and invariant form, to define itself, to distinguish itself from all other data items, and to recognize any other data item to which it is related. Such information provides a later method for recognizing and sequentially assembling selected related data items, both that exist within the original data item collection and that traverse two or more data item collections that have been organized and stored together. According to the present invention, non-hierarchical form means that the data items in a collection are organized with no priority among themselves or among those of any other collection they are stored with. Non-hierarchical form further means that organization of data items in a collection is achieved without knowledge of or the establishment of relationships with data items either in previously organized and stored collections or with data items in collections that will be organized and stored together at a later time. Other methods heretofore have required the organization and structure of all such relationships to be recognized, understood and defined at the time of storage.

According to the method of the present invention, all data items from any number of collections, once neutrally and non-hierarchically organized and stored together, coexist in parallel together, at once completely distinguishable and separately accessible, yet at the same time totally aware of and sequentially relatable to all other data items to which they are related. One can thus find any sequentially related subset of data items from among the total assembly of those present in storage without having knowledge of or having taken any steps to establish the sequential relationships with any such data items during the organization and storage of data items.

According to the present invention, the universe of a particular scope of information to be modeled in a computer can be represented as a collection consisting of any number of distinct scope segments. Each of these scope segments (referred to later as instance segments) can be modeled separately as individual sets of information.

By formulating such individual scope segment models and their corresponding sets of information in a particular and neutral form, individual segments from the same universal scope of information are automatically and dynamically linked. Through their dynamic linking these independent scope segment models and their corresponding sets of information function as the equivalent of a single model and set of information for the universe of a particular scope of information. The neutral expression of the information also provides an effective medium for the transfer of information.

The method of the present invention that accomplishes these advantages is comprised of three components: (1) the organization of information into instances; (2) expression of instances of information in neutral form; and (3) universal typing and neutral form expression of data items in an instance together with the dictionary information on all properties of those data items for their transfer.

An individual instance is characterized as one segment of the universe of that instance. Individual segments of the same universe of an instance are intrinsically and dynamically related. A computer environment is characterized as a universe of instances, typically spanning more than one instance universe. Certain portions of instances from different instance universes are intrinsically dynamically linked if they share certain information in common. The neutral form expression of instance information is employed to store individual data items in a set of information in a manner which at once enables both the complete isolation and therefore parallel processing of individual instance data sets and the recognition and exploitation of intrinsic dynamic links between different instance data sets for the retrieval and transfer of targeted subsets of diverse sets of information stored in the same computer environment.

The neutral form is achieved by assigning to each data item in an instance data set a generalized structural tag comprised of three elements: (1) a data type; (2) a data reference; and (3) a data organization. The meanings and properties of each of these elements for a particular data item are stored in a dictionary system whose frame of reference is the computer environment within which the data item in neutral form is stored.

All structural tags employed within a specific computer environment are defined to be internally consistent and unambiguous. The properties of the structural tag and the discrete data values stored in neutral form are used to target and retrieve instance data sets from an environment. Universal data typing is defined to enable simultaneous storage of the data items from both retrieved instance data sets and from the associated records in the environment's dictionary system.

Using this universal data typing, dictionary data items employed in the structural tags of retrieved data items are themselves expressed in neutral form. The combination of retrieved instance data items and their associated dictionary data items, now expressed in the same neutral form, are combined into a single file for transfer. This transfer file is completely self contained, including not only the data items of interest, but all of the information required to understand and to interpret each such data item.

The method of the present invention not only overcomes the limitations of the prior art but it also introduces significant capabilities heretofore not available. It establishes a method for organizing and storing sets of information which achieves:

relationships between an unlimited number of different and individually modeled instance segments of the same universe of an instance as well between certain instance segments of different instance universes without a-priori knowledge of their existence, their structure or their content and without remodeling or reloading of the data for individual instance segments;

practical form for expression of individual instance data items in the instance data sets that comprise an instance segment which contains all of the information required to understand and interpret each data item; and yet is independent both of the source and the ultimate application of the information;

independence of the individual instance data sets of an instance segment which enables complete parallel processing of information for storage as well as for retrieval and transfer;

practical non-hierarchical and non-integrated format for the structuring of instance data sets that comprise an instance segment which is independent of the size and complexity of a set of information;

yet accounts for all relevant relationships among data items comprising each instance data set; and allows dynamic versioning without loss of connection to information based on a previous version of data structure;

reconciliation of independently defined instance structures and instance data sets, enabling the direct co-mingling and integration of unlimited numbers of different sets of information;

reconciliation of different legacy instance data set structures and data values with reduced needs for manual cleansing and reorganization;

parallel processor organization and storage of individual instance data sets across diverse sets of information encompassing different instance universes and different instance segments of any particular instance universe;

parallel processor retrieval of all or any portion of an unlimited number of different but related sets of information without any requirement for a-priori knowledge of the formats, structures, or contents or relationships among the various sets of information;

transfer of any retrieved information complete with all the properties and relationships required to understand and interpret the information without any requirement for a-priori knowledge of its format, structure, or content.

BRIEF DESCRIPTION OF DRAWINGS

FIG. 3 is a schematic diagram of data organization according to the present invention.

FIG. 8 is a schematic diagram of organization of data dictionaries of meanings and properties for data organization according to the present invention.

FIGS. 11, 12, 13, 14, 15, 16, 17, 18, 19, 20, 21, 22, 23, 24, 25 and 26 are more detailed illustrative diagrams of data modeling portions of the diagram of FIG. 10.

FIGS. 27, 28, 29, 30, 31, 32, 33, 34, 35, 36 and 37 are more detailed diagrams illustrative of data storage and retrieval portions of the diagram of FIG. 10.

FIGS. 45, 46, 47, 48, 49, 50 and 51 are diagrams supporting examples of the preferred embodiment of the present invention.

DESCRIPTION OF PREFERRED EMBODIMENT

1.0 Introduction

Figure 1:
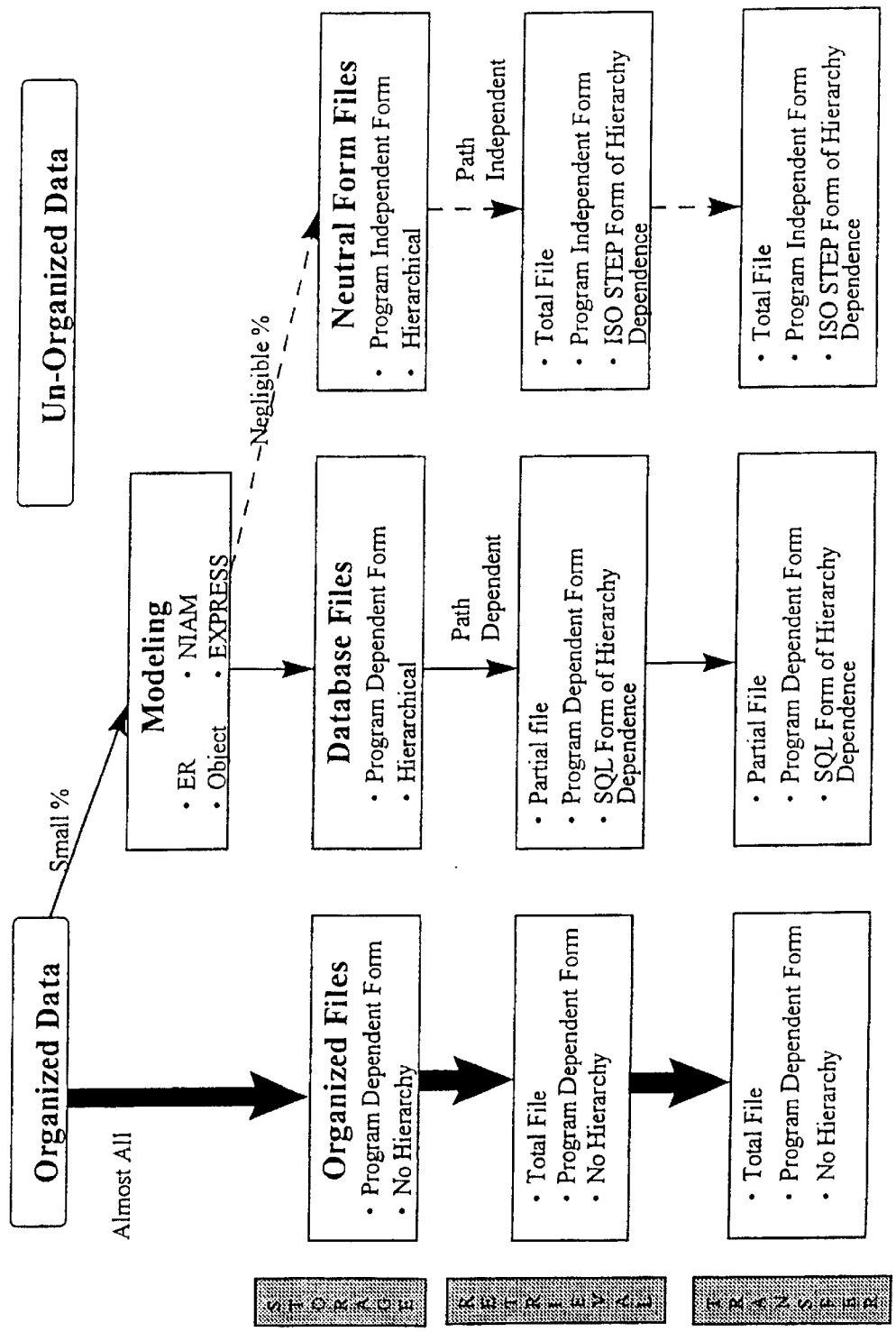
FIG. 1 is a schematic diagram illustrating various types of prior art techniques and their characteristics.
Figure 2:
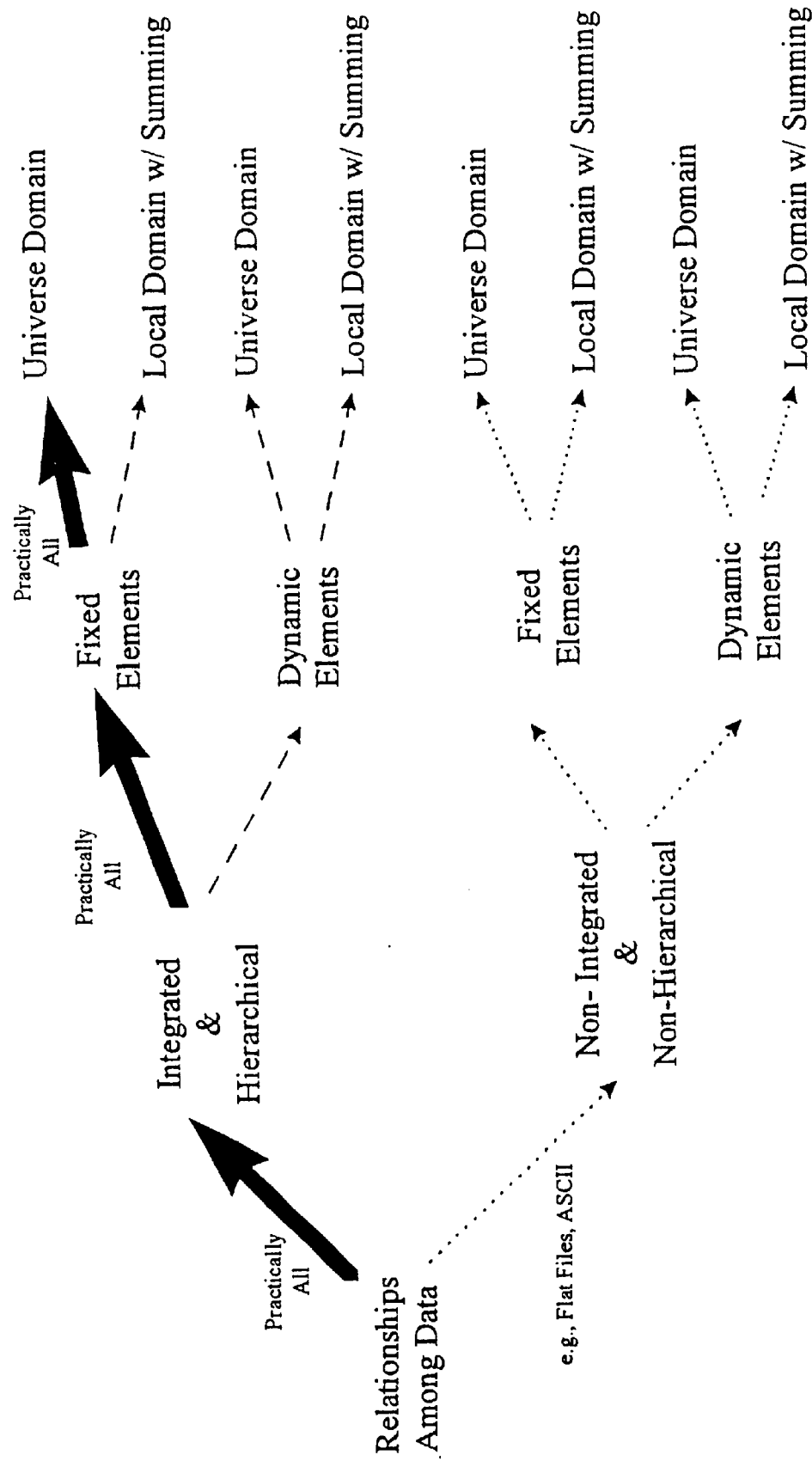
FIG. 2 is a schematic diagram of alternative forms of structuring of data relationships.

The present invention provides a neutral and non-hierarchical means in a computer based environment for organizing a collection of data items into sets of information for exchange, storage, integration and retrieval that simultaneously:

(a) avoids any requirement for in-advance knowledge and codification
   of other collections of data to which said collection is to be related for integration and
   of the specific relationships with other collections of data which are accessible for integration; and (b) insures without anticipation the direct integration and expression of all valid relationships that exist with any other collections of data that have been organized and stored by the same means.

According to the method of the present invention, a target collection of data to be so organized is first segregated into consistent groups, one for each invention-defined instance universe contained in the raw collection of data items. Each resulting group of consistent data items is then treated as a non-hierarchical collection or cluster of nodes, i.e., one node per data item, each node having no particular physical ordering relative to another and the collection of nodes having no a-priori knowledge of or physical ties to any other collection of nodes. According to the method of the present invention, nodes in such a consistent collection or cluster are then each assigned a neutral form tag. This tag is comprised of the set of properties required to fully identify, define and distinguish each node from all others in that collection or cluster. The tag is referred to as a neutral form tag because:

(a) the structure of its components are invariant with data item and collection, (b) the contents of each component are rigorously defined and stored in a comprehensive dictionary system, (c) the contents of each dictionary entry are reconciled against the set of dictionary entries that has accumulated from the creation and assignment of tags for all consistent data collections or clusters that previously have been organized and stored in the same computer-based environment, and (d) the tags and their dictionary information remain associated with a collection or cluster of data items when they are transferred from one computer-based environment to another.

Finally, with the present invention, data items in two separate collections are related when nodes in the two clusters have certain neutral form tag properties in common. Through such commonalities in certain neutral tag information, complex data relationships are made available among individual collections of neutrally organized collections of data without the requirement for any anticipation of either related data collections or the specific basis for each such relationship during the organization and storage of each individual data collection. According to the present invention, it has been found that information can be modeled by organizing various related data values into groups called instances. Any universe of related data items, i.e., the universe of an instance, can be subdivided and organized into a series of instance segments, each having a collection of instance data sets, one for every occurrence of that instance segment. It has been further found that by modeling and storing the instance data sets of individual instance segments in a particular non-hierarchical, non-integrated neutral form, both the models and their data in neutral form can be combined without remodeling or reloading to form a larger portion of the universe of an instance. According to the present invention, this neutral form at once also gives rise to greatly simplified modeling techniques, parallel processing in both data storage and retrieval operations, and simplified transfer of all or portions of the stored data.

According to the method of the present invention, an instance segment is structured in non-hierarchical, non-integrated form as a cluster consisting of non-hierarchical data reference nodes, one for each data value in an instance data set. Each data value in an instance data set, also referred to as an instance cluster, is expressed in neutral form by assigning to it a generalized structural tag that is formed of three elements which, taken as a whole, contain all of the definitions and properties required to describe that data value. These definitions and properties are recorded in a dictionary system according to the method of the invention. One such dictionary system is associated with the contents of each neutral form file. Multiple instance segments in the same neutral file use the same dictionary system. The first element in the structural tag is data type, which specifies the physical form (length, format) of the data value. The second element is data reference, specifying the name and properties (definition, units, upper and lower limits, constraints, etc.) of the data value. The third element is data organization, specifying the other data references, their properties as a group, and their respective data values in relation to the tagged data value.

According to the method of the present invention, a neutral form file can contain instance segments from different instance universes. Furthermore, in the method of the present invention relationships exist between all or certain portions of cluster instances in a neutral form file to the extent that two cluster instances share certain data references and their respective data values in common. These relationships are deemed dynamic, because they happen automatically and as a function of the cluster instances that are present at any one time in the neutral form file.

2.0 Nomenclature

For ease of understanding, the terms used in the subsequent portions of the description of the present invention and their meanings are set forth alphabetically below:

| Term | Meaning |
| --- | --- |
| Alias | One dictionary entry that is equivalent to another. |
| Association | A name that is closely associated with a dictionary entry name. |
| Author | User of the method of the present invention who creates entries in the dictionary system. |
| Author ID | Identification number unique to the world of users of the method of the present invention which insures discrimination of authors in all data transfers between two parties. |
| Cluster | Non-hierarchical collection of data reference nodes which define an instance segment. |
| Cluster - Associated | An autonomous cluster that has been formed from a comprehensive initial cluster. |
| Cluster - Comprehensive Initial | Single cluster formed during the initial creation of the data model for a set of information which contains all of the known data references associated with that set of information. |
| Cluster - Group | A heading within a cluster which groups, e.g., logically, a collection of data references. |
| Cluster - Instance | An occurrence of the data items for a cluster |

-continued

| Term | Meaning |
|---|---|
| Cluster - Nested | Cluster inserted into another cluster in a one-to-one relationship such that the collection of instance data sets of the nested cluster are accessible from within the other cluster; and one and only one of the nested instance data sets is selected to function as a part of the instance data set of the other cluster. |
| Cluster - Node | One data reference in a collection comprising a cluster. |
| Cluster - Sub-cluster | Collection of data references in a cluster which are to appear together in a data input form. |
| Cluster - Subgroup | A subheading within a cluster which groups, e.g., logically, a collection of data references under a cluster group heading. |
| Data | One or more data values or data items |
| Data Instance Node | A node on an instance cluster corresponding to one data value in an instance data set. |
| Data Item | One data value in a set of information |
| Data Organization | Combination of the cluster instance structure and the cluster instance data set properties associated with any data value. |
| Data Organization Instance Data Set | The set of data references and data values for one cluster instance data set. |
| Data Organization Structure | The collection of data references and properties comprising a cluster to which a data item belongs. |
| Data Reference | Name, description and definition of certain properties of a data value |
| Data Reference - Name | Descriptive name for a data reference |
| Data Reference - Schem | Discriminator of the context within which a data reference name is to be applied. |
| Data Reference Set Prime or Distinct | A subset of data references in a cluster whose sets of data values are prime/distinct data value sets. |
| Data Reference Set - Basi Prime/ Distinct | The prime/distinct data reference set in a cluster whose data values are basis prime/distinct data value sets. |
| Data Reference Set Prime/Distinct to Basis Prime/Distinct Conversio | Any prime/distinct data reference set in a cluster can be expressed as the basis prime/distinct data reference set by removing those data references from the cluster that have a high granularity relative to the new basis prime or distinct data reference set. |
| Data Reference Set- Subordinate | Data references comprising a subset of the data references in the universe of an instance., i.e., the data references for one segment of the universe of an instance. |
| Data Type | Physical form property of a data value, e.g., numeric, alphanumeric, photo, drawing, sound, video, time series, geo-spatial, etc. |
| Data Value | One instance of a data reference. |
| Basis Prime/Distinct (P/D Data Value Set | $A_i$ = Subset, $\{p_i \ldots p_n\}A_i$, of each Instance Segment whose values define a unique set, $\{p_i \ldots p_n\}A$, in $U_A$ |
| Basis Prime Data Value Set | A basis P/D data value set for $UI_{Ai}$ which resides in only one universe of an instance $UI_{Ai}$ of universe $U_A$. |
| Basis Distinct Data Value Set | a basis P/D data value set for $UI_{Ai}$ which can reside in more than one universe of an instance $UI_{Aj}$ of universe $U_A$. |
| Prime/Distinct (P/D) Dat Value Set | A basis P/D data value set for an Instance Segment of $UI_{Bi}$ which resides in an Instance Segment of $UI_{Ai}$. |
| Dictionary - Conditional Entries | Entries made into the dictionary system of an environment during the modeling of an instance, which entries have not been reconciled with existing dictionary entries. |
| Dictionary - Environmen System | Collection of dictionaries which list and define all of the properties of the structural tags that mark instance data sets stored in an environment. |
| Domain | Collection of one or more clusters. |
| Dynamic Link | Union of two or more instance segments of the same or different universes for the expression of relationships between query specified $x_i$'s from two different but related instance segments where any P/D data value sets in common between the instance segments match. |

-continued

| Term | Meaning |
|---|---|
| Environment | The collection of those different universes, $U_A$, whose instance data sets are recorded in neutral form which is defined by a single consistent dictionary system. |
| Event | An instance. |
| Glossary | Collection of properties for entries in a dictionary. |
| Granularity | The relative level of specificity reflected in one or a set of data references as it relates to another data reference (not to itself) or set of data references. For example: social security number has a high specificity while a date/time stamp has a low specificity; Last name has a high granularity relative to zip code. |
| Granularity - Relative | Ratio of the granularity of one data reference (or set of data references) to another. |
| Granularity - Relative High | Relative granularity of greater than one. |
| Granularity - Relative Low | Relative granularity equal to or less than one. |
| Inputting | Entry of a single sub-cluster of data items or a complete cluster instance data set into neutral form. |
| Instance - An | An occurrence of a collection of related data values, all expressed on the same time basis. |
| Instance Data Set | Set of data values for one occurrence of an instance segment. |
| Instance Segment | Unique subset of $UI_{Ai}$ data values, $\{x_i \ldots x_n\}_{Ai}$, spanning a single event or instance i within which is contained a basis P/D data value set. |
| Instance Segment Nested | A subset of an Instance Segment of $UI_{Ai}$ which constitutes an Instance Segment of $UI_{Bi}$. |
| Instance Structure | Collection of data references comprising an instance segment. |
| Kid | Identifier for a data reference name |
| Lid | Identifier for author of an element of a model. |
| Loading | Multiple sets of inputting performed in bulk. |
| Model | One cluster or two or more non-integrated but dynamically linked clusters which define the relationships and properties of a set of information. |
| Neutral Form | Data values for an instance data set, each marked with a structural tag. |
| Node | One data reference in a collection that comprises a cluster. |
| Node ID | Identifier for a node in a cluster, e.g., the combination of Kid, Sid, Lid. |
| Primary | The preferred one among a collection of aliases of data reference names or schema names. |
| Properties | Characteristics of a piece of data, a group of data, or a structure of a group of data, e.g., name, ID, definition, units, etc. |
| Reconciliation - Dat Values | Process for evaluating new data values as (a) being the same as; (b) being equivalent to; or (c) being different from one of the discrete data values already in the environment for a particular data reference. |
| Reconciliation - Dat References | Process of determining whether or not one data reference is an alias of another. |
| Reconciliation - Dictionary | Process for evaluating dictionary entries external to an environment as (a) matching with, or (b) being equivalent to, or (c) being uniquely different from an existing entry in an environment system dictionary. |
| Schema | See "Data Reference - Schema" |
| Set of Information | Collection of data values comprising one or more occurrences of an instance segment together with sufficient properties of those data values to enable their understanding, interpretation and assignment to discrete instance data sets with an arbitrary but definable pattern to the ordering of the data values in each instance data set. |
| Sid | Identifier for data reference schema name |
| Structural Tag | Three generalized attributes of a data value, viz., type, name, and organization, whose definition and properties completely and unambiguously define a data value within a cluster instance. |
| Synonym | A name that has the same meaning as that of a dictionary entry name. |

-continued

| Term | Meaning |
|---|---|
| Time Basis | Frame of reference of time for either an instance segment or an individual data reference in an instance segment where null time is treated as "event". |
| Transfer Form | Combination of one or more instance data sets and their supporting dictionary information, all written in neutral form and combined. |
| Transfer Form - Data | One or more Instance data sets written in neutral form. |
| Transfer Form - Dictionaries | Dictionary entries employed by one or more instance data sets written in neutral form. |
| Union - Different Universes | All of the data values in two or more instance segments are directly related to each other where their basis P/D data value sets are the same. |
| Union - Same Universes | Union of (a) same universe instance segments $UI_{B1}$ and $UI_{B2}$ and (b) a different universe instance segment $UI_{A1}$ into which instance segment of $U_{B1}$ or $UI_{B2}$ is nested where an $x_i$ in the query specification resides exclusively in the instance segment of $UI_{A1}$. |
| Universe of A | Universe, $U_A$, of all events of A expressed on the same time basis, e.g., where A - Social Security Number or A = Reactor Name, expressed as instances. |
| Universe of an Instance o A | Universe of all events of A expressed on the same time basis, e.g., where A = Social Security Number or Reactor Name, expressed as instances. |
| Version | Designator which allows for the discrimination of an existing cluster which has had one or more instance data nodes added or removed. |

3.0 Basic Ideas and Methodology

Modeling and storing data in a non-hierarchical, non-integrated way according to the present invention involves three interrelated elements: (a) a particular definition and functionality of an instance of data items; (b) a neutral form for the expression of an instance of data items; and (c) a universal form for data item typing, applicable to both instance and related dictionary data items.

While the prior art necessarily must define and model the universe of an instance, the present invention enables the separate modeling of the typically much smaller individual instance segments that comprise that universe. The present invention further simplifies the modeling process and enables its full dynamic versioning by employing a non-hierarchical, non-integrated structure to the organization of information comprising an instance segment. By expressing modeling and storage in a non-hierarchical, non-integrated neutral form, the present invention enables complete parallel processing for both the storage and the retrieval of instance segments of data. It also enables the direct integration of separate instance segment models and data to produce the equivalent instance universe model and data without remodeling or reloading of individual instance segments. Finally, the present invention enables direct transfer of neutral form information in a manner that includes all of the properties required to independently understand and interpret each data value.

3.1 Instance Segments and Their Additive Nature within an Instance Universe

The universe of an instance contains that subset of all possible data references in the world that are related to each other and to the specific subject matter of that instance on a consistent time basis. As shown in FIG. 3, the data references that make up the universe of an instance can be conceptually visualized and represented as nodes along a line which describes the collection of the related subject matter for the universe of the instance. Furthermore, one ore more of the data references in the universe of an instance must form a defining basis for the instance. Such a set of data references is referred to as a basis prime or basis distinct data reference set and is represented in FIG. 3 as a circle formed by that group's nodes along the line of data references comprising the universe of the instance.

The level of specificity, referred to in this invention as the granularity, of individual data references in the universe of an instance must not exceed the granularity of the basis prime or distinct data reference set. As shown in FIG. 3, in the limit all of the data references comprising the universe of the instance may be employed to define the basis distinct or prime data reference set. Arbitrarily assigning a unique numerical count to the individual instances of an instance segment represents the most common expression of this form of basis. In the present invention, the collection of data references comprising the universe of an instance, including its basis data reference set, constitutes a cluster.

Figure 4:
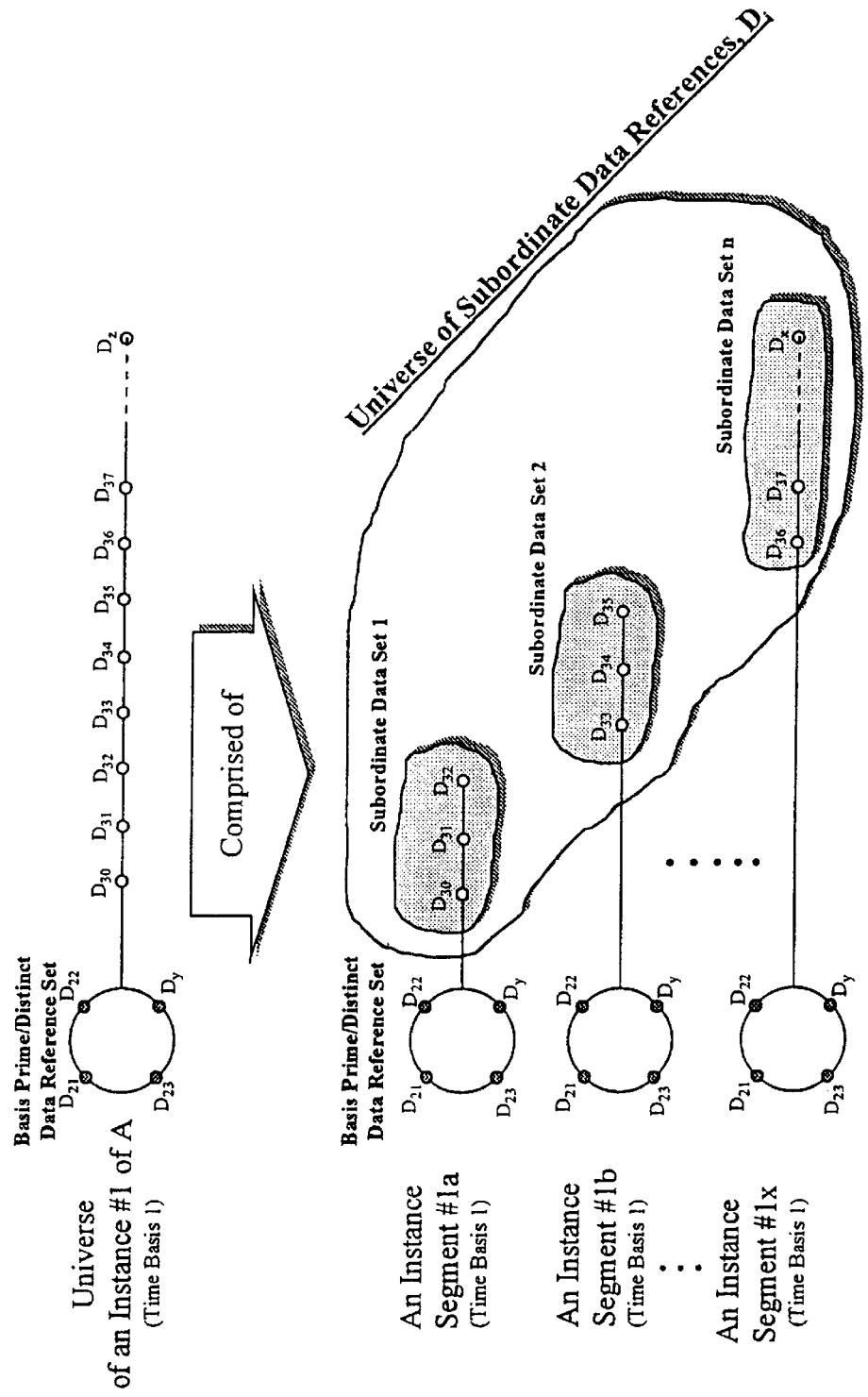
FIG. 4 is another schematic diagram of data organization according to the present invention.

The universe of an instance of A shown schematically in FIG. 4 as a single homogeneous collection of related data references can also be described as a series of instance segments, each containing the same basis prime or distinct data reference set and a certain subordinate data reference set formed from the set of data references that comprise the total universe of the instance of A. In the present invention, each instance segment constitutes a cluster. In such a representation, the universe of an instance corresponds to the sum of the data references present in each of the instance segments, i.e., clusters, that have the same basis prime or distinct data reference set, for those instance data sets of each such instance segment or cluster, where the instance data values of the basis data reference set in each such cluster also match. The linking together of such clusters to form a pool of related data references and instance data sets is referred to in the present invention as dynamic linking. To be validly dynamically linked, two such clusters must also have matching instance data sets for any prime or distinct data reference sets they share in common.

Figure 5:
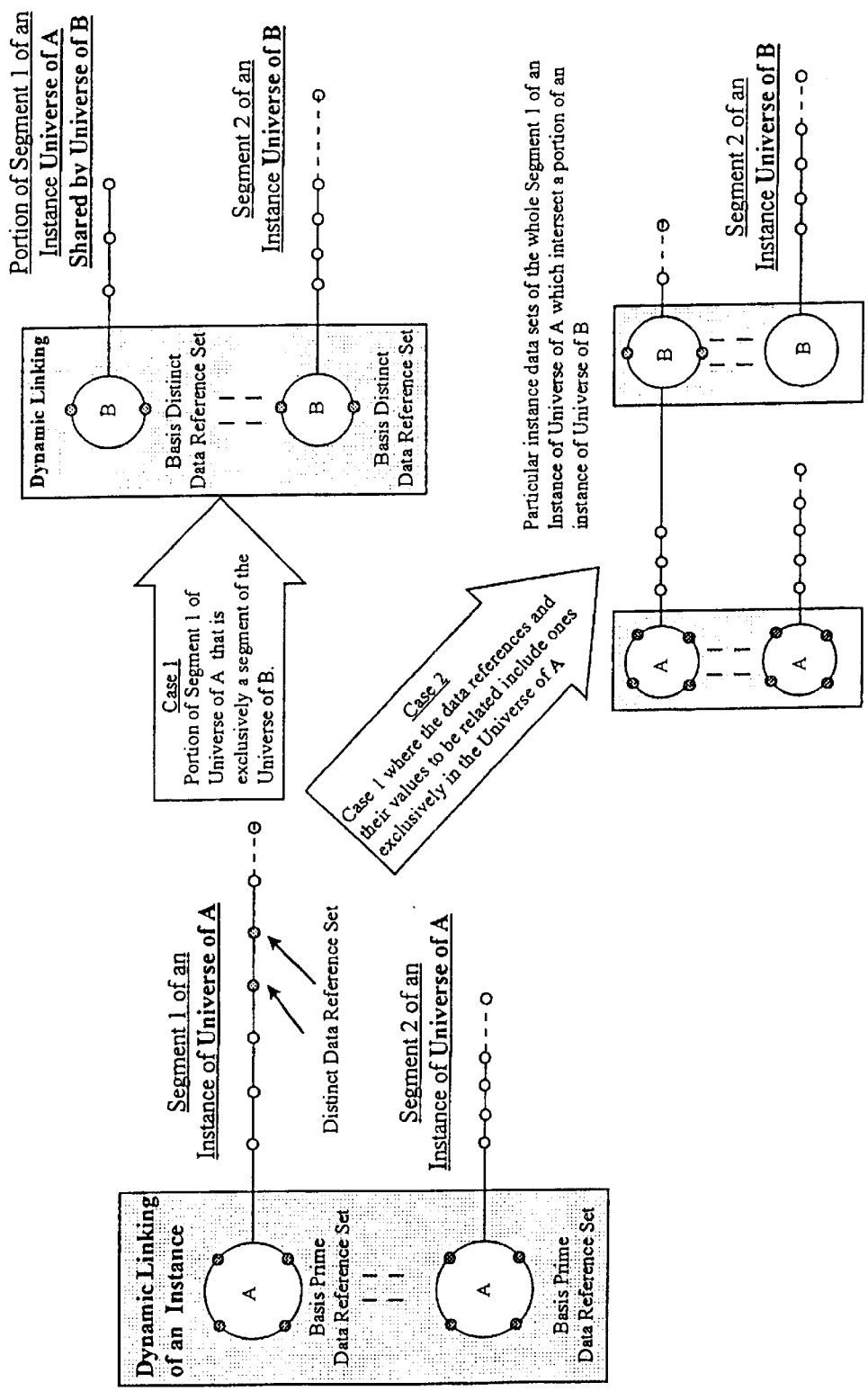
FIG. 5 is a schematic diagram of possible relationships between data according the present invention.

As summarized in the left portion of FIG. 5, dynamic linking occurs at the data reference level between any two instance segments or clusters, of the same universe of an instance. Two instance segments or clusters, are recognized as being from the same universe of an instance by the presence of the same basis prime/distinct data reference set. Actual dynamic linking occurs in such cases for those instance data sets where the instance values of the basis prime or distinct data set in each instance segment and any prime/distinct data sets in common are also the same. Where the linking is between matching basis prime data reference sets, a one-to-one relationship occurs between the two clusters. Where the linking is between a basis prime data reference set and its matching basis distinct data reference set, a one-to-many relationship occurs. Where the linking is between matching basis distinct data reference sets, a many-to-many relationship occurs.

3.2 Relationships Between Instance Segments from Different Instance Universes As shown to the right as Case 1 of FIG. 5, instance segments can contain any number of prime or distinct data reference sets. In such cases, each of these prime or distinct data reference sets is available to dynamically link with a matching prime or distinct data reference set in another instance segment, whether or not it is functioning there as a basis prime or distinct data reference set.

In forming a dynamic link involving a prime or distinct data reference set, one must determine which of the data references from the two instance segments are to be incorporated into the dynamic link. All of the data references participate in the link if they come from an instance segment where the linking prime or distinct data reference set serves as that instance segment's basis prime or distinct data set (see left hand side of FIG. 5). However, this is not necessarily the case where the linking prime or distinct data reference set is not the basis set for the linked instance segment. The appropriate data references from such an instance segment to be included in the dynamic link are only those that are part of the universe of the instance defined by treating the linking prime or distinct data reference set as the basis set. If the specificity, referred to in this invention as the granularity, of such a basis data set is lower than that of the basis data reference set for the linked instance segment, the universe of the new instance will not include certain of the data references that are present in the original universe of the instance of the instance segment. This circumstance is illustrated in Case 1 of FIG. 5. Only those data references that have a granularity equal to or lower than that of the non-basis prime or distinct data reference set will be included in the pool of data references formed by the dynamic link through a non-basis data reference set.

Case 2 in FIG. 5 represents the special case in which one instance segment (of universe B) is nested within another instance segment (of universe A). The nested instance segment (of universe B) is serving as the dynamic link to another instance segment of the same universe). However, in this case, the data references and corresponding data values to be related through dynamic linking at the instance level also include one or more coming exclusively from the instance segment (of universe A) to which the linking instance segment (of universe B) is nested. In such a case, and if there is an instance data set match between segment 1 of the universe of A and segment 2 of the universe of B, the dynamic link extends across the whole of segments 1 & 2 of the universe of A and segment 2 of the universe of B.

Taken as a whole, FIG. 5 shows: (a) that all of the data references from two instance segments of the same instance universe are dynamically linked and (b) that any portion of the data references from two different universes of an instance which participate and match at the instance data set level in both instance universes are also are dynamically linked. Thus dynamic linking can propagate extensively across a collection of instance segments involving more than one instance universe.

One skilled in the art will recognize a variety of methods for determining which data references from an existing instance segment of one universe to include in the instance universe defined by a non-basis prime or distinct set present in that existing instance segment. One method discovered and presently preferred by the inventors involves characterizing the granularity of individual data references relative to each prime or distinct data set in an instance segment. Those data references in an existing instance segment having a low granularity relative to a prime or distinct data reference set then form an instance segment of the universe of the instance defined by that data reference set acting as a basis data reference set. Since the relative granularities of a data reference can be specified during the modeling of an instance segment, allocation of data references to dynamic links where non-basis prime or distinct data reference sets are involved can be automated.

3.3 Neutral Form Expression of an Instance Data Set

Figure 6:
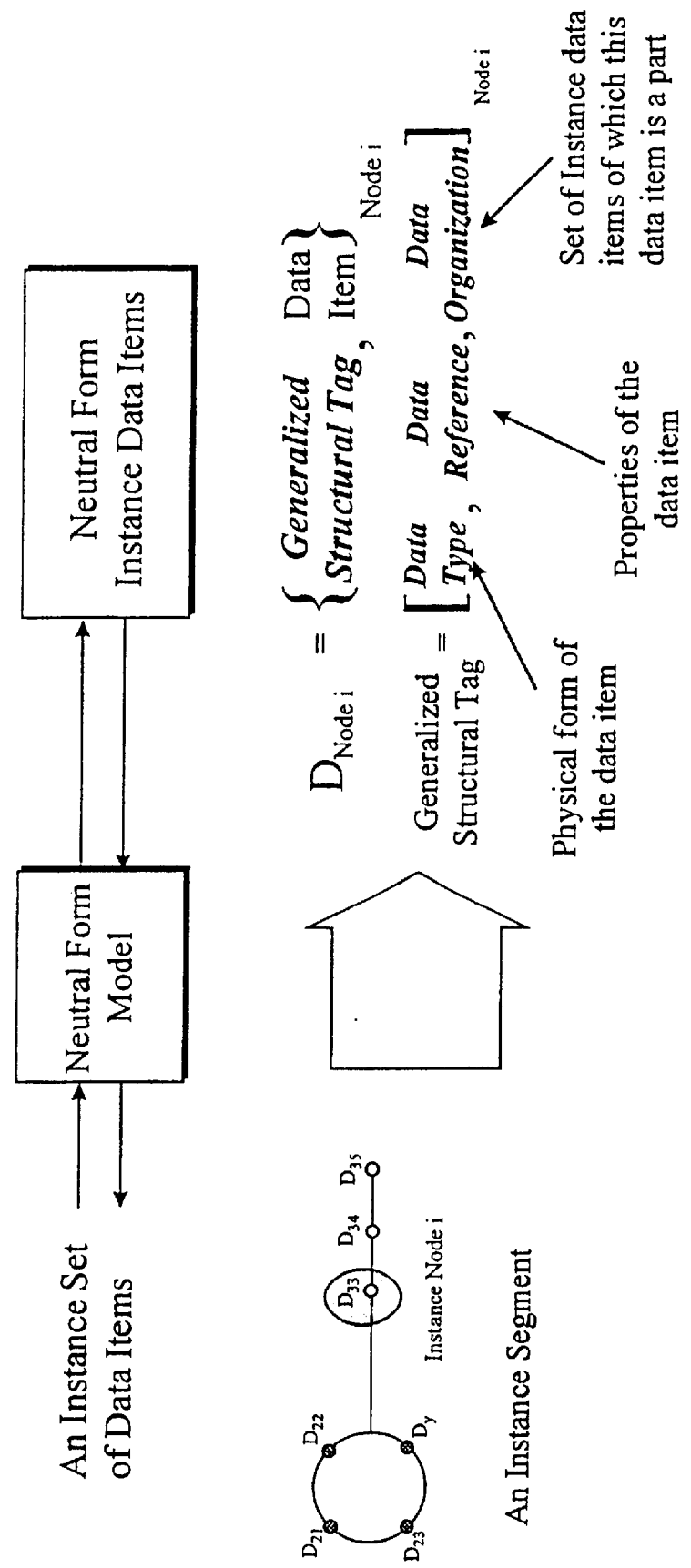
FIG. 6 is a schematic diagram of neutral form expression of data organized according to the present invention.

In the method of the present invention, sets of instance data items are expressed in a neutral form. As shown in FIG. 6, the particular neutral form of the present invention is achieved by assigning to each data item in an instance segment a generalized structural tag. Such a generalized structural tag is designed to capture all pertinent properties necessary to understand and interpret the data item either in relation to a specific collection of other data items in an instance data set or in relation to the data items in all other instance data sets. The scale on which the structural tag is designed sets the minimum aggregation of data that functions autonomously and can therefore be handled by parallel processors for either the storage or the retrieval of neutral form information.

Independence in the neutral form can be established at the data item level within an instance data set. Independence in the neutral form can also be established at the level of an instance data set and is the the method described here. Thus, in the implementation of the invention described herein, the cluster instance is the minimum block of information that is handled autonomously by a single processor in a parallel processor configuration for either the storage in or the retrieval and transfer of data from a neutral form file. With the present invention, the generalized structural tag having these requisites is composed of three elements: (1) a data type which specifies the physical form of the data item; (2) a data reference which specifies the properties of the data item; and (3) a data organization which specifies a combination of the set of instance data items of which a data item is a part and the set of data references to which these data items correspond.

Figure 7:
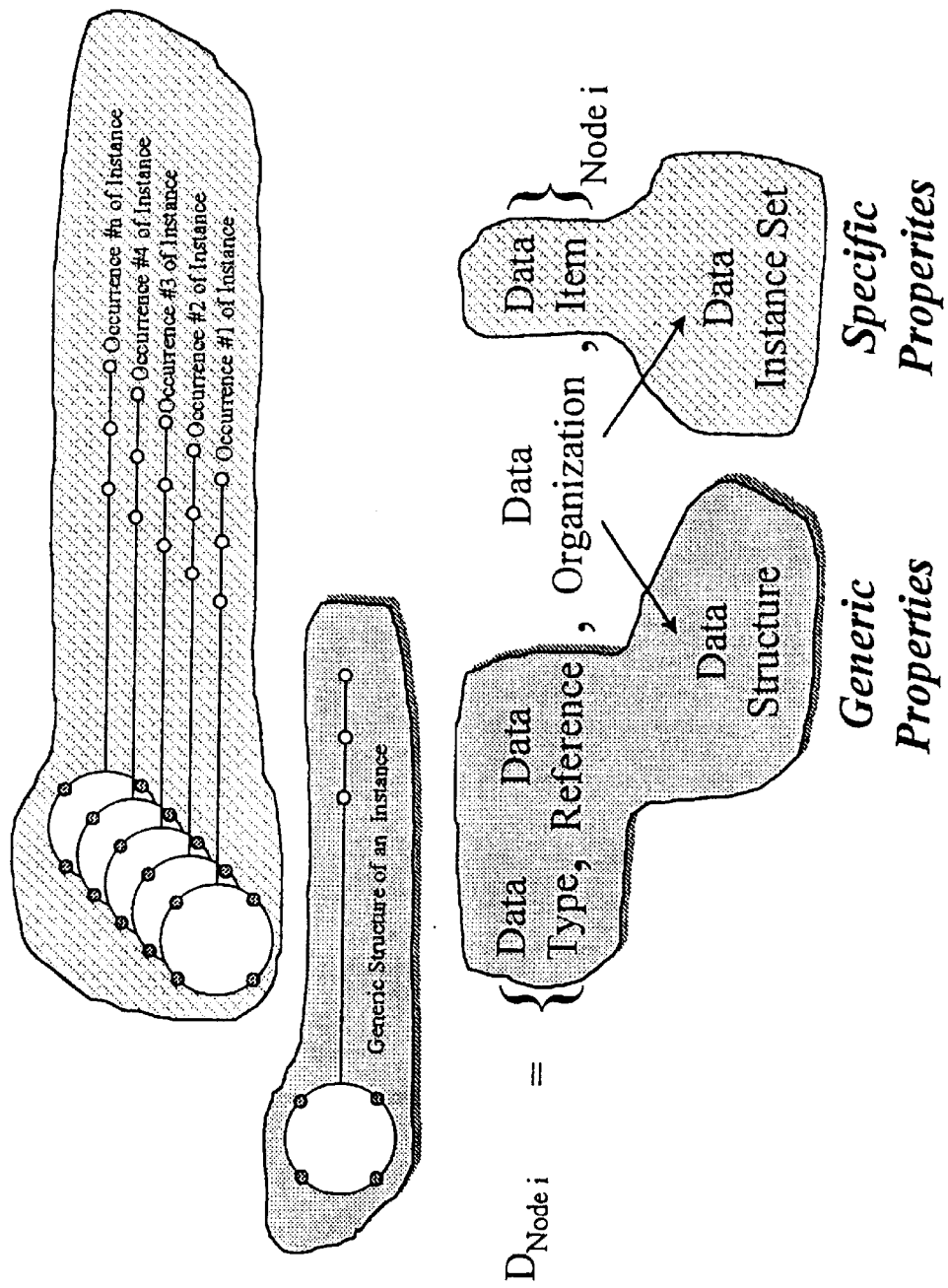
FIG. 7 is a further schematic diagram of neutral form data organization.

As shown in FIG. 7, the data organization element of the generalized tag represents a combination of the generic organizational characteristics of a data item (cluster composed of a collection of data references) and the instance data set specific data organization characteristics of a data item (set of data values for the instance data set represented by the data item). Thus, in a typical implementation of the invention, the neutral form for a data item is composed of three generic characteristics and two specific characteristics. The generic characteristics of the neutral form are: (1) data type; (2) data reference; and (3) data structure. The specific characteristics of the neutral form are: (1) data instance set; and (2) data item.

Characteristics of the structural tag must be defined for each data value in each instance data set that makes up a set of information. Furthermore, all of the pertinent properties of the data value that are required to understand and interpret the data value must be identified and assigned to one of the characteristics of the structural tag. This bookkeeping can be achieved through the creation of a dictionary system or some other equivalent form of filing system that can identify and keep track of structural tag information.

FIG. 8 illustrates this accounting for the names, meanings and pertinent properties of selected structural tag characteristics for the neutral form expression of one data item. The example cited involves a single temperature data value for a heat exchanger, which is part of one instance data set occurring at 8:05 a.m. on Mar. 27, 1994 in a set of information for a polyethylene reactor system. Four distinct dictionaries are shown in this example, one for each of the following structural tag characteristics: data type, data reference, instance structure, and instance data set. For example, the name assigned to the data reference is "heat exchanger temperature". Its properties are: units of "degrees Fahrenheit", upper limit 250, lower limit 50. This collection of dictionary information permits complete discrimination of a data value from all other data values in a neutral form file as well as its complete understanding and interpretation.

3.4 Universal Typing of Instance and Dictionary Data Items

Figure 9:
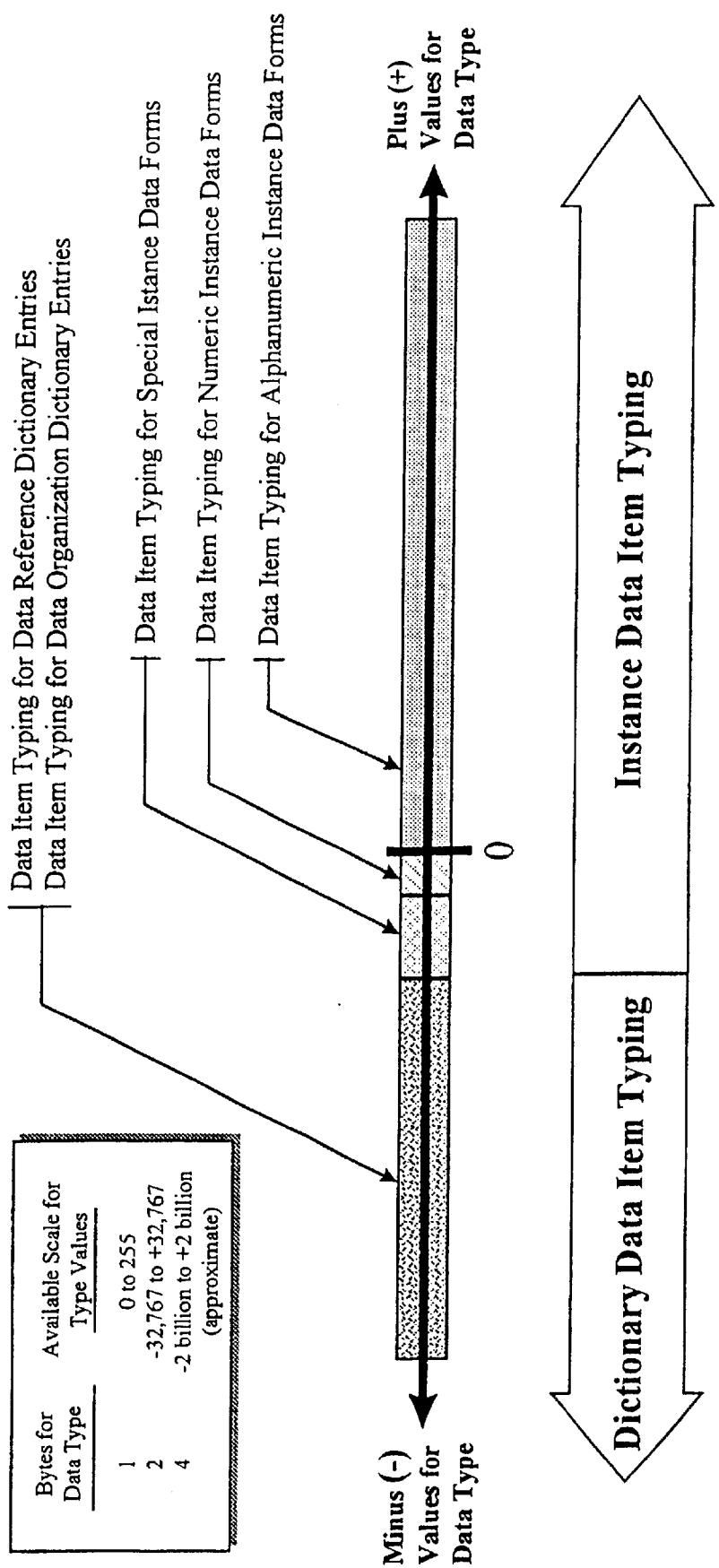
FIG. 9 is a schematic diagram of universal data typing with the present invention.

Data transfer according to the present invention involves the transfer of both instance data sets in neutral form and the dictionary data items required to understand and interpret completely the structural tags present in those neutral form instance data sets. The present invention accomplishes the transfer of dictionary data items using the same neutral form as is employed for the storage and transfer of instance data sets. Although not required, it is preferable to accomplish this transfer of dictionary data items simultaneously and in the same file as that which contains the neutral form instance data set records that are being transferred. This is made possible by employing the universal data typing shown in FIG. 9. The absolute size of the numbering system shown depends upon the choice of the number of bytes to be employed in specifying data types. Although other sizes are possible, two bytes in most cases are adequate, giving a total numbering system of approximately 32,000 values in each of the positive and negative sides of the system. While the allocation and sizing of segments of the system to dictionary and instance data items are arbitrary, dictionary and instance data set segments must be distinct and non-overlapping: The data type also carries with it the specification of the length of the data item, either directly or by implication of fixed length. In this regard, it is normally convenient to assign the positive values of the data type to the alphanumeric form of instance data items, with the value of the data type corresponding to the number of characters in the data item. However, it should be understood that other schemes are possible.

4.0 Summary of Preferred Embodiment

One skilled in the art will appreciate that preferred embodiments of the method of the present invention may take on many different forms depending on the particular application intended. In light of this, the preferred embodiment presented here has been designed primarily to teach many of the important aspects and implications of the method of the present invention in a context which can be readily learned. Once taught the method, one skilled in the art will appreciate many alternative and preferred means for implementing individual aspects of it, depending upon their specific purpose.

The preferred embodiment of the method of the present invention involves the structuring and storage of instance data sets consisting of different sets of information in neutral form in a single file, i.e., environment, such that: (a) instance data sets from different instance segments of one or many different universes of an instance dynamically link to one another and are retrievable together without direct knowledge of each other's presence in the environment; and (b) instance data sets, once retrieved, are transferred together with all dictionary data items required to understand and interpret them completely, all in a single neutral form transfer file.

The prior art technology must anticipate the broadest possible scope of use of a database model in advance and then model that scope, in effect attempting to define in advance the complete universe of the instance to be modeled. By contrast, the method of the present invention achieving the ultimate database objective in increments that are natural to the user. The user merely models individual instance segments of the ultimate intended scope of use of the database as they become known. Individual instance segments of the same universe of an instance dynamically relate as soon as they have been created and reconciled to the same dictionary system and exist in the same neutral form file. The result is the equivalent of a single model of the combined instance segments. Thus the universal instance that must be anticipated completely and up front in the prior art technology, evolves in more modest instance segment models as the segments become known, understood and modeled. Also in contrast to the prior art, modeled instance segments in the method of the present invention can undergo versioning as conditions and needs change without loss of continuity with data stored in an earlier version of a model. This makes the composite of a set of instance segment models and neutral data intrinsically responsive to the continually evolving needs of the user.

Figure 10:
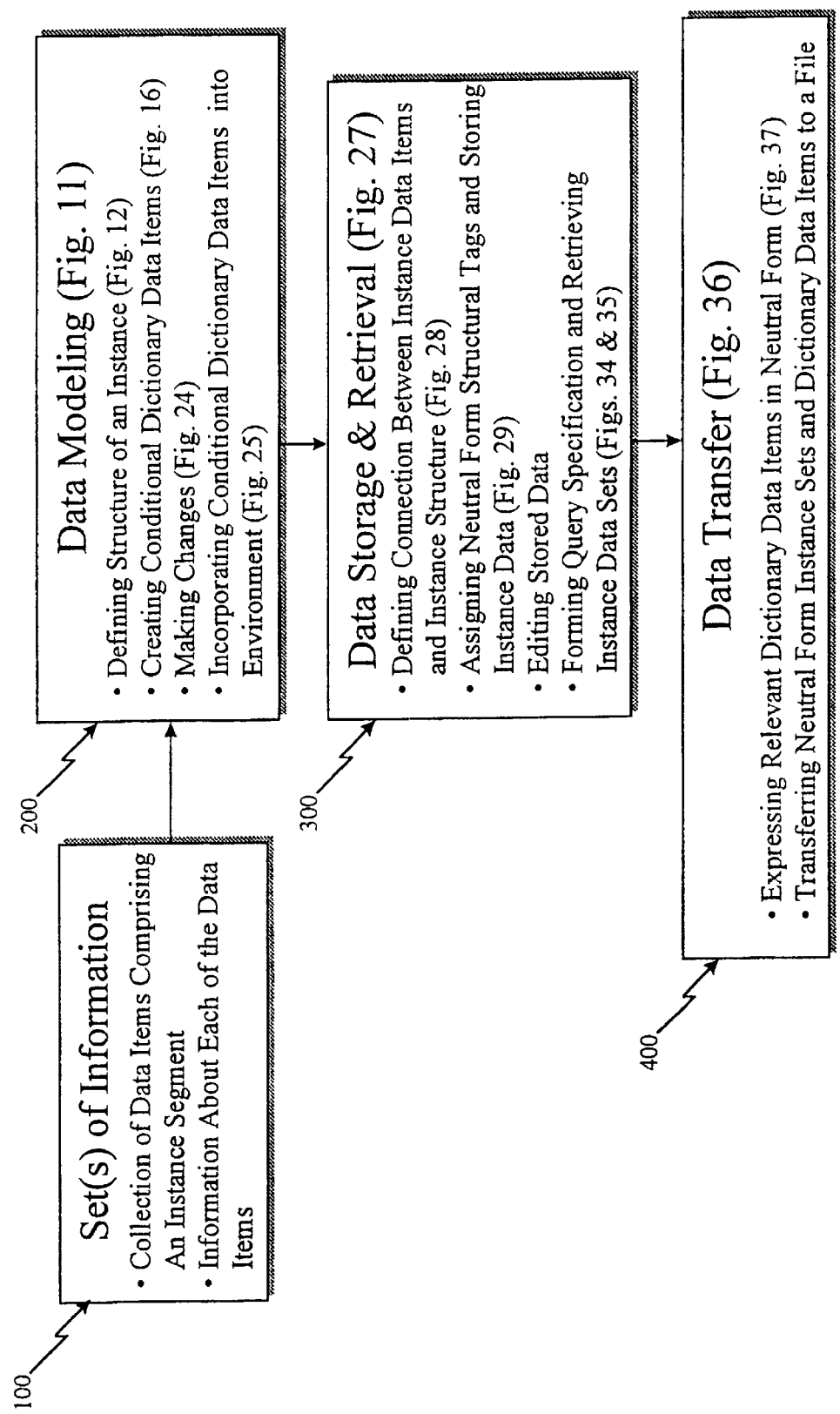
FIG. 10 is a schematic diagram in summary form of a data storage, retrieval and transfer process according to the present invention.

FIG. 10 summarizes this preferred embodiment. A set of information as schematically indicated at 100 contains one or more collections of instance information in the form of one or more sets of related data items (or a listing of data references if the data items have not yet been collected) complete with basis data sets and information about the related data items. Data modeling indicated at 200 is then performed on these sets of information: (a) to define the structure of the instance or instances involved; (b) to create conditional dictionary data items for each instance; (c) to make any changes; and (d) to incorporate individual instance structures and conditional dictionary data items into an environment. Thereafter, as indicated at 300, data storage and retrieval is performed on the modeled sets of information by: (a) defining connections between instance data items and instance structures; (b) assigning neutral form structural tags and storing tagged data items as instance data sets; (c) editing stored data items as needed; and (d) forming a query specification and retrieving complying instance data sets. Data transfer as shown at 400 is then performed on retrieved data instance sets by: (a) expressing related dictionary data items in neutral form; and (b) transferring neutral form instance data sets and dictionary data items into a common neutral form file.

5.0 Data Modeling

Figure 11:
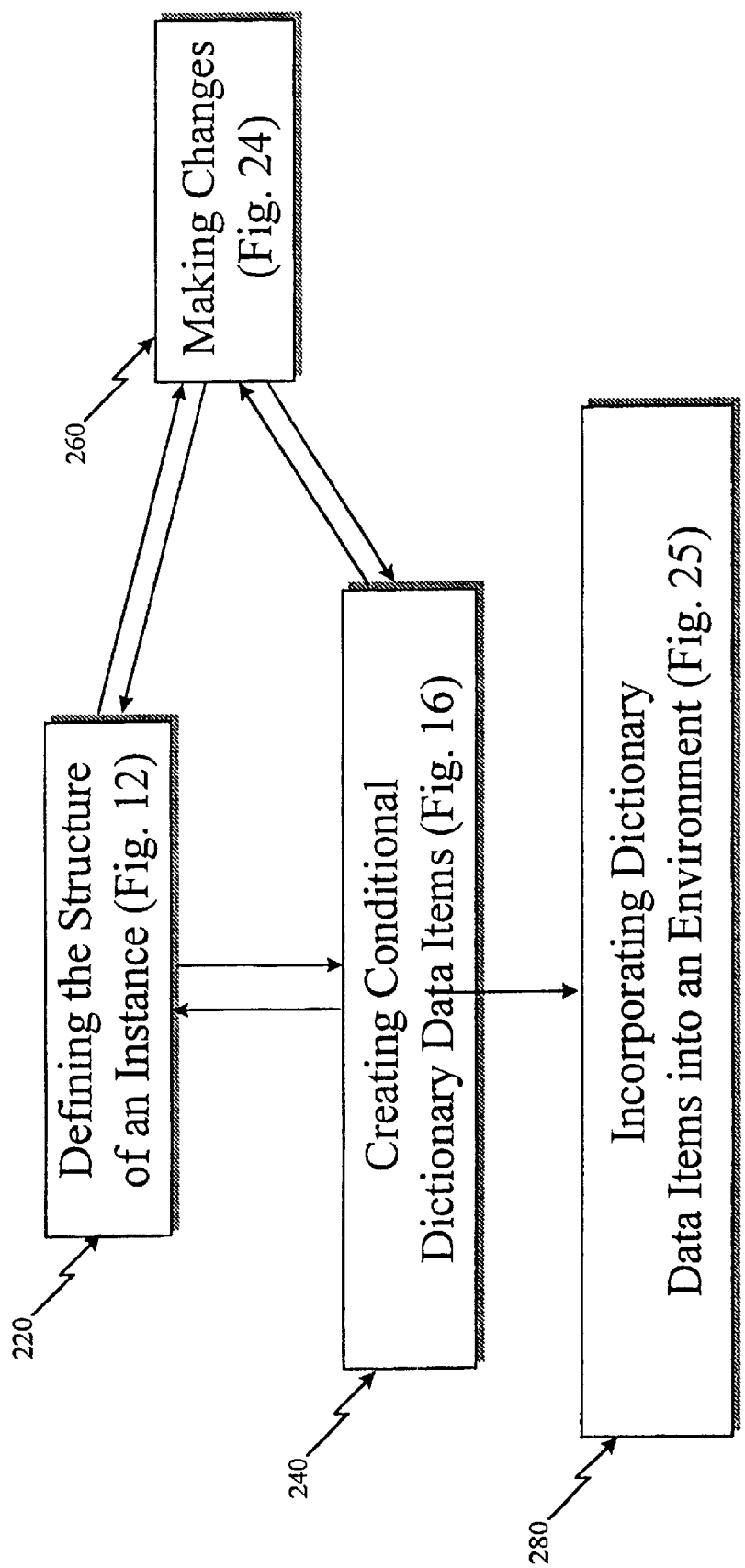

Further detail on the data modeling component 200 of the preferred embodiment of the present invention is provided in FIG. 11. As there shown, data modeling 200 is comprised of defining the structure of an instance at 220, creating conditional dictionary data items as indicated at 240, making changes as needed, indicated generally as 260, and incorporating conditional dictionary data items into an environment, illustrated at 280.

5.1 Defining the Structure of an Instance

Figure 12:
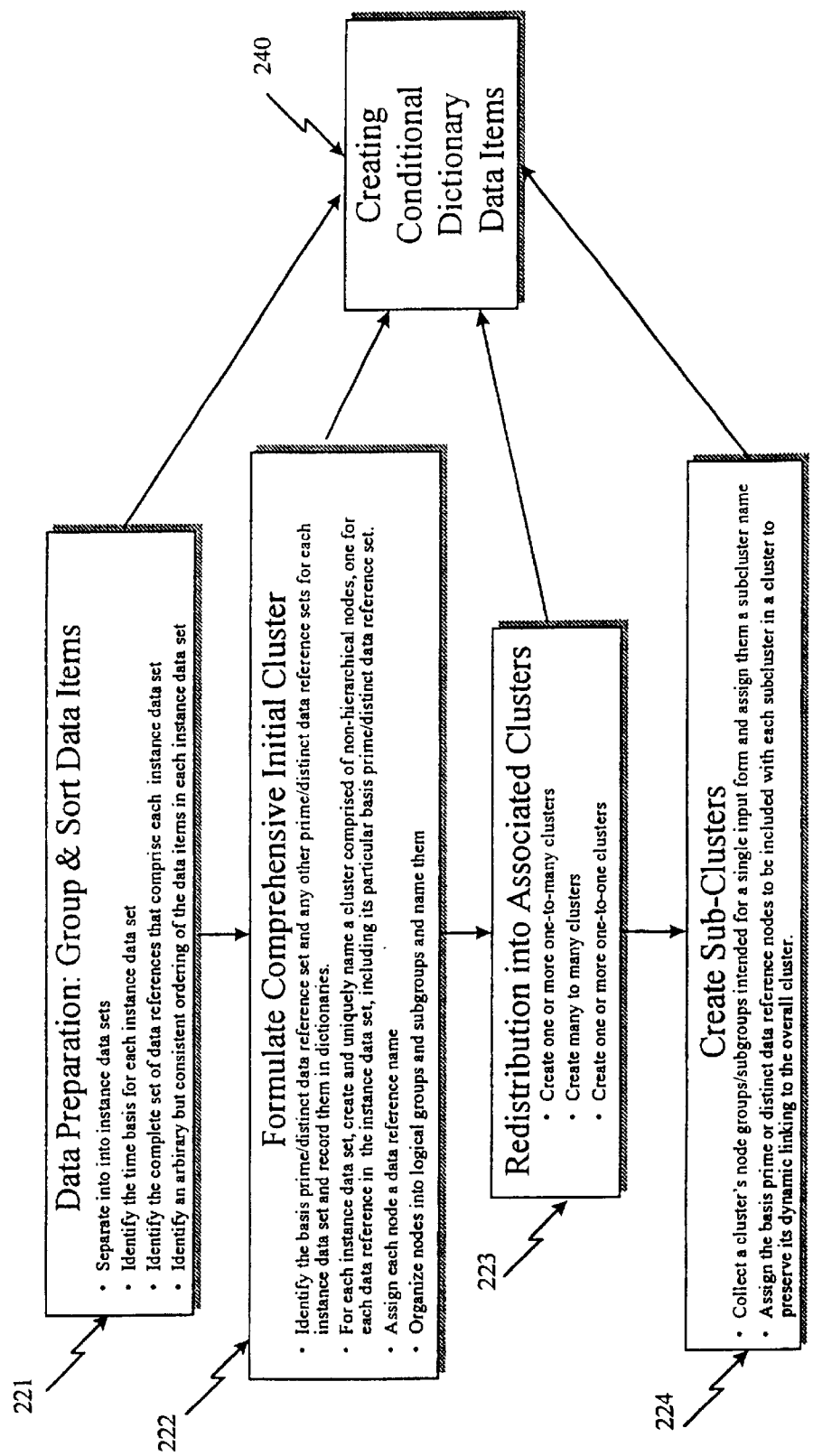

The general process 220 of defining the structure of an instance (FIG. 11) involves the four steps outlined in FIG. 12.

5.1.1 Data Preparation: Grouping & Sorting of Data Items

Data preparation 221 involves four basic elements. First, the target sets of data are divided into one or more instance universes. The remaining three elements are then performed separately on the data from each instance universe that may exist in the data sets. Second, the time basis for the instance universe is determined and set. Examples of time basis include: event (lack of a specific time), minute, hour, day, week, month, quarter, year, etc. Two instance segments cannot be of the same universe of an instance unless their time bases are the same or one of them is event time. Instances from two different instance universes cannot be dynamically linked unless they are of the same time basis or one of them is event time. Third, the set of individual data items that separately comprise each instance data set are identified. Although not a requirement, it is desirable to deal only with real data items rather than with abstracts of data items. Fourth, the arbitrary but consistent ordering of these individual data items as they exist in each set of information 100 is determined.

5.1.2 Formulation of Comprehensive Initial Instance Cluster

After data preparation step 221, the model for each identified instance universe is generated in the form of a single cluster formed at step 222. The single cluster is herein referred to as the comprehensive initial cluster, which is comprised of the data items present in an instance data set taken from one set of information. This comprehensive initial cluster is comprised of a non-hierarchical collection of nodes, one node for each data item that comprises the instance. It is a single cluster because the instance it depicts is one instance segment of the universe of that instance such as instance segment la of FIG. 4. The cluster is assigned a unique name and each node in the named cluster is assigned a data reference name. An individual data reference can be employed only once in any one data model. Both the meanings and the respective properties of the cluster name and its respective data references are defined and stored in the dictionary system at step 240.

Figure 13:
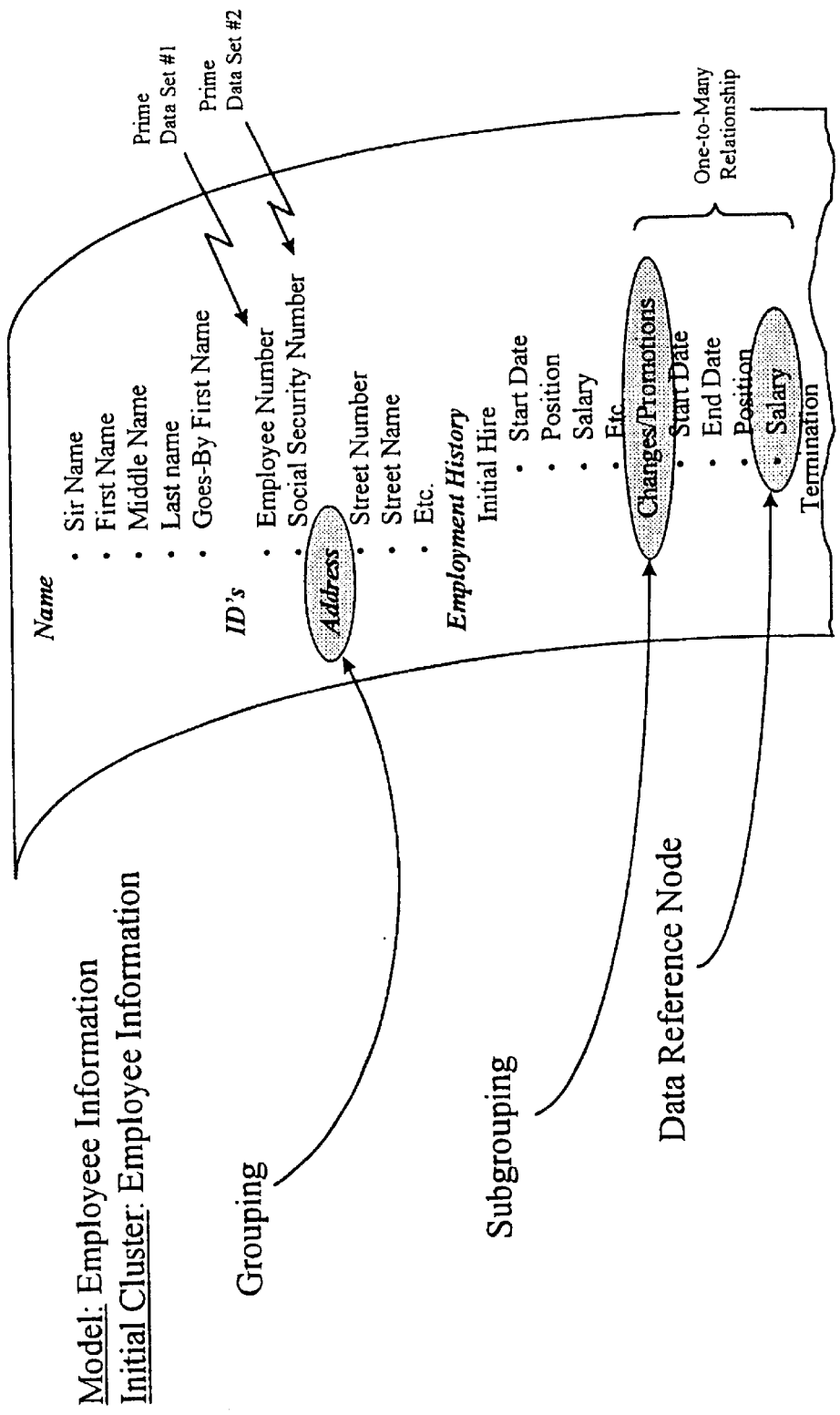

As shown in FIG. 13, nodes in a cluster constitute a list of data references which can be organized into logical named groups and subgroups in much the same fashion as a document can be outlined. Such organization is not to be construed as any form of hierarchical ordering of the contents of a cluster for the purposes of either storage or retrieval and transfer. Such organization is defined by the user merely to ease understanding and interpretation in display and to facilitate data inputting. In the case where modeling occurs before data collection has occurred, the process of cluster formation and organization can be iterative. As the total number and organization of a set of data references evolves, additional data references can be created to complete the definition of a logical set. Existing data references can be moved freely from one group to another until the preferred logical groupings have been realized and achieved. As groups and subgroups are formed, they are named and their meanings and any pertinent properties are defined and stored in the dictionary system generally indicated at 240.

One or more prime or distinct data reference sets 222 must be defined and one must be declared the basis prime or distinct data reference set in order to validate the data references defined for the cluster. No data reference in the cluster can have a specificity, i.e., granularity, greater than the granularity of basis prime or distinct data reference set. Any data reference with granularity higher than that of the basis data reference set must be removed from the cluster and placed in another cluster whose basis prime or distinct data reference is appropriate to it. Both the basis and "non-basis" prime or distinct data reference sets are recorded and stored in the dictionary system 240.

5.1.3 Redistribution into Associated Clusters

The initial cluster can be redistributed into associated clusters as shown by 223 as necessary to account for any one-to-many or many to many relationships that are found to exist or any one-to-one relationships, respectively, that the user desires to split out from the initial cluster. It is to be noted that redistribution of the initial comprehensive cluster into associated clusters is an optional feature, not a requisite feature of the present invention. However, in the case of one-to-many and many to many relationships, it does provide a technique for reducing repetitive loading of selected data items between certain instance data sets of the initial cluster. In the case of one-to-one relationships, it provides a technique for completely isolating the inputting of a certain portion of the nodes in the initial cluster. This could be desirable if, for example, the data from this collection of nodes was to be shared with more than one cluster in the environment. Where appropriate, further associated clusters can be formed from an associate cluster by repeating Step 223 (FIG. 12). In each such case, one or more additional data references must be copied from the parent associated cluster to account for the source of the duplication being addressed.

The process of Step 223 (FIG. 12) as applied to a one-to-many relationship involves first selecting a group(s) or subgroup(s) of nodes that constitute the many side of a one-to-many relationship in the comprehensive initial cluster. Then this collection of nodes is transferred to a new cluster. To achieve dynamic linking, the basis distinct data reference set from the comprehensive initial cluster is then chosen and copied into the new cluster, where it registered as the basis distinct data reference set for the new cluster. Finally, the new cluster is uniquely named and any appropriate properties are defined and entered into the structural tag dictionary system. The process can be repeated as desired for any further one-to-many relationships present in either the comprehensive initial cluster or any associated cluster that may have been formed.

The process of Step 223 (FIG. 12) as applied to a one-to-one relationship involves first selecting a group(s) or subgroup(s) of nodes that constitute a one side of a one-to-one relationship in the comprehensive initial cluster that either exists already in a cluster of another instance structure and is to be shared here or will form a cluster that is to be shared with other clusters in either the present or other instance structures. Then this collection of nodes is transferred to a new cluster. To achieve dynamic linking, the basis prime data reference set from the comprehensive initial cluster is then chosen and copied into the new cluster, where it is marked as the basis prime data reference set in the new cluster. Finally, the new cluster is uniquely named and any appropriate properties are defined and entered into the structural tag dictionary system. The process can be repeated as desired for any further one-to-one relationships present in either the comprehensive initial cluster or any associated cluster that may have been formed.

Figure 14:
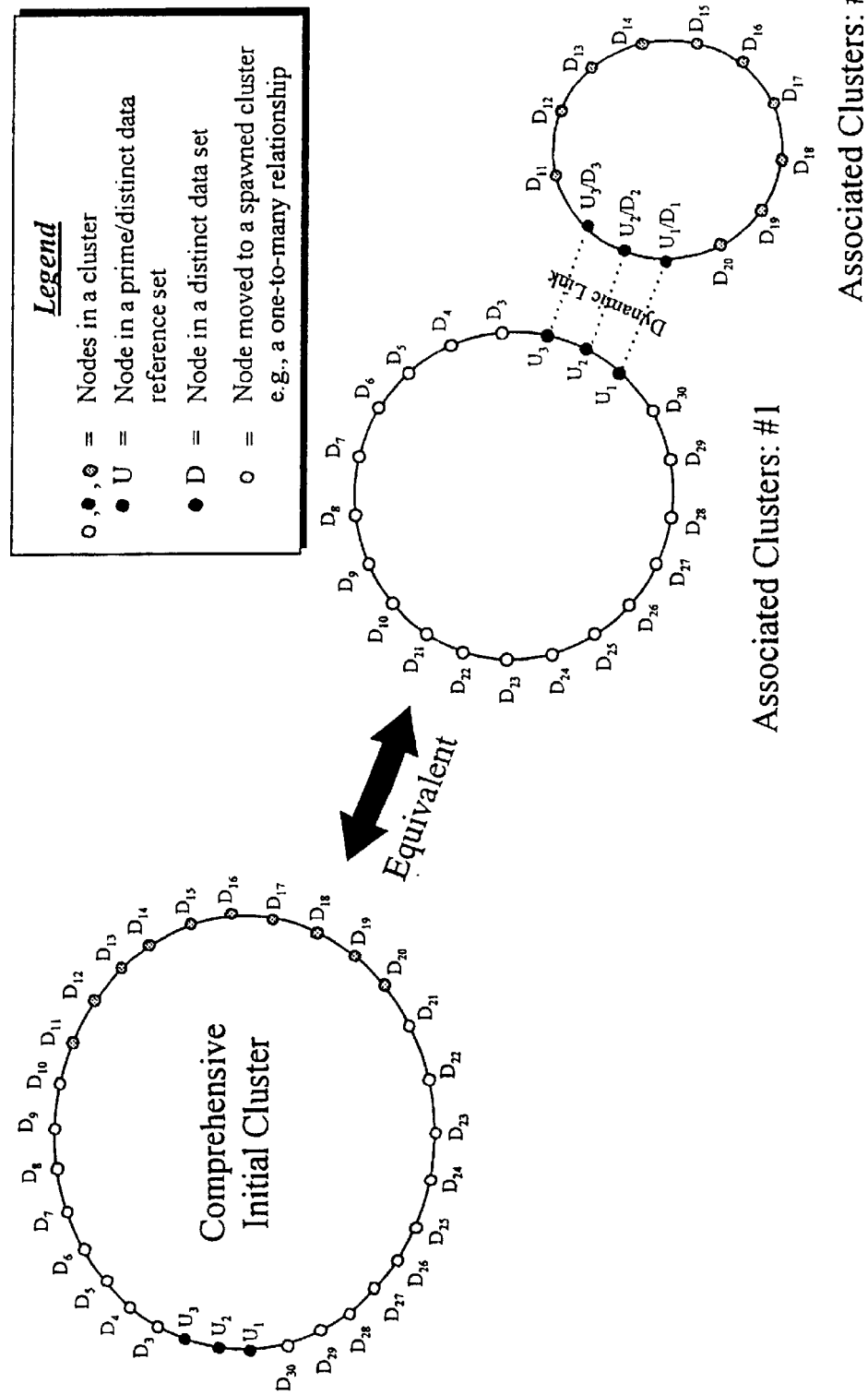

The process of Step 223 (FIG. 12) as applied to a many-to-many relationship involves first selecting a group (s) or subgroup(s) of nodes that constitute the secondary many side of a many-to-many relationship in the comprehensive initial cluster. Then this collection of nodes is transferred to a new cluster. To achieve dynamic linking, the basis distinct data reference set from the comprehensive initial cluster is then chosen and copied into the new cluster. This set is then augmented by choosing and copying the data reference or set of data references that distinguishes one instance from among the many in the parent cluster. The resulting collection of data references is assigned as the basis distinct data reference set for the new many cluster. Finally, the new cluster is uniquely named and any appropriate properties are defined and entered into the structural tag dictionary system. The process can be repeated as desired for any further many-to-many relationships present in either the comprehensive initial cluster or any associated cluster that may have been formed. Since the associated clusters resulting from a redistribution are necessarily segments of the same instance universe, they must be by definition dynamically linked. FIG. 14 illustrates the mechanics involved in a dynamic link between two associated clusters. FIG. 15 illustrates the mechanics involved in the dynamic links for the one-to-many, one-to-one and many-to-many relationships. FIG. 15 also illustrates the mechanics for one optional variation of the one-to-one relationship that is possible. Labeled as a "nested" cluster, this form of dynamic linking establishes the "nested" cluster as a lookup listing within the dynamically linked cluster. Here, the user could have the option to designate which data references in the "nested" cluster were desired to be seen when looking at it from within the dynamically linked cluster. During data entry in the dynamically linked cluster, the user could see the existing instance data sets in the "nested" cluster and select one to apply for a particular cluster instance. Alternatively, they could enter a new instance data set into the "nested" cluster and select that nested instance data set to apply for the particular cluster instance. More than one nesting of the same cluster in a model is allowed, so long as the interpretation of the nested data references and their data values is modified differently in each case. For example, a cluster containing the master listing of employees might be nested twice into another cluster, once for the designation of a secretary and once for the designation of a supervisor.

5.1.4 Creation of Sub-Clusters

Sub-clustering as shown in step 224 (FIG. 12) provides for allocation of the input of data items representing an individual cluster instance into more than a single form. In the absence of sub-clustering, all data items in a cluster are inputted at the same time. The step 224 of forming sub-clusters involves first dividing up the nodes in a cluster into two or more sub-clusters and assigning them separate sub-cluster names. The basis prime or distinct data reference set from the cluster is then assigned to each sub-cluster. The basis prime or distinct data reference set will appear on the input screen of each sub-cluster to dynamically link the instance data values entered in that input screen to the same instance data set that is dynamically linked to the inputs for the other sub-clusters in that cluster.

5.2 Creating Conditional Dictionary Data Items

Figure 16:
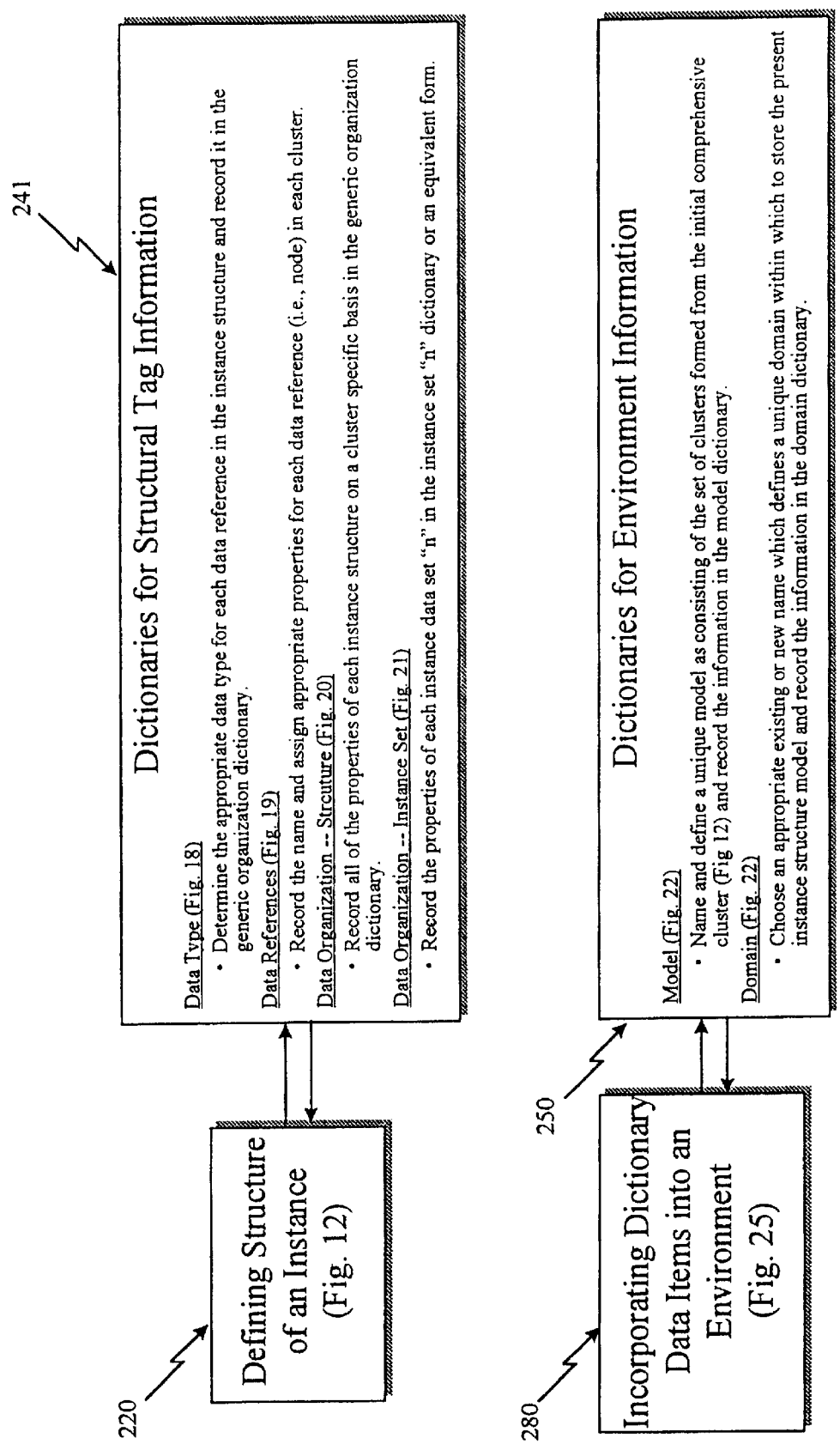

As shown in FIG. 16, modeling of the structure of an instance requires two sets of dictionaries: (a) dictionaries to define and record structural tag information generally indicated at 241; and (b) dictionaries to define and record the relationship of an instance structure to its environment generally indicated at 250. An environment can contain many sets of information, each expressed in neutral form. Environment dictionaries, viz., model and domain, store the terms and meanings required to organize these different sets of information.

5.2.1 Data Type Dictionary

Figure 17:
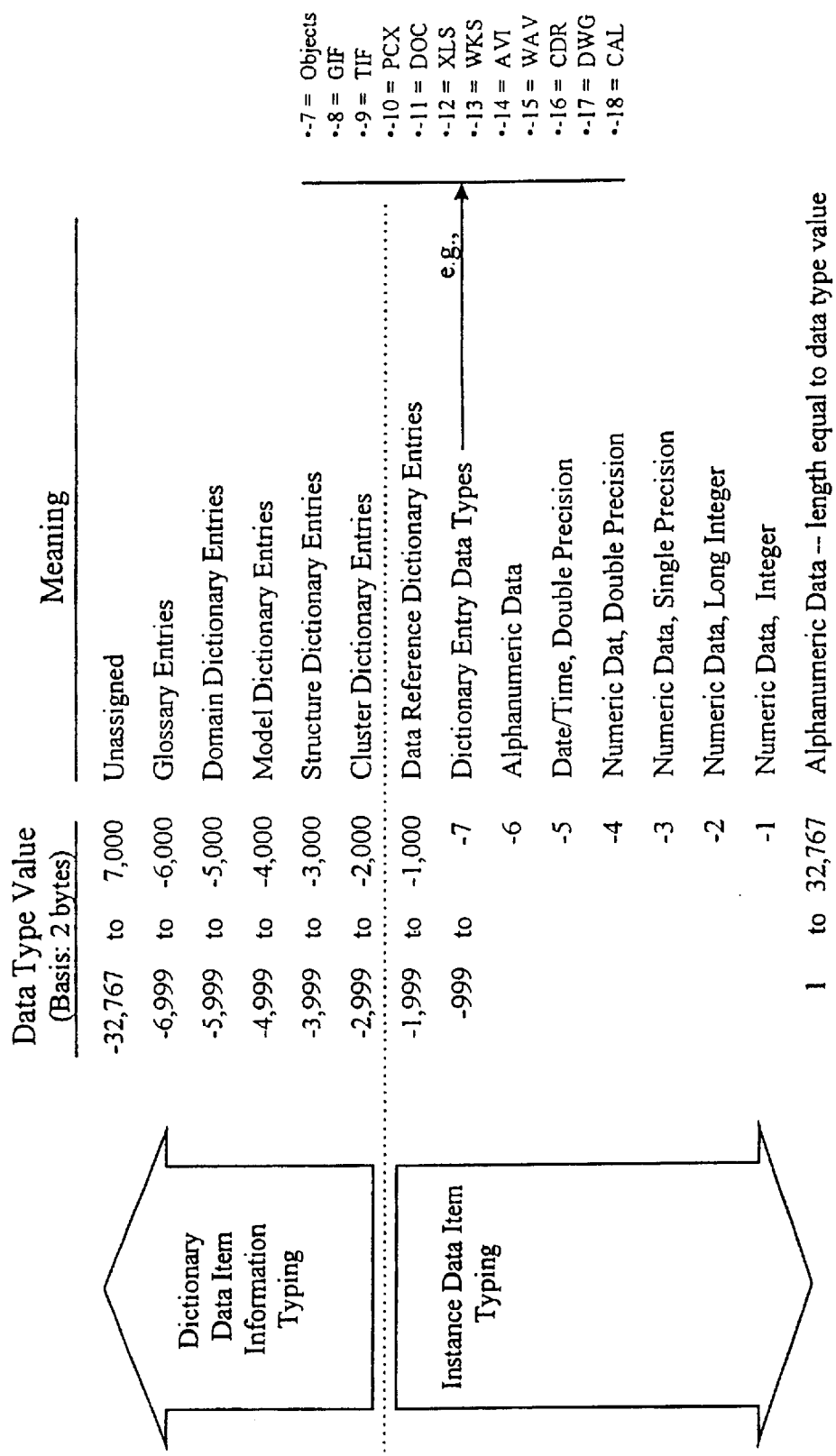

As has been previously noted, 2 byte data typing generally provides an adequate range of values for the typing of instance and dictionary data items. FIG. 17 shows one preferred and unambiguous allocation of segments of the 2 byte data typing range for a portion of the known data types. If a particular application demands more range than is provided here, one can simply switch to 4 byte data typing. As shown in FIG. 18, the data type dictionary formed as indicated at 242 merely records the specific data types by their numbers and their meanings, respectively.

The method of the present invention has no known limits regarding the data types that can be processed in neutral form, including objects and objects containing executables. As is illustrated in FIG. 17, any presently known data type can be accounted for directly in the system. Slots can be created to preserve room for as yet unknown data types to allow for future expansion.

5.2.2 Data Reference Dictionary

Figure 19:
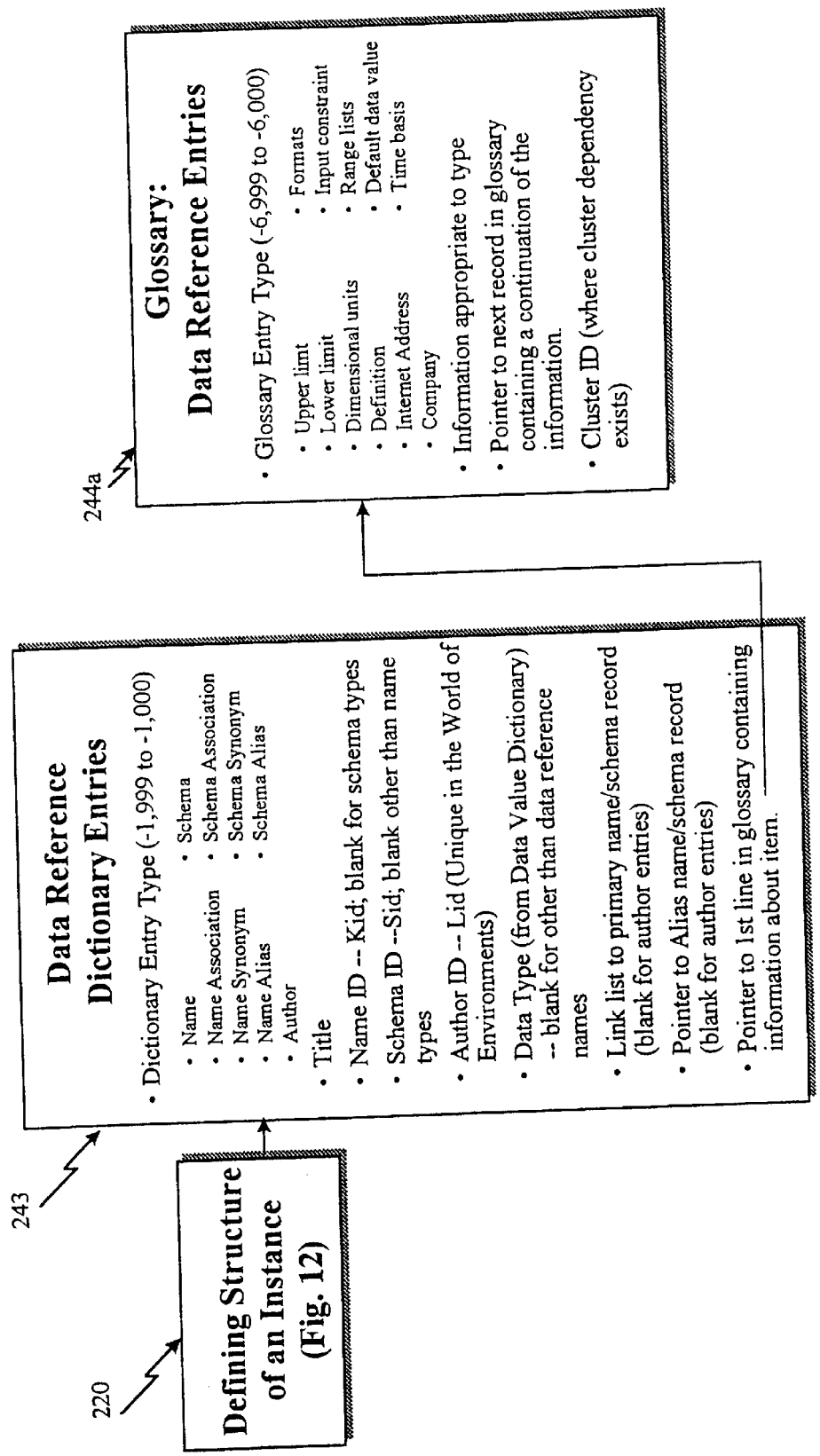

As shown in FIG. 19, the data reference dictionary process in step 243 (FIG. 16) is comprised of two entities, forming the dictionary itself as shown at 243 and forming the associated portion of a glossary as indicated at 244*a*. The name and identification number for a data reference is stored in the dictionary. Its definition and other properties are recorded in the glossary. While not required for the operation of the method of the present invention, the name may be comprised of any number of characteristics. A preferred form includes 3 characteristics: a simple name, a schema name, an author name, and a respective set of corresponding identification numbers. A schema name and identification number provides context for the simple name, while author name and identification number indicate who created the data reference. In small, single user environments, the single characteristic of simple name and its identification number may be adequate. In large environments involving many users and where significant sharing occurs between environments, these additional characteristics of author name and identification number and schema name and identification number allow for useful detailed discrimination of data references. So long as the identification number for the authoring characteristic is unique to all environments, then the identification numbers for the other characteristics need only be unique within the user's own environment, viz., the neutral form file within which he is storing his particular neutral form data.

While not required in a number of cases, provision is preferably made for recognizing and recording aliases of individual characteristics of a particular data reference, notably simple name and schema name. One named data reference characteristic is an alias of another if the definitions and properties of the two are equivalent. In such case, the entry-typing for an alias dictionary record simply designates it as an alias. Each such dictionary entry then includes a pointer to the dictionary record containing the primary of that characteristic and to an additional record of another alias if such exists, thus enabling one to see the collection of aliases as a set and to distinguish one of them as primary.

The preferred embodiment also includes provisions for recognizing and recording one or more synonyms and/or associations, where appropriate, for a characteristic comprising an individual data reference. Again, as with alias recognition, this is not mandatory. One simple name or schema name is a synonym of another if they have equivalent meanings. A name is an association for a simple name or schema name, respectively, if it connotes the same meaning. Collections of synonyms and associations for a data reference can greatly facilitate its location in the dictionary for purposes of dictionary reconciliation (referenced in FIGS. 25 and 26 and to be discussed below).

Any desired property of a data reference can be defined and stored in the glossary of the data reference dictionary. Properties such as those shown at 244*a* in FIG. 19 may be particularly useful. Of course, the actual entries for a particular application will vary. Where a particular property is cluster dependent, that dependency can be accounted for by inclusion of the pertinent cluster identification number with the record.

5.2.3 Data Organization: Generic

Figure 20:
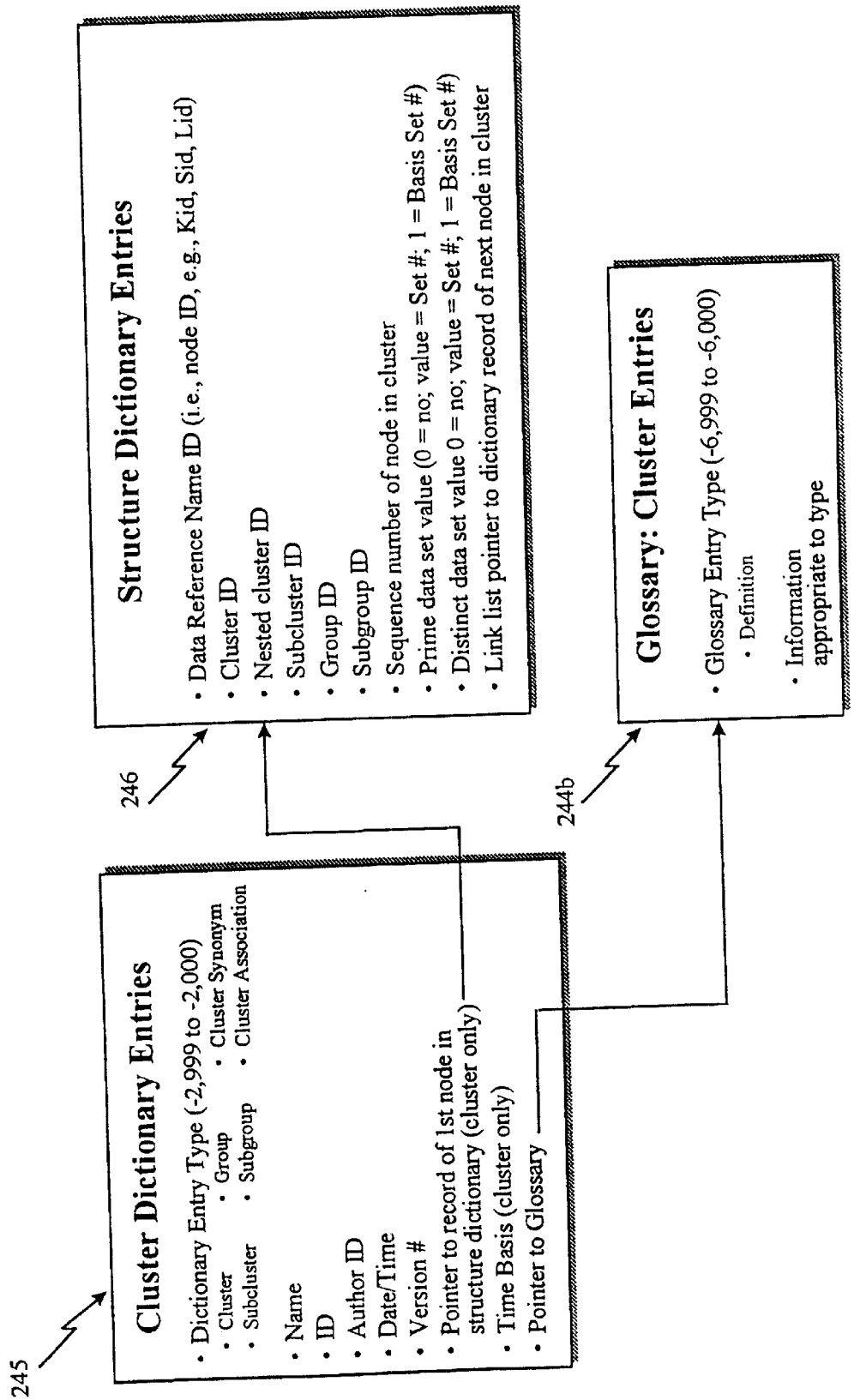

As shown in FIG. 20, generic data organization is contained in two dictionaries, the cluster dictionary formed as shown at 245 and the structure dictionary indicated at 246, together with an associated glossary shown at 244*b*. The cluster dictionary contains the unique name and identification number for each cluster in the environment together with other appropriate characteristics and pointers to the structure dictionary and the glossary. The glossary contains the definition of the cluster. The structure dictionary contains one record for each node in the cluster, together with all appropriate characteristics of that node in that cluster. Each such record is linked via a link list pointer. Note that there can be no two clusters with the same set of nodes, so each link listed group of records also uniquely defines a cluster.

Note that versioning of clusters is allowed. It is by this means that cluster definitions can be changed over time without loss of access to data stored previously under earlier versions of a cluster. Changes to a cluster version trigger a new set of node entries in the structure dictionary.

5.2.4 Data Organization: Specific

Figure 21:
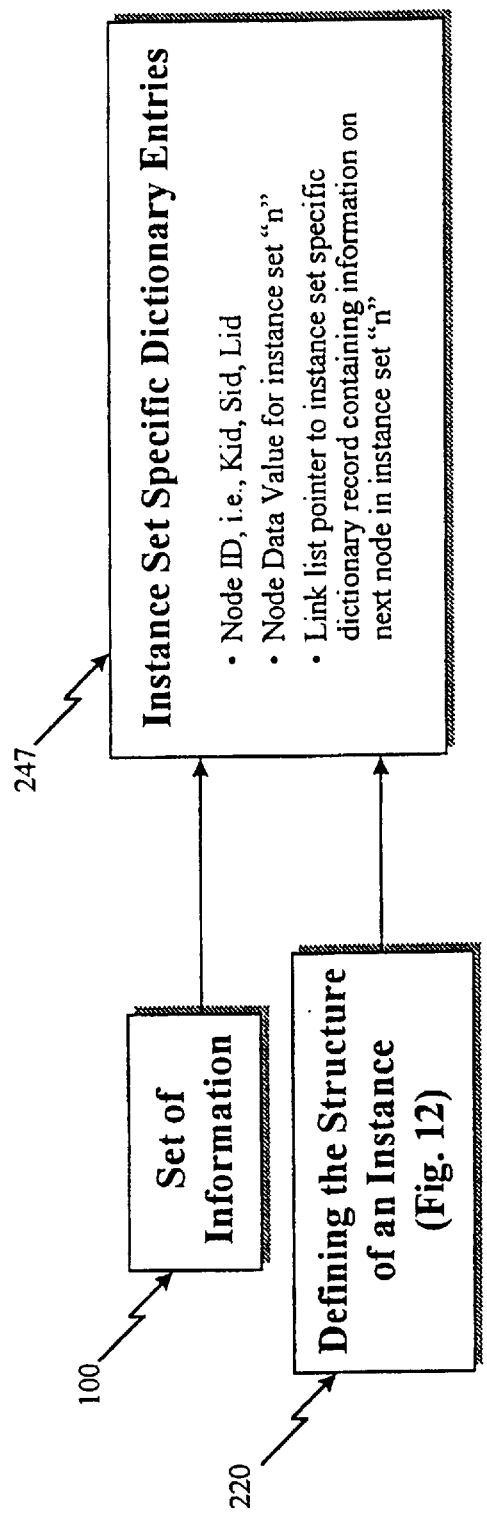

As shown in FIG. 21, specific data organization is contained in a single instance set dictionary formed as shown in step 247. This dictionary consists of link listed records, one for each node in the instance cluster. The distinction from that of the structure dictionary is that each record contains not only the data reference for a node but also the specific data item.

Since no two instance data sets can be the same, there are a set of records in the instance set dictionary for each instance data set in the environment. Overhead for this dictionary may be high, and in such a case the equivalent of this dictionary information can be achieved at much lower overhead by simply link listing the individual records in the neutral form file that constitute one instance cluster. In this approach, the user discerns what cluster and properties being dealt with in a given instance cluster by comparing the list of nodes found in a link listed instance cluster of records of the neutral form file with the nodes in various clusters listed in the structure dictionary. This method is preferred over the more direct method of creating an instance set dictionary.

5.2.5 Model Dictionary

Figure 22:
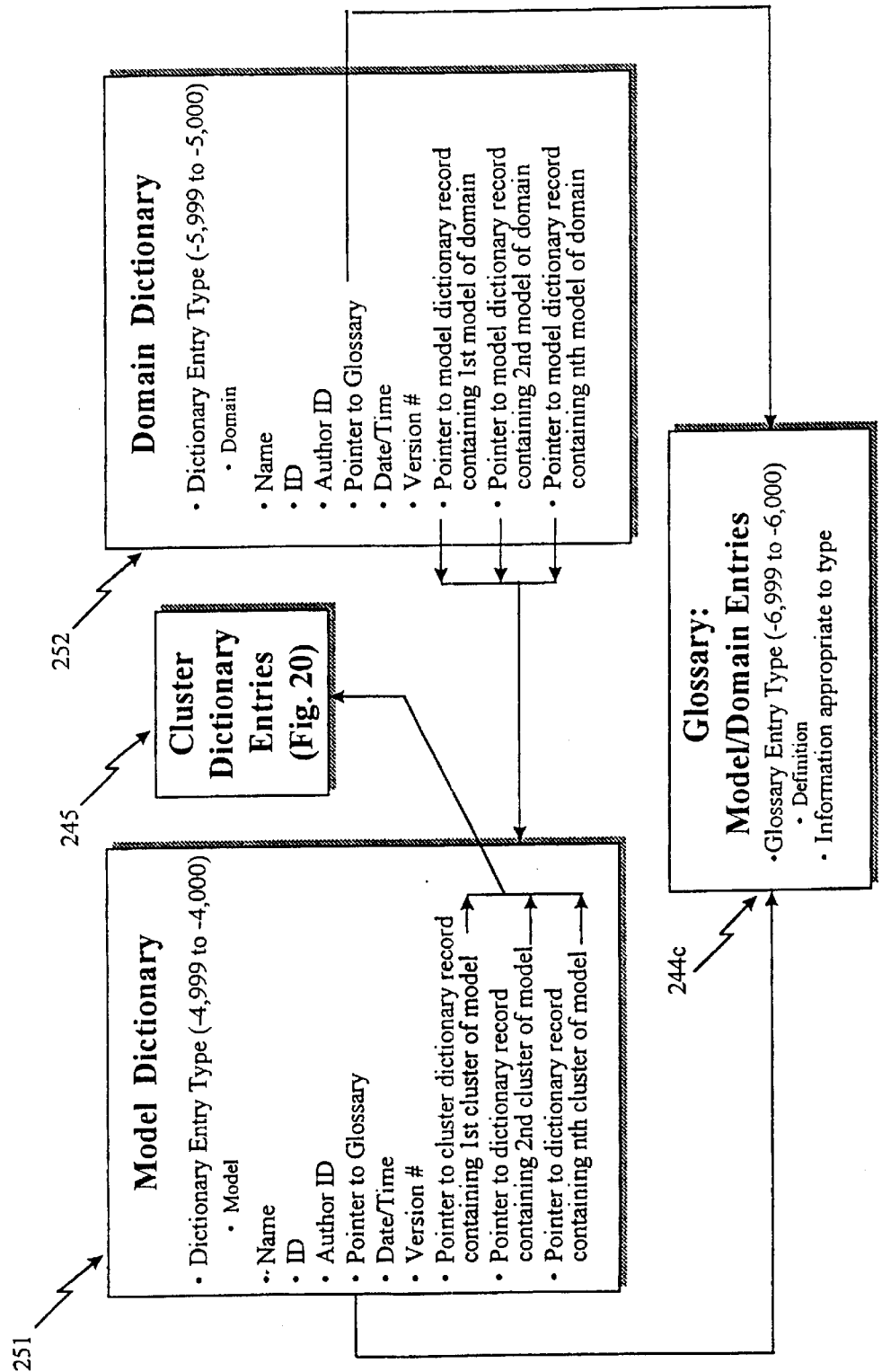

A model defines the structure and properties of instance segments that constitute the instance represented by a set of information. As shown in FIG. 22, the model dictionary is formed as shown at 251 and contains the unique name and identification number of each model in the environment, together with other pertinent properties of the model, including a pointer to the glossary record indicated at 244c containing the definition of the model name. A model is composed of either the single comprehensive initial cluster or the redistributed set of associated, dynamically linked clusters. Each model dictionary record therefore contains pointers to each of the cluster dictionary records that contains one of the clusters in the model. Since clusters, once formed, are autonomous, the model dictionary is optional, describing the path to the formation of a collection of clusters.

5.2.6 Domain Dictionary

Figure 23:
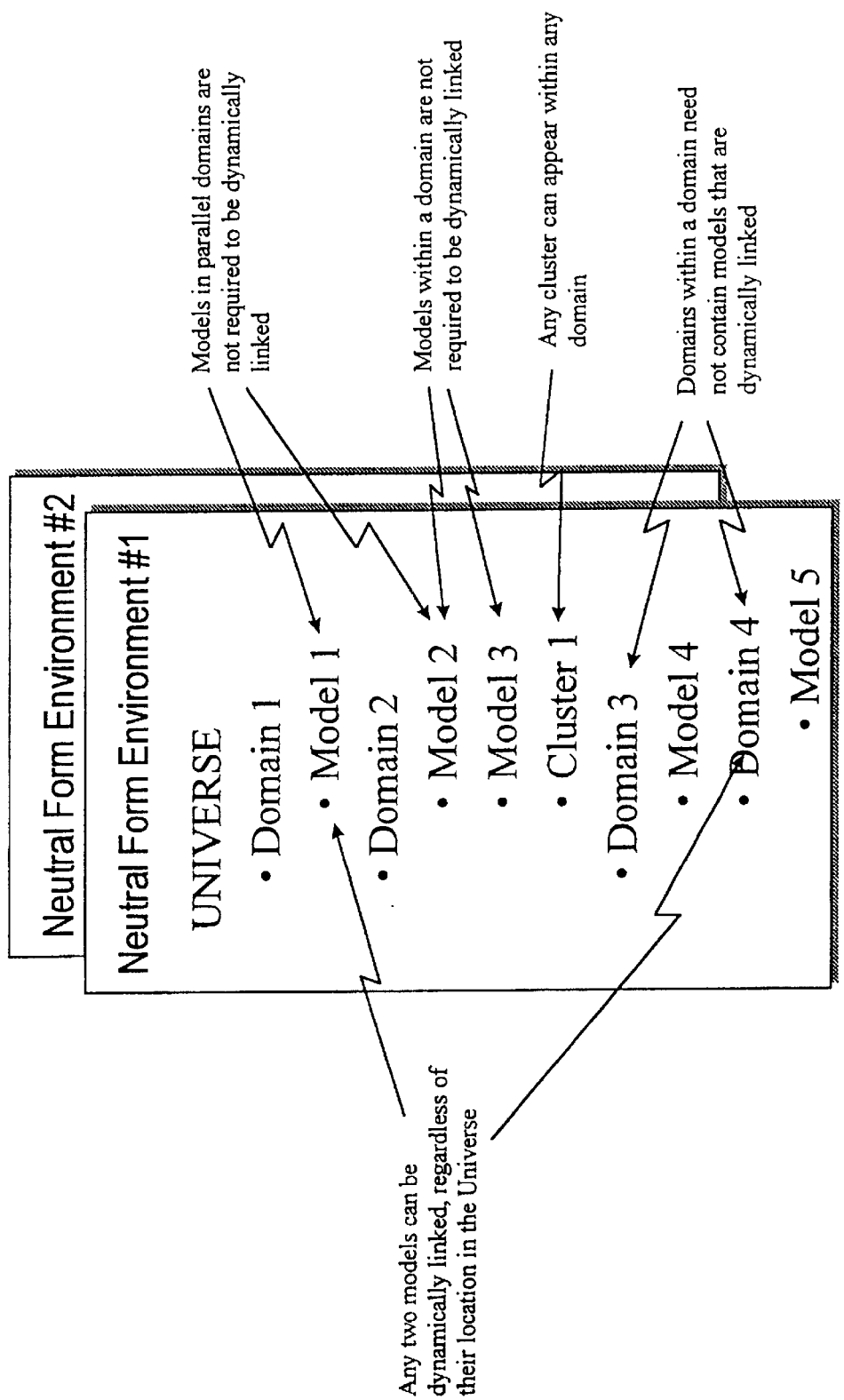

As shown in FIG. 23, a domain contains one or more models or clusters. As shown in FIG. 22, the domain dictionary is formed as shown at 252 and contains the unique name and identification number of each domain in the environment, together with other pertinent properties of the domain, including a pointer to the glossary record indicated at 244c containing the definition of the domain name.

As shown in FIG. 23, models and clusters within a domain do not have to be dynamically linked. Domain simply provides a means for grouping models and clusters together for the convenience of the user. Note that domains can be arbitrarily created, including one within another without any restrictions or requirements on the models involved in those domains. Note also that the presence of models and clusters in two different domains in no way affects the ability of those models and clusters to dynamically link with one another.

An environment, then, is comprised of a set of domains which in turn contain one or more models, clusters and further domains, each of which contain one or more models clusters and domains. Each such environment is distinguished from all others by the particular contents of its dictionary system.

As shown in FIG. 22, the domain dictionary at 252 contains the unique name and identification number of each domain in the environment, together with other pertinent properties of the domain, including a pointer to the glossary record at 244c containing the definition of the domain name.

5.3 Making Changes

Figure 24:
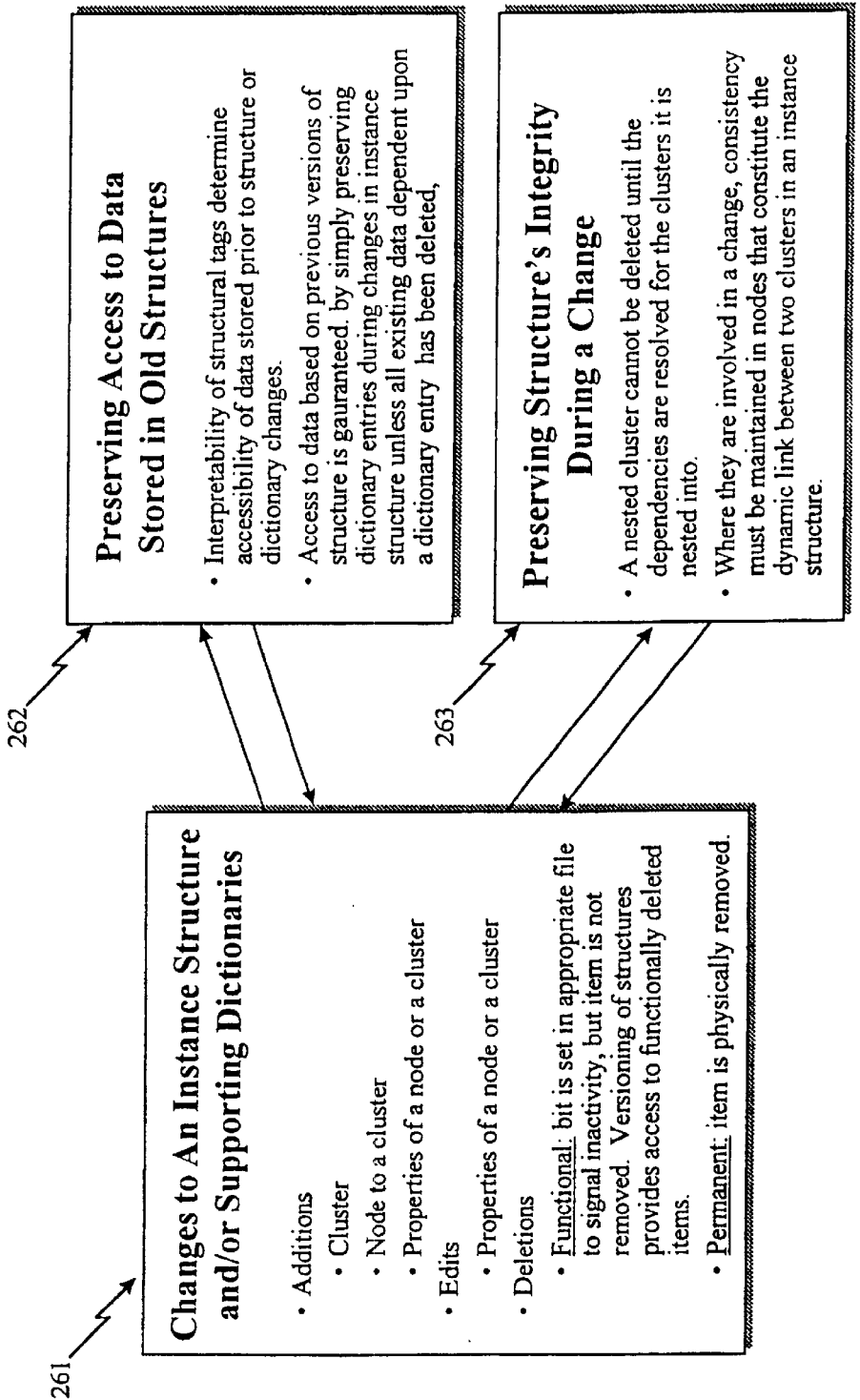

As shown in FIG. 24, changes as indicated at 261 may be made to an instance structure and/or its supporting dictionary data items both before and after data items have been loaded into the environment. Changes 261 can include additions, edits and deletions. Additions can include: new clusters; new nodes to existing clusters; additional properties for an existing node or cluster. Both properties of an existing node and an existing cluster can be edited. Any file record can be deleted either functionally or permanently.

Once data items have been loaded into the environment, changes result in a version change for the cluster involved. Access to data items stored with structural tags from an earlier version of an instance model as at 262, is preserved by simply preserving the dictionary items that are associated with such structural tags that were employed for the neutral form storage of all such data items. Deletions as indicated at 261 can occur either functionally or permanently. In functional deletion, a bit is set in the appropriate file record to signal inactivity, but the record is not removed. Versioning of structures provides access to functionally deleted items. In permanent deletion, the record is physically removed.

Among cluster types, only changes to nested clusters have the potential to affect the integrity of a model structure. Accordingly, nested clusters as shown at 263 cannot be deleted until the dependencies are resolved for the cluster it is nested into. Where a nested cluster is involved in a change, consistency must be maintained in nodes that constitute the dynamic link between two clusters in an instance structure.

5.4 Incorporating Dictionary Data Items into an Environment

Figure 25:
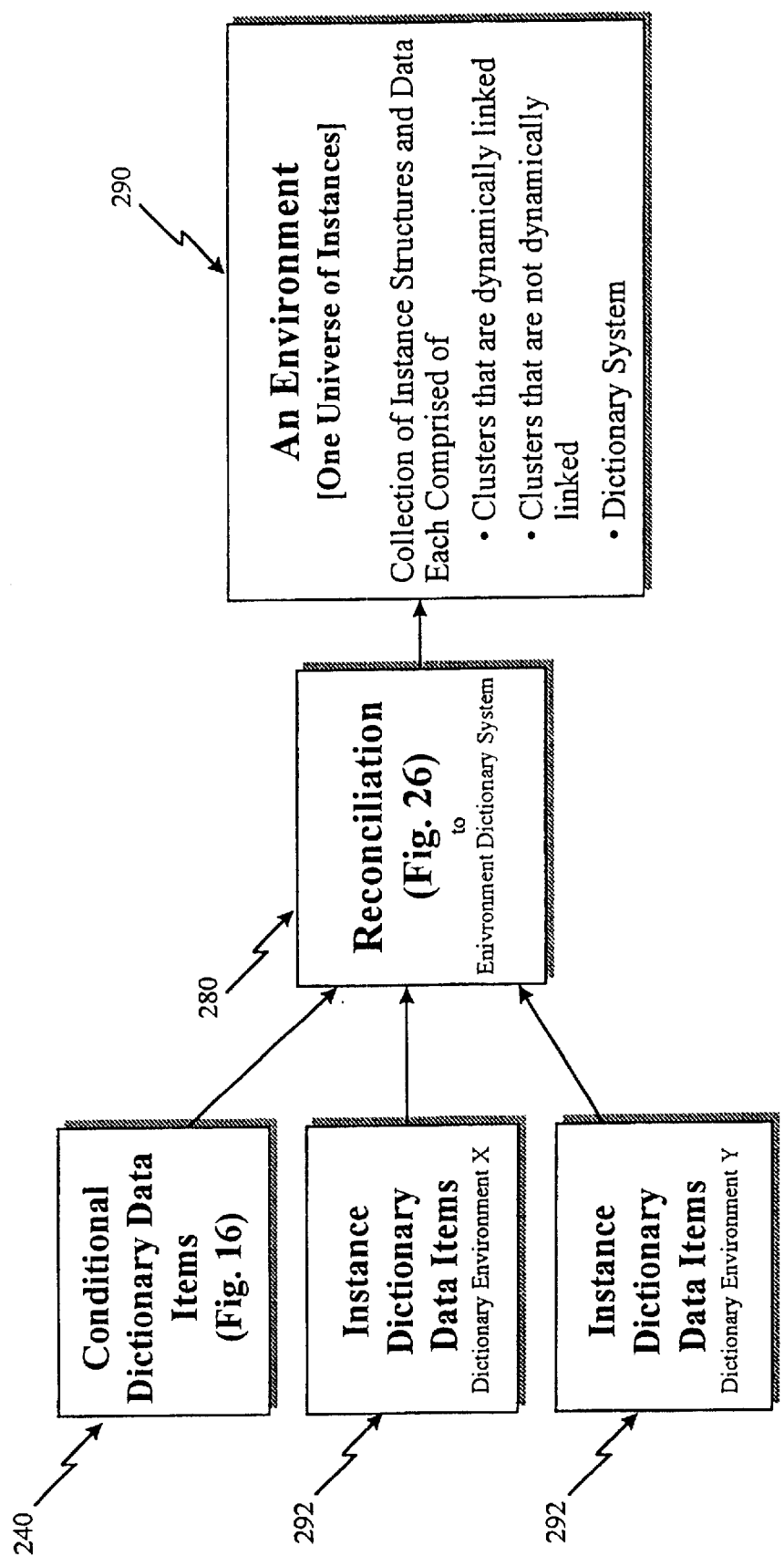

FIG. 25 illustrates schematically the process as indicated at 280 for incorporation of dictionary data items as indicated at 240, 291 and 292 into an existing environment as indicated at 290. An environment consists of a single neutral form file containing one or more sets of information from one or more instance universes and an associated set of dictionary system files. These files can involve models with clusters that are not linked as well as clusters that are dynamically linked. The process is shown applicable both to dictionary items associated with both newly modeled instances as indicated at 240 and also dictionary items created and transferred from another environment as indicated at 291 and 292. In either case, incorporation involves a reconciliation process indicated schematically at 280 of such dictionary items 240 or 292 with the dictionary items already associated with the existing environment and indicated at 290.

Figure 26:
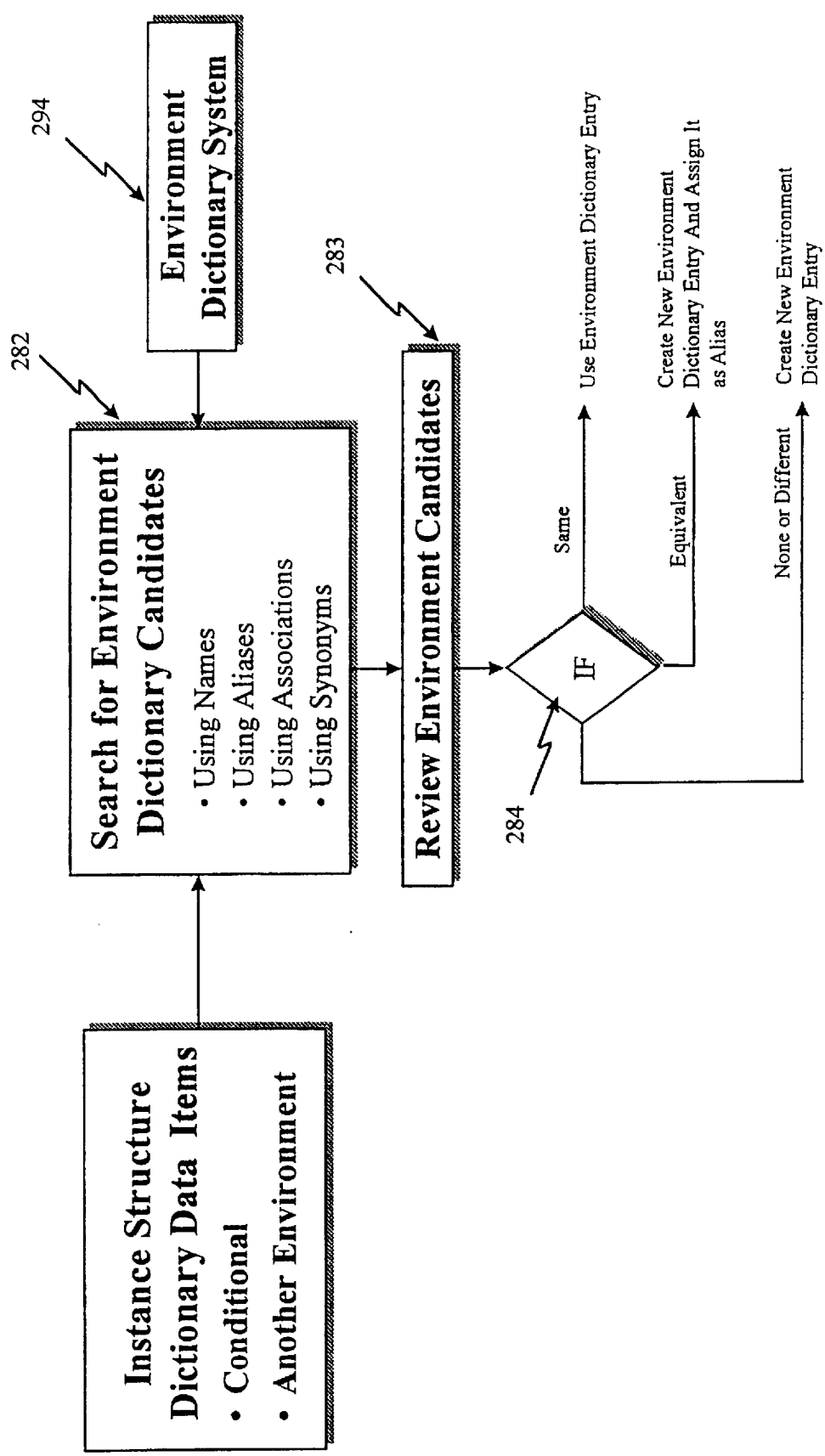

As shown in FIG. 26, the process of reconciliation indicated at 280 first involves the search as indicated at 282 of the existing environment dictionary system 290 for candidate dictionary data items that match each dictionary item being reconciled. The existence of collections of aliases, associations and synonyms on both sides (inbound dictionary data items and system dictionary data items) enhances a user's ability systematically to find candidate matches. For each data item being reconciled, candidate existing dictionary data items are reviewed as indicates at 283 the manner discussed indirectly indicated at 282. The next step is a decision step as indicated at 283 with three alternative outcomes: (1) the inbound and existing dictionary data item are found to be the same, in which case the existing data item is used; (2) the inbound and existing dictionary data item are determined equivalent, in which case the inbound data item is added to the existing dictionary system and treated as an alias; and (3) there is no existing data item that matches the inbound data item which is thus a different or new one, in which case the inbound data item is added to the existing dictionary system as a new data item. Once this process of reconciliation of FIG. 26 is complete, the existing environment can accept and properly tag any instance data sets for storage that rely upon the inbound dictionary data items.

6.0 Data Storage & Retrieval

Figure 27:
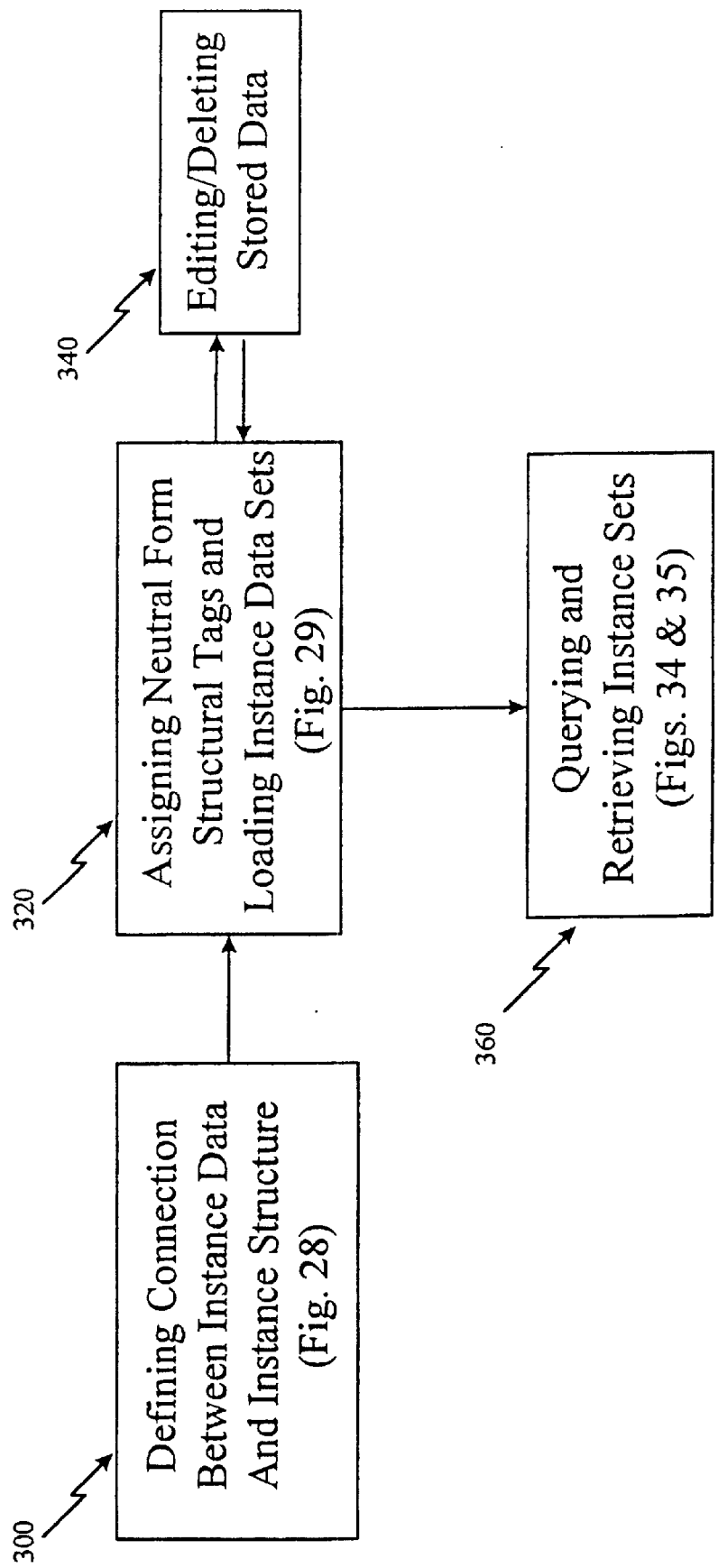

FIG. 27 schematically provides in summary form the basic steps involved in neutral form storage and retrieval of instance data sets according to the present invention once a model has been established within an environment. Initially, a connection between instance data items and instance structure is established as indicated at 300. The neutral form structural tags are then assigned to data items and instance data sets are loaded and stored as indicated at 320, while data already loaded may be edited or deleted as needed as shown at 340. Thereafter, targeted instance data sets are queried and retrieved as illustrated at 360.

6.1 Connection Between Instance Data and Instance Structure

Figure 28:
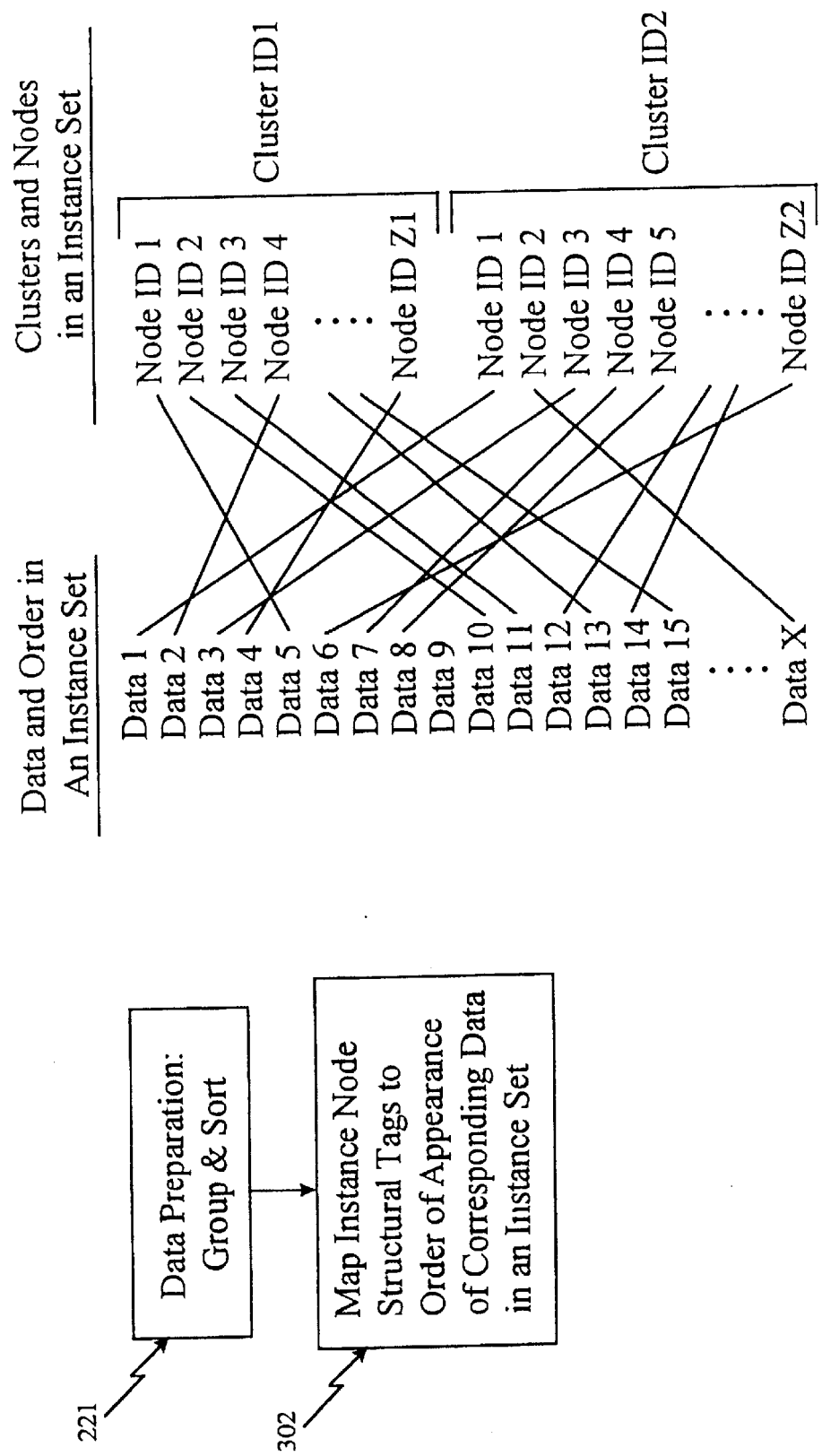

FIG. 28 illustrate the mechanics involved for establishing the connection between an instance data set and the node structure that has been modeled for it. Data preparation according to step 221 (FIG. 12) is performed as discussed previously during modeling to establish the data items in an instance data set and their arbitrary but definable order in a raw data file. The structure dictionary 245 formed as discussed above in FIG. 20, lists the nodes and their arbitrary order in the clusters that define the structure to be used in coding individual data items with structural tags. These two orderings of information from the structural dictionary and instance data set are then joined through a mapping step illustrated at 302. This is done to enable the matching up of data items in an instance data set with their appropriate cluster and cluster node. This mapping according to step 302 is then applied to each successive instance data set during data loading and neutral form coding.

6.2 Assigning Neutral Form Tags and Storing Instance Data Sets

Figure 29:
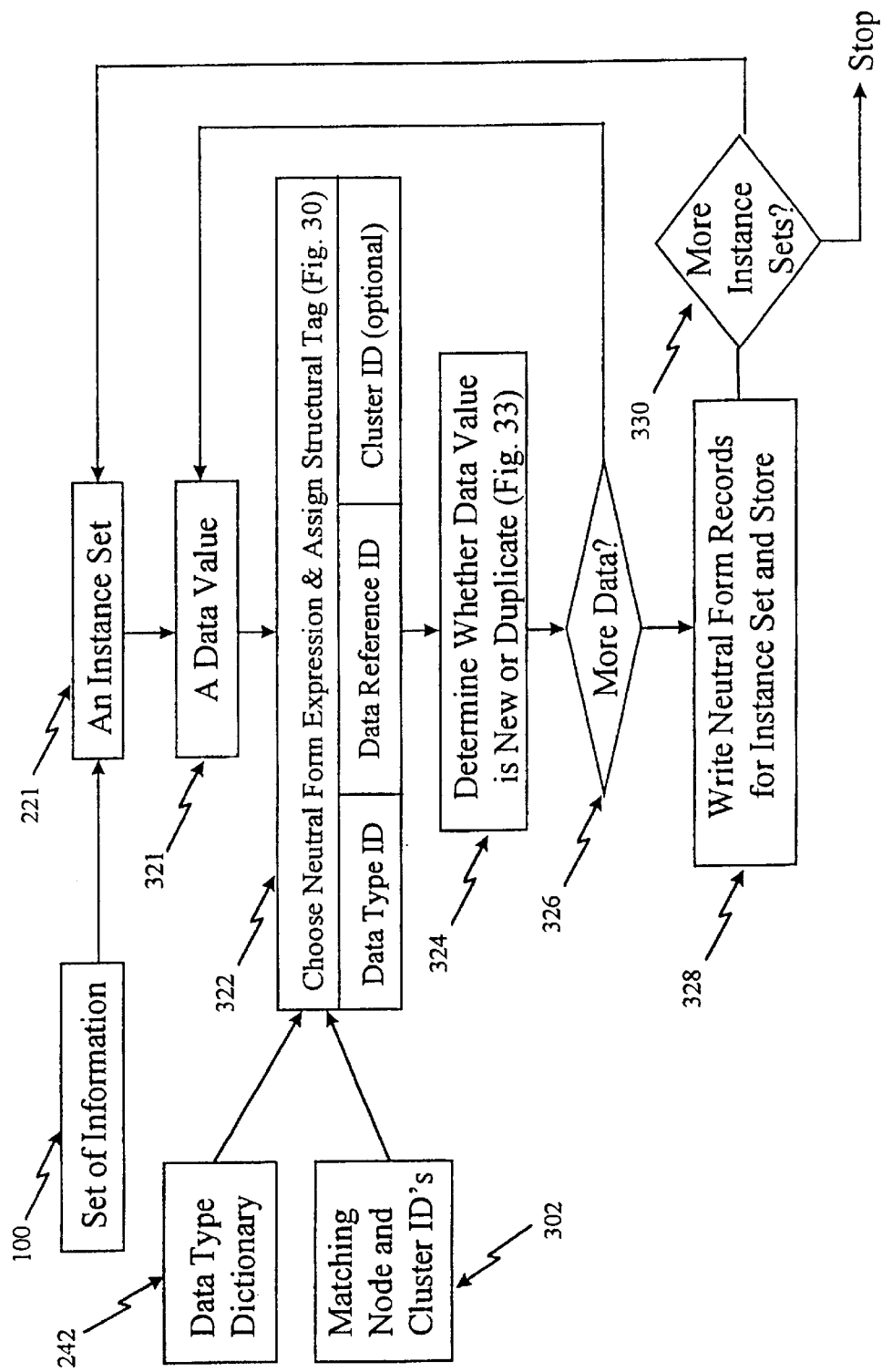

The process step 302 illustrated in FIG. 27 for actually assigning structural tags and then loading and storing data instance sets in neutral form is depicted in further detail in FIG. 29. A set of information 100 is prepared as instance sets 221 in the manner previously described, from which individual data items are drawn at step 321 for structural tag coding. The data type dictionary indicated at 242 and the map of cluster and node matches to data items 302 are used to establish the structural tag for each data item in an instance data set at step 322. The data value indicated previous at 321 is checked as indicated at 324 for whether the value is new or a duplicate. Finally, and as indicated at 326, a determination is made of whether all of the data values for an instance data set have been processed. If they have not, the process returns to the step indicated at 321. Once a full instance data set has been coded as detected in step 326, that data set is written to storage at step 328. The process is then repeated based upon the results of a decision step 330 until all instance data sets have been coded and stored.

Figure 30:
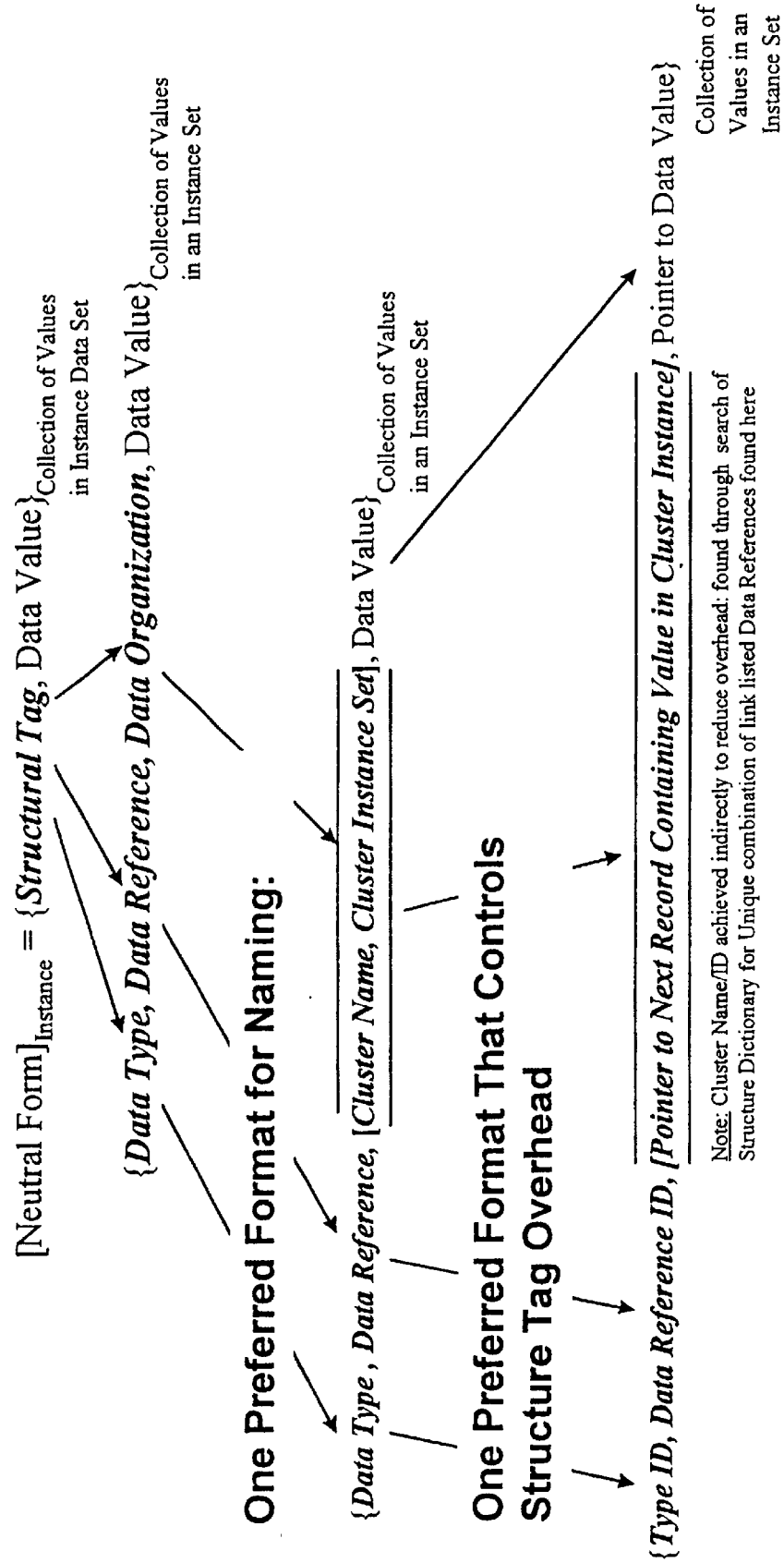
Figure 32:
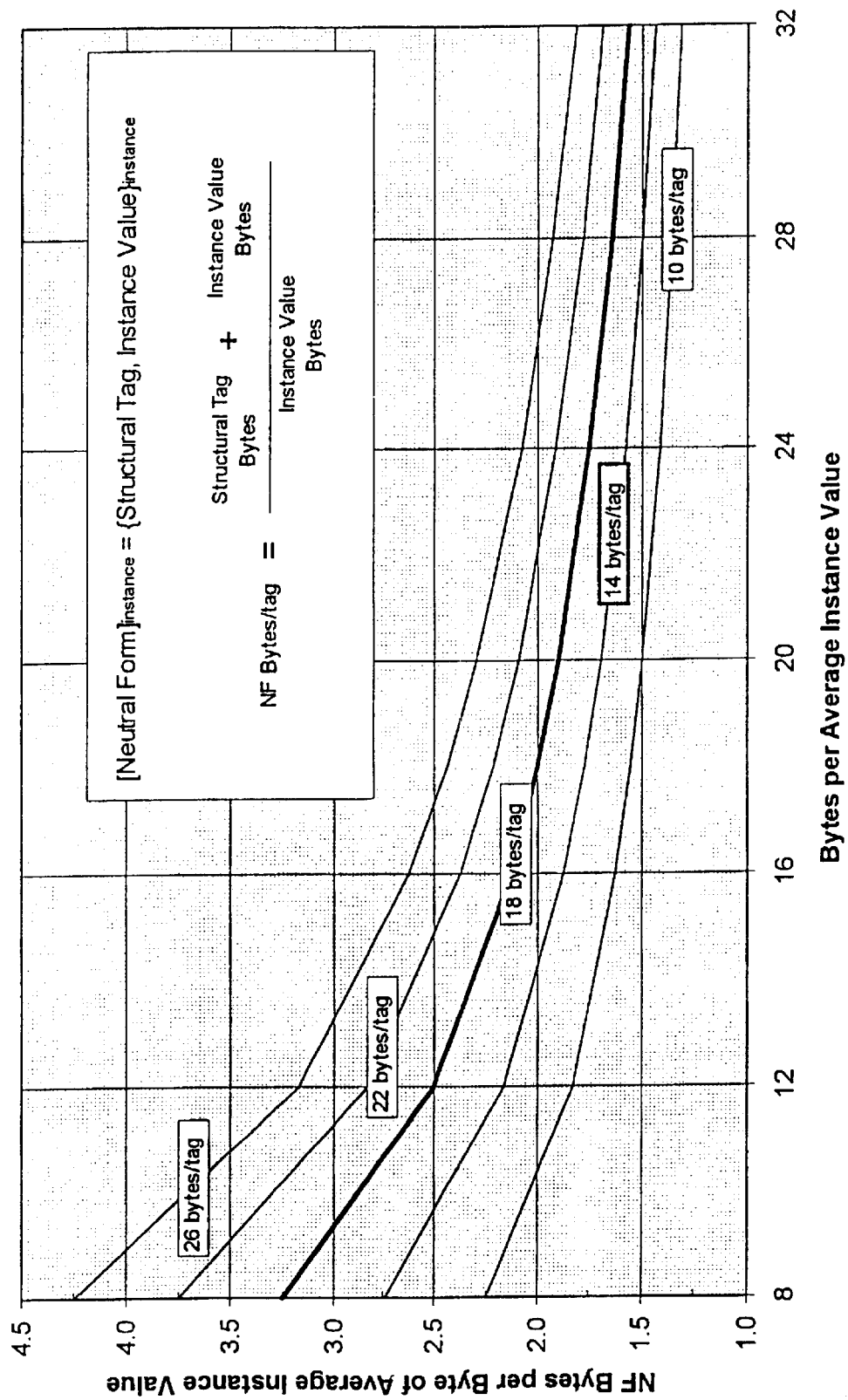

FIG. 30 illustrates schematically the resultant data structure formed in the manner of FIG. 29. As is shown in FIG. 30, the method of the present invention provides great flexibility in the formatting of a neutral form file. The total overhead associated with the structural tagging of data items may vary based upon the formatting conventions that are chosen for the various elements of the structural tag. A preferred example of such formatting is thus presented in FIG. 30. The neutral form file overhead of this particular format for the storage of the structural tag is shown in FIG. 31. It is to be noted that the stated overhead value of 18 bytes in FIG. 31 is achieved by using identification numbers of fixed 4 byte size in place of the actual name of each element in the structural tag. It should also be noted that the 12 bytes assigned for data reference name could be reduced significantly by reducing it from three characteristics there shown (ID for the simple name, i.e., Kid; ID for schema name, i.e., Sid; ID for author name, i.e., Lid) to two or even to one. With only one characteristic used, the total overhead drops from 18 to 10 bytes. The relative significance of a particular number of assigned bytes for a structural tag depends upon the average bytes to be stored for each discrete data value. This is the case provided that no additional space is required to deal with duplicates of individual data values as will be discussed below. FIG. 32 provides a graphical mapping of the total neutral form bytes per data value as a function of the average bytes in a stored discrete data value.

Although it is not mandatory for the method of the present invention, the method can accommodate a variety of techniques for compressing data value storage through the elimination of duplicates. In fact, the embodiment presented here avoids the storage of duplicates entirely. It is to be noted in FIG. 30 that the chosen format involves the use of a pointer in the data item slot of the neutral form, rather than the data value itself. Referring to FIG. 29 it is again noted that, once a structural tag has been assigned, the data value that is to receive that tag is checked against the existing stored data values to determine whether it is new or a duplicate at step 324. A data value pointer in the neutral form record thus allows for the construction of a data values file which stores only discrete data values.

Figure 33:
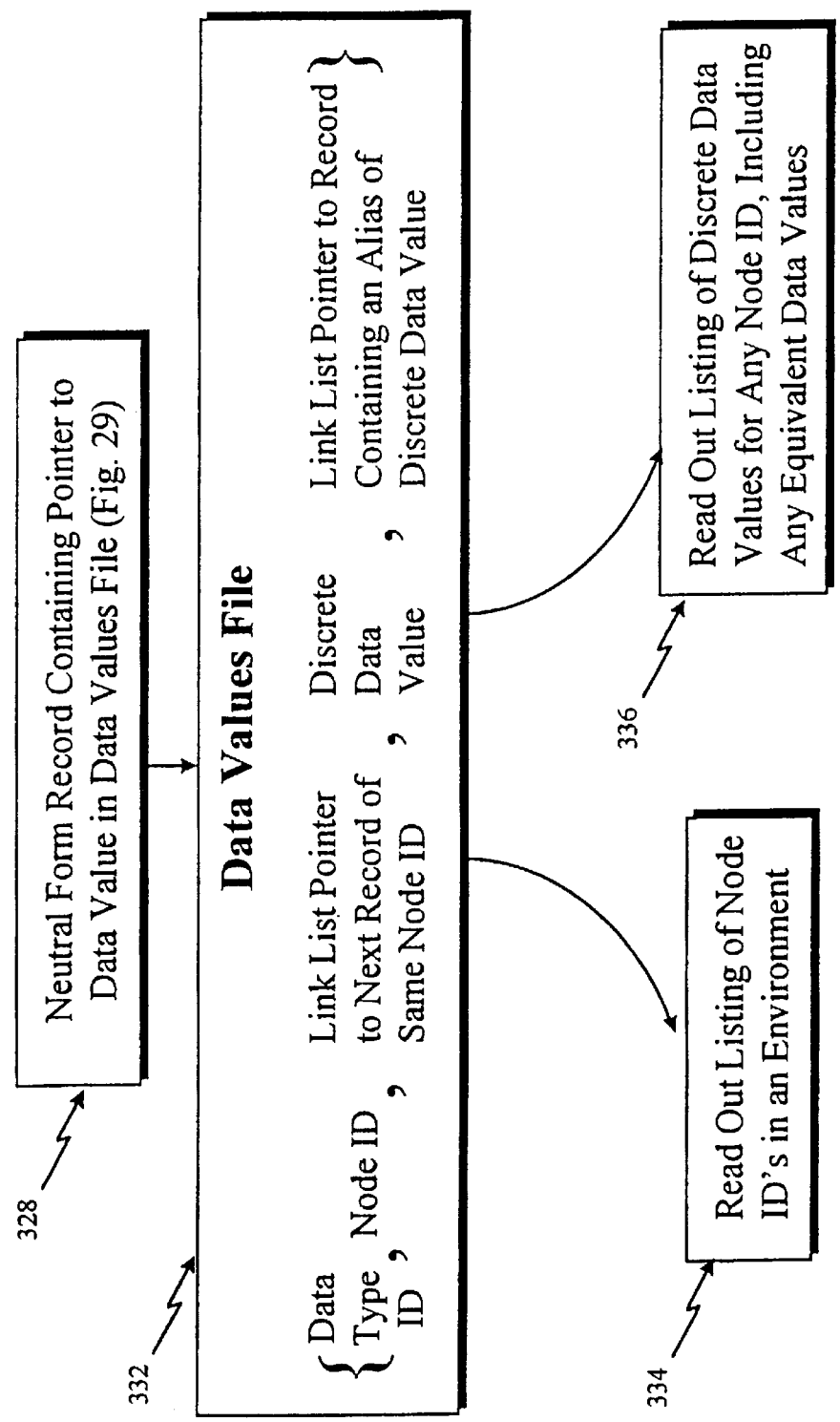

FIG. 33 outlines the structure of this data values file. Neutral form records as illustrated at 328 contain a pointer to the record in a data value file record 332 that contains the discrete data value called for in the neutral form record. If such a record does not exist in the data value file, a new record is created. Separate sets of discrete values records are created in the data values file for each data reference (i.e., cluster node) in the environment. The data values file can then be read as shown at 334 for the listing of all data references in the environment 332 and shown at for the listing of all discrete data values for each such data reference.

The data values file 332 (FIG. 33) provides for the recording of any existing equivalency between discrete data values through the use of link list pointers. Once a set of information has been loaded into an environment, a user can call up and review the list of the discrete values formed in step 332 and mark those pairs that are known to be or considered to be equivalent, e.g., "heat exchanger" and "heat exchanger" or "Moyno pump" and "Moynoe pump" or "Asst. Superintendent" and "Assistant Superintendent." A link list pointer is then assigned to each such discrete data value record which points to the record which contains such indicated or equivalent data value. This equivalency, once established, applies to all past and future loading of any sets of information containing such data values for the specified data reference.

6.3 Changing Data Items Once They are Loaded

Edits and deletions can be performed on data items after they have been structurally tagged and loaded. With the present invention, this can be easily accomplished. All that is required is to treat edited data values as new data values.

If after completing the editing of a data value it is found that the edited form of the data value already exists in the data values file 332, the pointer in the neutral form record is shifted to this data value record; if it does not, a new record is created. In a separate maintenance step, the initial data value that was the target of the editing can be deleted. That deletion will be restricted to a functional deletion if that data value is in use somewhere in the environment. It can be permanent if no such dependency exists. Of course if existing dependencies can be eliminated then a functional deletion can be converted into a permanent one.

6.4 Querying and Retrieving Data

The process of retrieving targeted instance data sets involves the formulation of a query specification and a search of neutral form records for compliant instance data sets. Query specifications can involve single or multiple clusters. In the case of multiple clusters, the clusters will be dynamically linked.

6.4.1 Single Cluster Search

Figure 34:
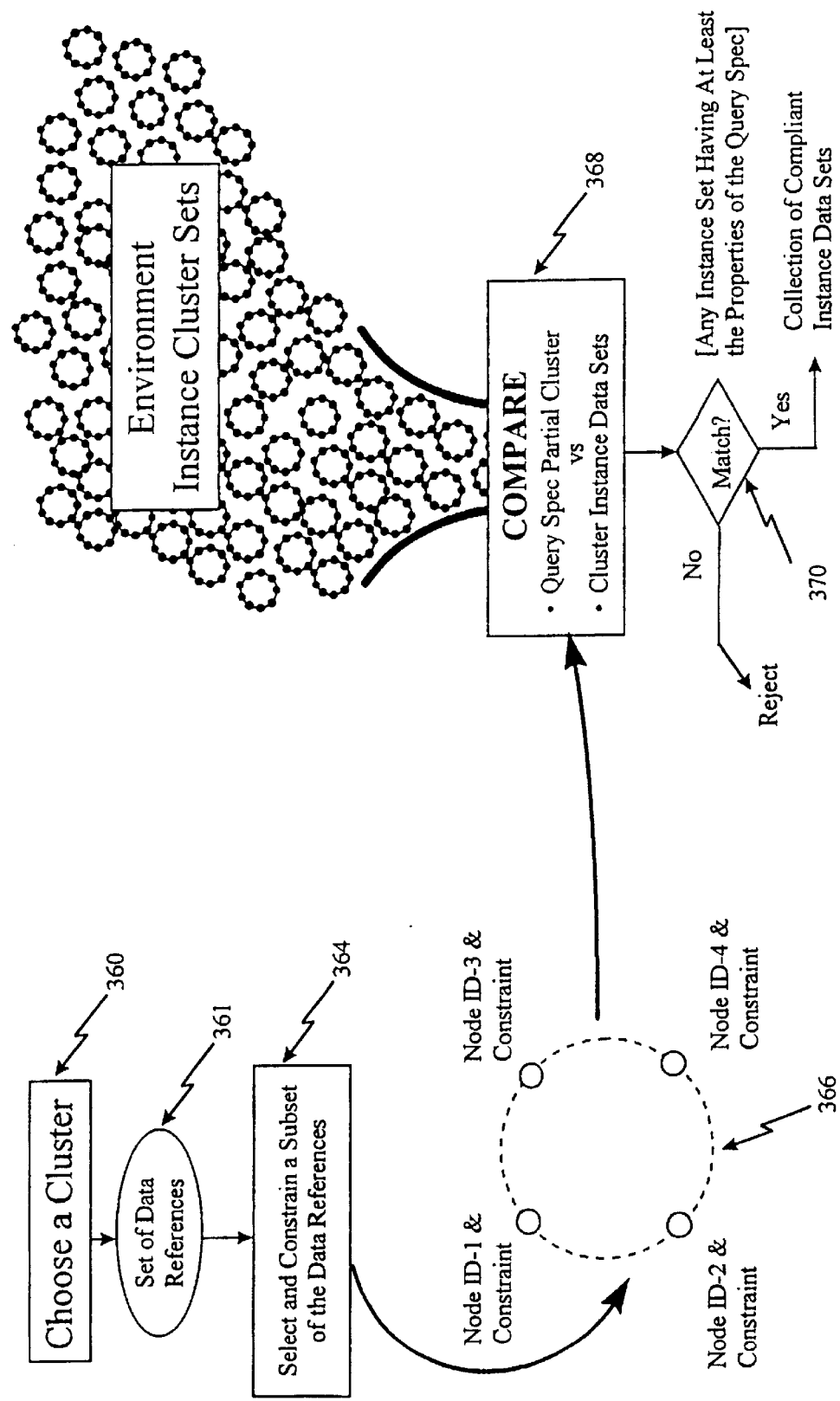

FIG. 34 summarizes the steps involved in a single cluster search. First a cluster is chosen as shown at 360 from the environment of available clusters. Second, the list of data references for that cluster is read at step 361 and a subset of them are selected at step 362 for the specification of query constraints. The list of discrete data values for each selected data reference is then read and one or more values are chosen as constraints for the search. Alternatively, a logical or algebraic expression can be composed as the form of the constraint for a data reference. The resulting collection of data references and their associated constraints constitute a query specification indicated schematically at 366 for the search. Individual neutral file records are then searched sequentially at step 368, in an iterative manner indicated by decision, one cluster instance data set at a time, for compliance with the query specification. The resultant conforming set of cluster instances found on completion of the sequential search represents the result to the query.

6.4.2 Multiple Cluster Search

Figure 35:
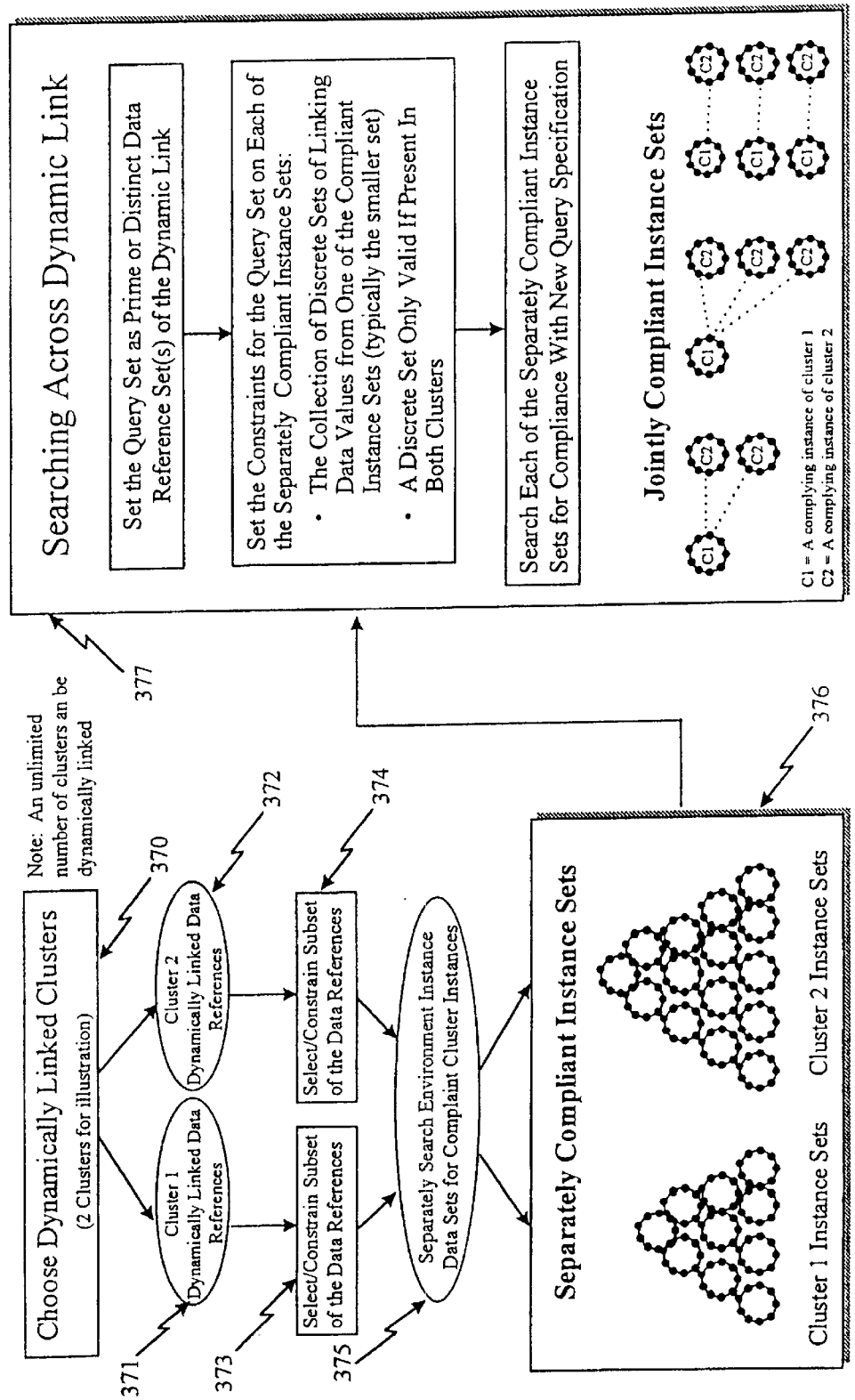

One skilled in the art will appreciate that many different methods are possible for executing a multiple cluster search. A variety of circumstances will dictate from one application to another which method is preferred. FIG. 35 merely illustrates one method and the set of steps involved. At step 370 a user first chooses a set of dynamically linked clusters as the basis for his search. For purposes of illustration, two such clusters are shown in FIG. 35. The process would merely be repeated for additional dynamically clusters, carrying along the previous results as the basis for the search of the next dynamically linked cluster. Each cluster is initially addressed separately. The collection of data references in clusters 1 and 2 that are part of the universe of the instance defined by the prime or distinct data reference set or sets forming the dynamic link are first identified in steps 371 and 372, respectively. From these data reference sets one or more data references are selected from each cluster and constraints are defined as illustrated at 373 and 374, for example by specifying one or more values from the list of discrete values for a data reference. Each of the resulting query specifications from steps 373 and 374 is then applied separately in a sequential search of the neutral form records at step 375. Complying cluster instances may be found, each conforming to one portion of the total query specification, but not necessarily to both as shown at 376. Therefore, a second round of searching at step 377 is performed on the pool of clusters found in the first round of searching of step 375. The second search in step 377 is configured to search for the subset of cluster instances whose dynamically linked data references share matching instance values. Complying matches are cluster instance specific.

6.4.3 Identifying Clusters that Have Dynamic Links

Data references and data values from any combination of dynamicallylinked clusters, regardless of their domain location within the environment can participate in a single query specification. One skilled in the art will appreciate that there are many different methods that could be employed for identifying a set of dynamically linked clusters within a given environment. By way of illustration, a user can search the environment for dynamically linked clusters to determine what relationships exist and upon which he can therefore build a query specification. This is accomplished by first establishing a lead cluster. Each of the prime or distinct data reference sets in that cluster are separately used as the basis for a search of the cluster dictionary records for those clusters which contain the same prime or distinct data reference set or sets of nodes. Any such cluster is dynamically linked with the first cluster, regardless of whether these nodes are unmarked in the respective cluster or marked as belonging to either a prime or a distinct data set. The particular data references in those clusters that validly participate in the dynamic link then are those that belong to the universe of the instance defined by the prime or distinct data reference set or sets acting as the basis set. One method discovered by and currently preferred by the inventors for identifying such data references involves assigning relative granularities to a data reference, one for each prime or distinct data reference set that it is associated with. Those data references with a granularity that does not exceed that of a particular prime or distinct data reference set are then part of the universe of the instance that is defined by that prime or distinct data reference set.

6.5 Capacity for Efficiencies in Storage & Retrieval

Depending upon the application involved, there may be many opportunities for efficiencies in the storage and retrieval of neutral form information. The following are merely provided as examples.

6.5.1 Minimizing Space Required for Structural Tag

As noted above, FIG. 32 demonstrates the wide variety of overheads that are possible in structural tagging. Many techniques are possible for controlling and reducing this overhead with the present invention.

6.5.2 Minimizing Space Required for Data

Already addressed has been one technique for reducing data value storage space through the elimination of duplicates. Other techniques may be possible. They should also be applicable to the method of the present invention.

6.5.3 Maximizing Data Retrieval Speed

It should also be appreciated that there are many techniques available for facilitating the basic search process. Such techniques are generally referred to in the art as data indexing techniques, and are also applicable to the method of the present invention.

Those in the art will also appreciate that there are many techniques that can be applied to optimize the path taken and therefore the speed of the cascading search process that occurs when a query specification involves two or more clusters.

7.0 Data Transfer

Results of a query and retrieval operation on a neutral form environment can be transferred directly in their neutral form. However, to be interpreted, the receiving party also requires the dictionary data items that define the meaning of the structural tags used in the neutral file. These dictionary data items are readily identifiable from the set of structural tags present in the file to be transferred. As shown in FIG.

Figure 36:
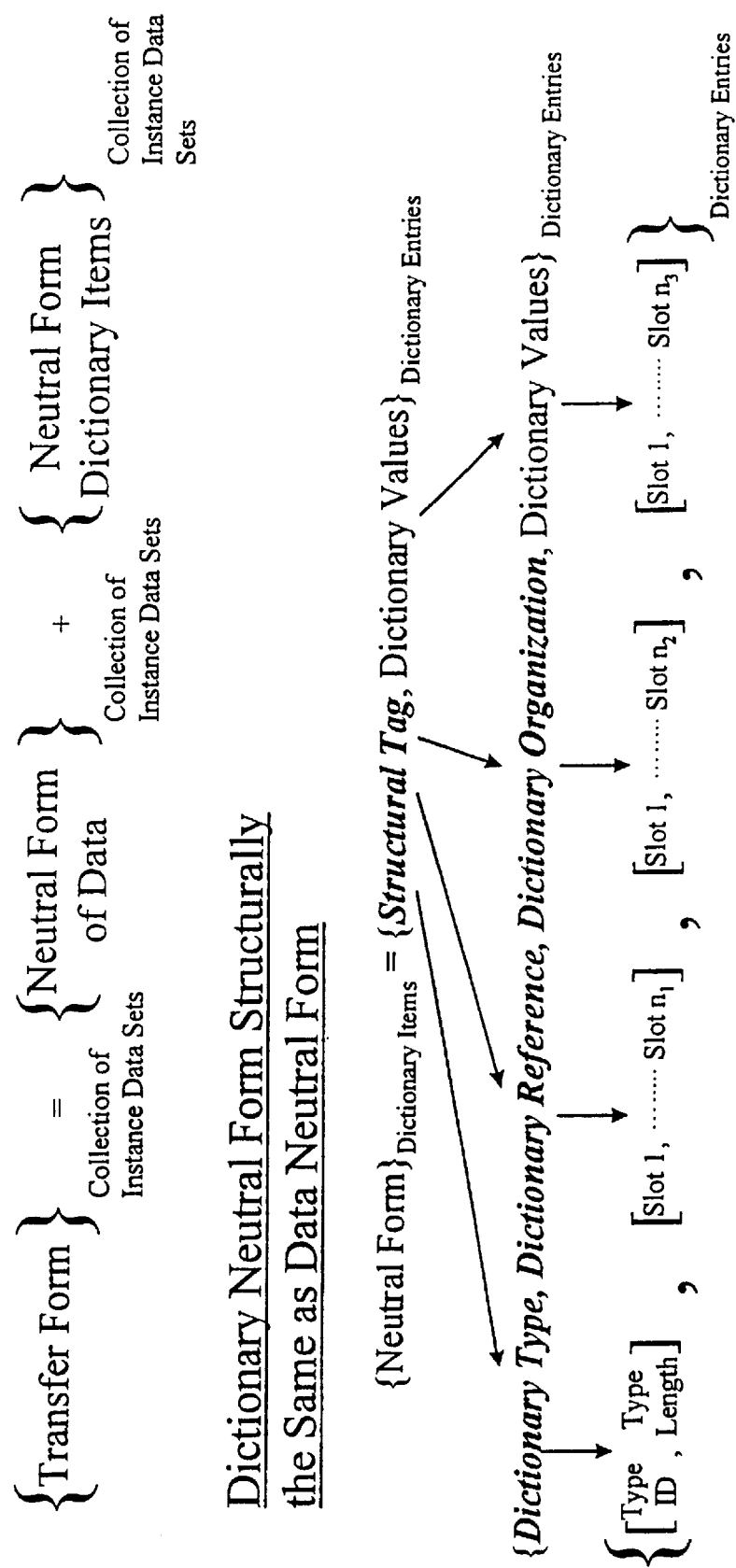
Figure 38:
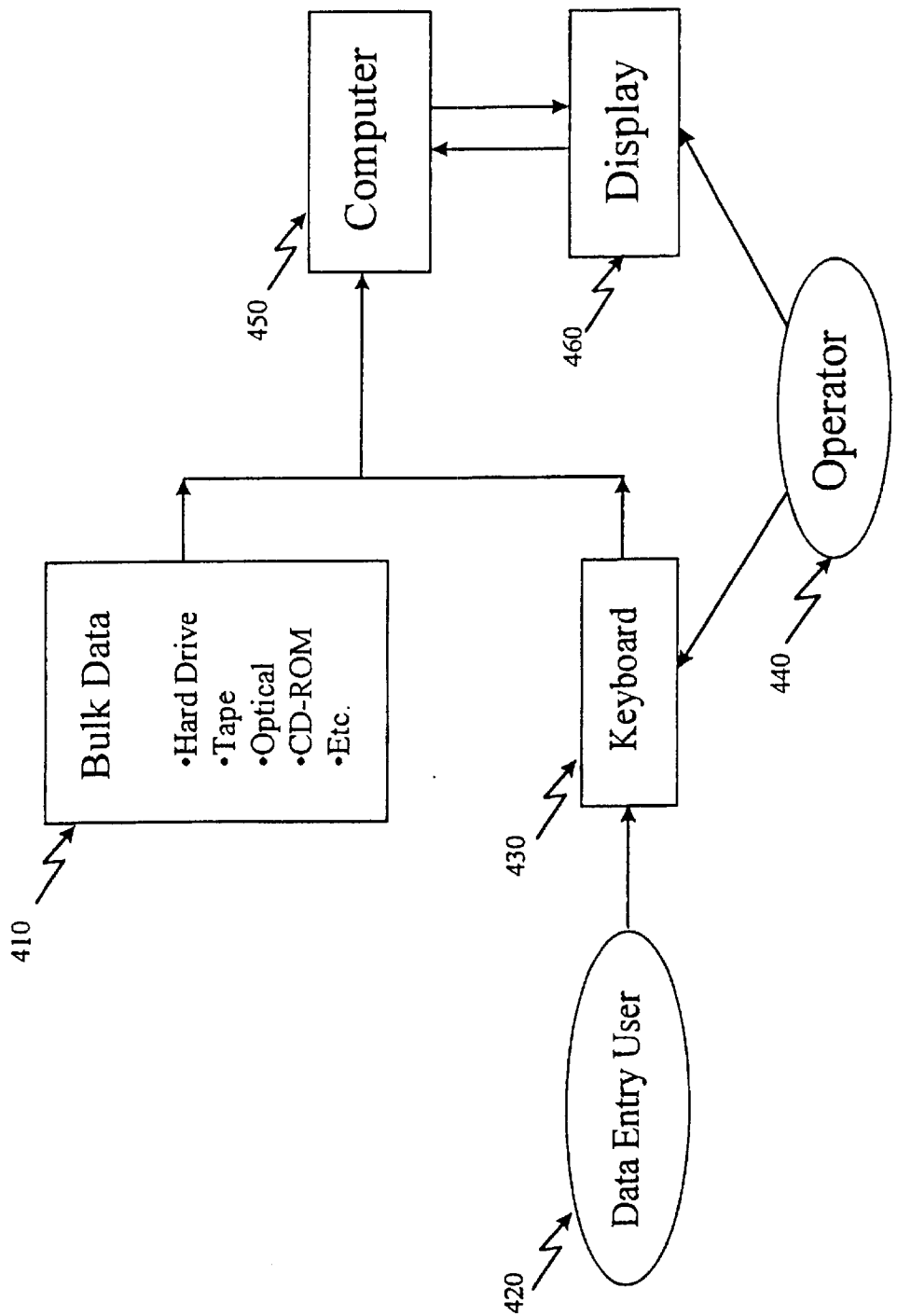
FIG. 38 is a schematic flowsheet diagram of implementation of the present invention in a computer system.
Figure 39:
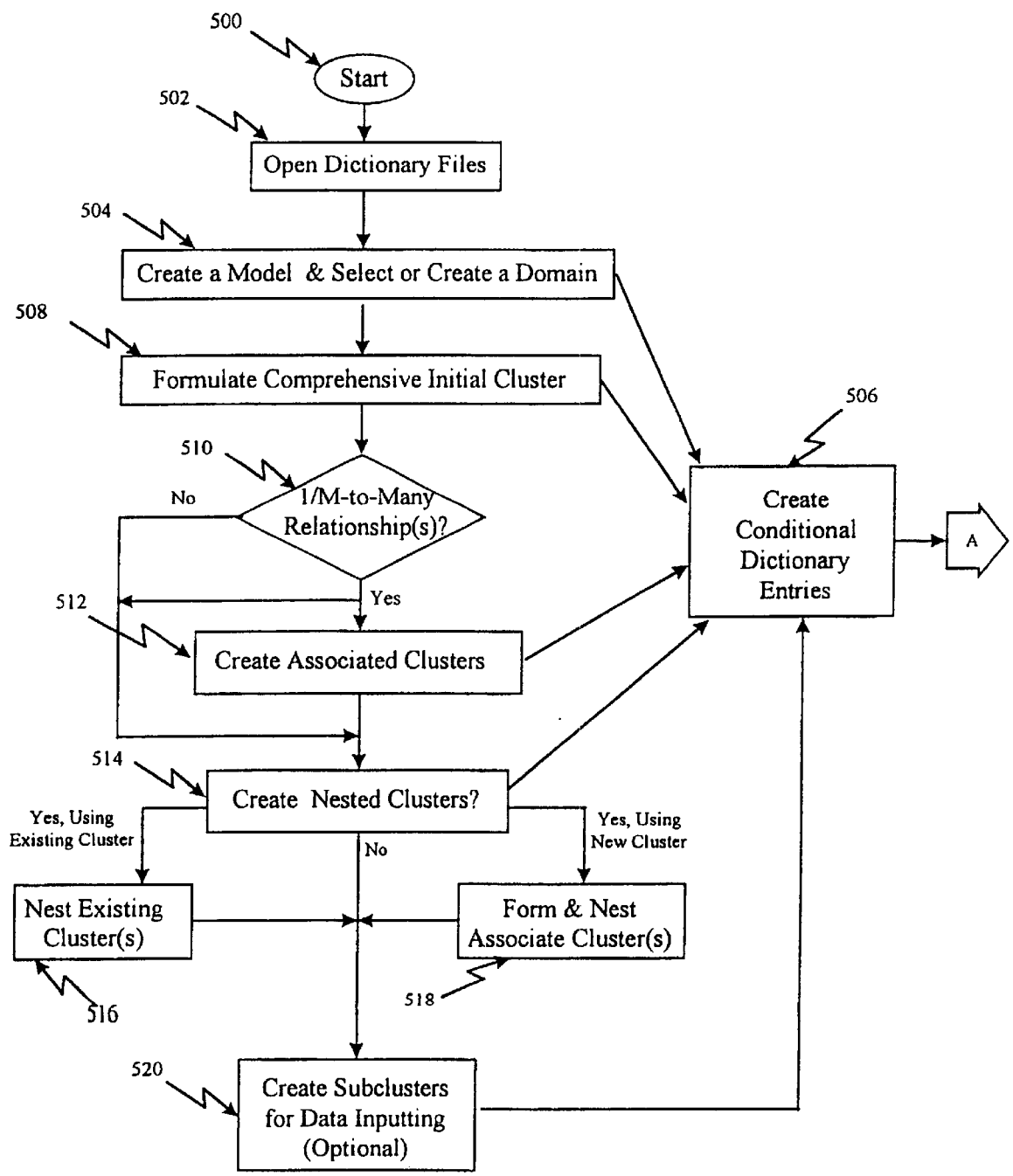
FIGS. 39, 40, 41, 42, 43 and 44 are more detailed diagrams of the flowsheet of FIG. 38.

36, the data items are simply converted to neutral form and added to the file of instance data sets already present in neutral form. This produces a complete and self-contained neutral form transfer file. The universal data typing discussed above with respect to FIG. 17 enables this writing of such dictionary data items in compatible neutral form. FIG. 36 outlines the structure of the records that make up the neutral file form of dictionary data items in this form. FIG. 37 provides an example of the application of this form to the construction of structural tags for selected dictionary data items.

8.0 Computer Program

FIGS. 38 through 44 inclusive specify a computer system and illustrate a flow chart of a digital computer program for performing the method of the present invention for modeling, storing and transferring data items and information on that computer system. Further details for many of the steps outlined in the flowchart of FIGS. 38 through 44 are to be found in the subject matter of FIGS. 10 through 38 discussed above.

Input data are originally provided to the computer in the form of either bulk data 410 (FIG. 38) or batch data fed by a data entry user 420 through a keyboard 430. An operator 440 then turns over initial control of the computer 450 to the computer program for execution of a start instruction 500 (FIG. 39) after which control is transferred to an instruction 502 causing the computer 450 to open a set of dictionary files for the data modeling operations described below.

The operator enters information needed to create a model and domain at step 504 for the data model. By instruction 506 the computer stores the created information as conditional dictionary data items and then proceeds to execute instruction 508 with interactive inputs where necessary from the operator 440. When instruction 508 has been completed, the computer stores the results as conditional dictionary data items 506 and then proceeds to execute instruction 510 with appropriate input from the operator. If the operator indicates that a one-to-many relationship exists and he wishes to transfer it to one or more associate clusters, the computer proceeds to execute instruction 512 with appropriate inputs from the operator.

At the completion of instruction 512, the computer stores the results as conditional dictionary data items in step 506 and then proceeds to executive instruction 514. If no one-to-many relationships are indicated to exist, the computer bypasses instruction 512 and proceeds directly to execute instruction 514 with appropriate operator input. If the operator requests formation of a nested cluster from an existing cluster, the computer proceeds to execute instruction 516 with appropriate input from the operator.

At the completion of instruction 516, the computer stores the results as conditional dictionary data items 506 and returns to execute instruction 514 again until no further nested clusters are called for by the operator, after which point the computer next proceeds to execute instruction 520 with appropriate input from the operator. If the operator requests the formation and nesting of an associate cluster, the computer proceeds to execute instruction 518 with appropriate input from the operator.

At the completion of instruction 518, the computer stores the results as conditional dictionary data items 506 and returns to execute instruction 514 again until no further nested clusters are called for by the operator, after which the computer proceeds to execute instruction 520 with appropriate input from the operator. If no nested clusters are called for by the operator, the computer bypasses instructions 516 and 518 altogether and proceeds directly to execution of instruction 520 with appropriate input from the operator. At the completion of instruction 520, the computer stores the results as conditional dictionary data items 506 and returns control to the operator.

Figure 40:
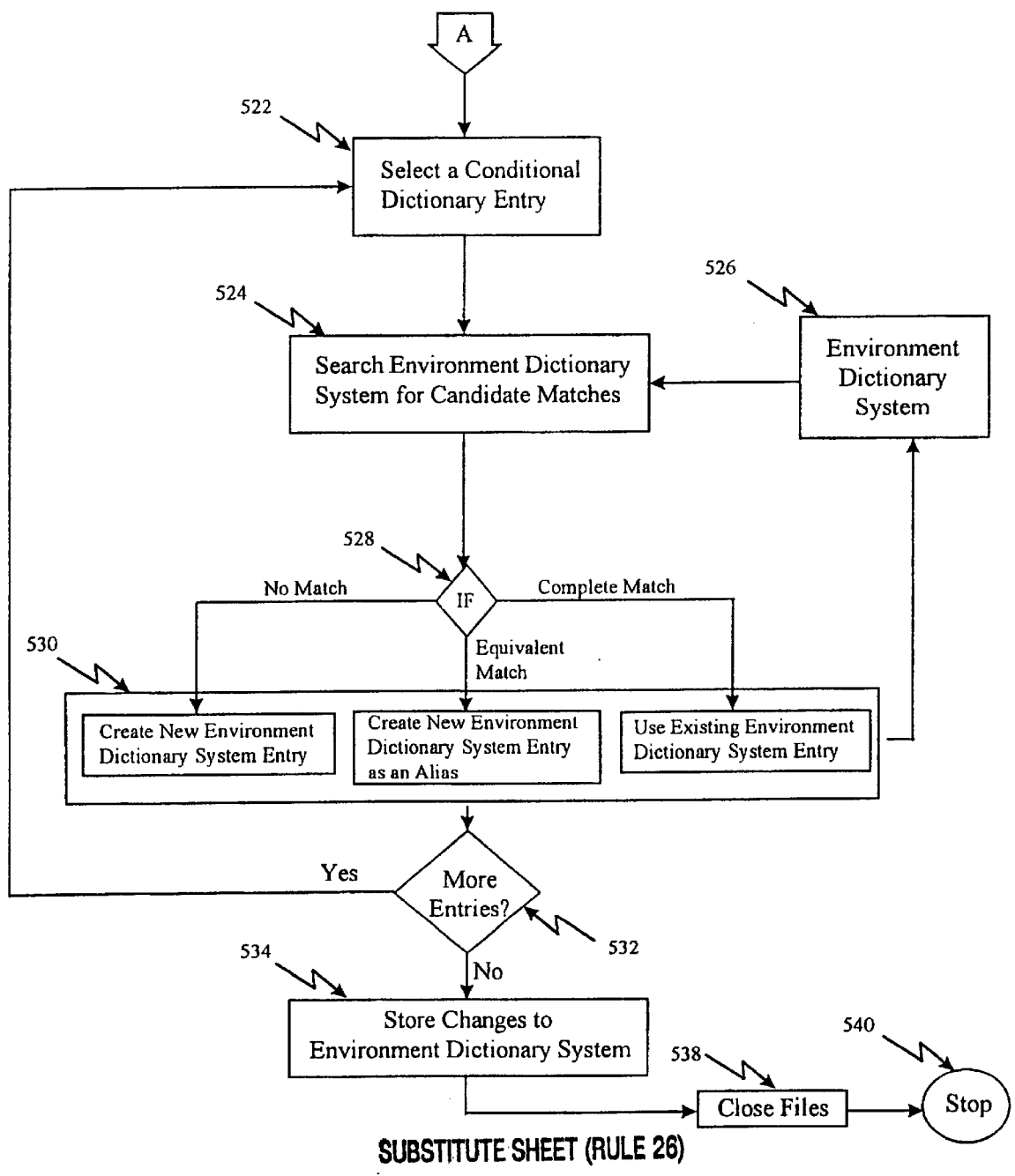
Figure 41:
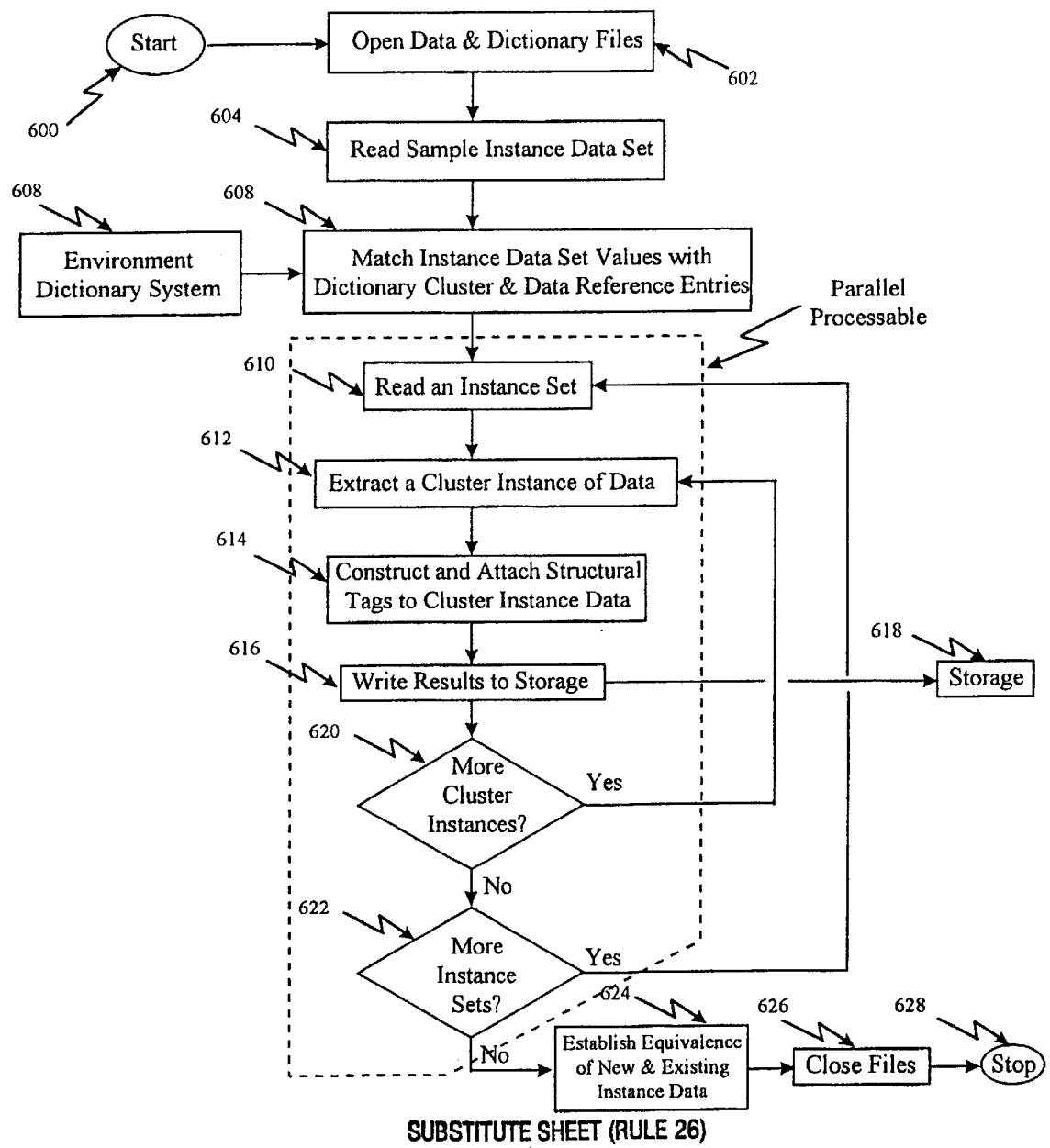
Figure 42:
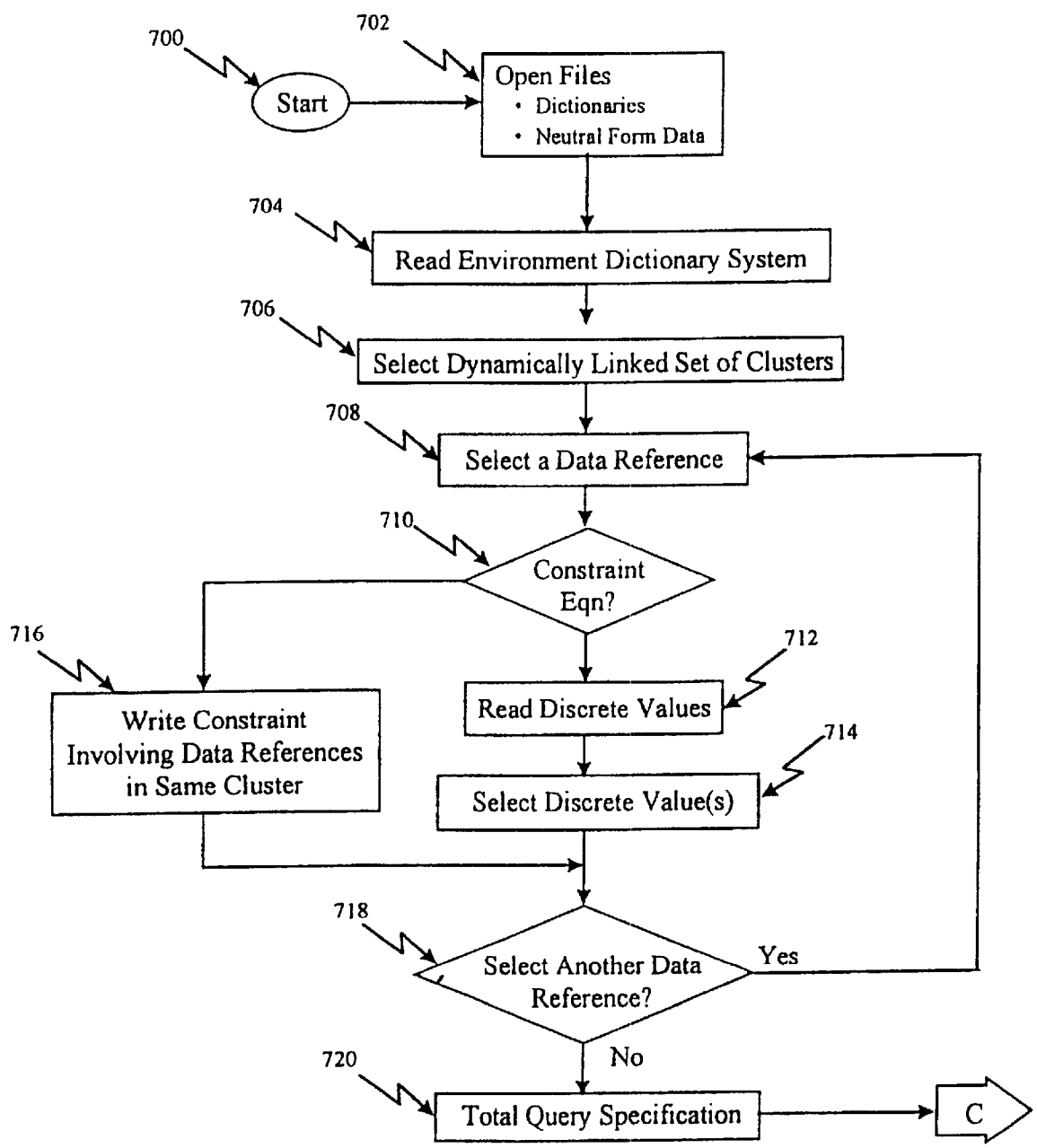

The operator returns control to the computer for execution of instructions to reconcile each of the conditional dictionary data items that were created during data modeling with previously reconciled existing dictionary data items in the environment dictionary system 526 (FIG. 40). The computer first executes instruction 522 by selecting the first conditional dictionary data item. This conditional dictionary item includes a name, and identification number, typically a set of associations and synonyms for the named item, and in certain cases one or more aliases. The listing of these is compiled and checked against all entries in the environment dictionary system 526. At the operator's discretion, matches can be declared by the computer for any degree of overlap between the conditional dictionary entry list and the environment dictionary system entry. Upon return of the list of matches by the computer, the operator must evaluate at step 528 and make a judgment about any candidate matches. The computer provides the operator with a view of the dictionary entry contents of any candidate match.

On the basis of a review of this information, the operator directs the computer during step 530 to: (a) create a new environment dictionary system entry shown as step 530a using the conditional dictionary entry information because there is no matching existing entry in the environment dictionary system; (b) create in step 530b a new environment dictionary system entry as an alias using the conditional dictionary entry information because there is an equivalent existing entry in the environment dictionary system; or (c) in step 530c use the existing environment dictionary system entry that exactly matches the conditional dictionary entry. Once the operator has directed the computer for the disposition of a conditional dictionary entry, the computer determines at step 532 whether or not further conditional dictionary entries remain to be reconciled. If there are, the computer repeats the process described above until no further conditional dictionary entries remain unresolved, at which point the computer in step 534 proceeds to store all changes that have been made to the environment dictionary system, stores the changes to the environment dictionary system, closes the open files 538, and stops at step 540.

At this point, all conditional dictionary entries are recognized by and defined in the environment dictionary system and data based upon the conditional dictionary entries can be loaded. The above procedure is carried out in the same fashion whether the conditional dictionary entries involved are the result of a new data modeling exercise occurring in the current environment or the result of a transfer of neutral form data from another environment, which transfer included the dictionary entries from that environment required to interpret the generalized tags used in the neutral form file.

Data items can be loaded in bulk into an environment once all of the dictionary entries required to define generalized tags for those data items have been created and reconciled with the environment dictionary system into which the data items are to be loaded. Optionally, data items can be inputted manually by and operator. In such case, inputting proceeds by cluster instance or by sub-clusters where they are defined. For the case of bulking loading, control is assigned to the computer 600 by the operator after which the computer proceeds to open the files 602, those containing the data items to be loaded and those containing the environment dictionary system. The computer then reads appropriate entries in these files and, with appropriate input from the operator as outlined earlier in FIG. 28, organizes data items into instance sets, each set with its matching cluster name and ID and each data item in that set with its respective cluster node name and ID. One instance data set is then read by the computer 610. Where an instance data set is composed of more than one cluster, the computer next extracts one cluster instance of information 612. The computer then uses this information to assign and attach structural tags 614 to each data item in the instance cluster. The procedure followed by the computer is that outlined earlier in FIG. 29. Results are written 616 to storage 618. If there are additional cluster instances in the instance data set, the computer repeats steps 612 through 618 until all cluster instances in the instance data set have been tagged and stored.

When the complete instance data set has been tagged and stored, the computer checks 622 to see if there are any further instance data sets. If there are, the computer repeats steps 610 through 622 until all instance data sets have been read, tagged, and stored. When all instance data sets have been tagged and stored, the computer optionally presents the instance data for the user's determination of the equivalence of new and existing data values. The results are then stored and the computer files are either closed or the user proceeds to create a query specification for the retrieval of certain data values.

The computer starts a query specification 700 by opening certain files in step 702 and reads the dictionary system in step 704. The user then selects a dynamically linked set of clusters in step 706 as the scope for his query specification. The operator then specifies to the computer in step 708 which data references from these clusters is to be included in the query specification. In step 710 the operator specifies to the computer which data references are to be constrained by equation, constrained by data value or included only as a reportable in the query result. The prime or distinct data reference sets comprising the dynamic linking are automatically included if they are not among those explicitly specified by the operator. The operator then supplies the necessary constraint equations in step 716 and the correct discrete values in step 714 based upon the computer's reading of the list of existing discretes in step 712. The cycle is repeated in step 718 until all desired data references have been included in the query specification as step 720.

Query specifications can either be applied directly to the data in an environment or stored at step 720 for later application.

Data selection and retrieval from the neutral form file comprising an environment is performed once a query specification has been written. As described earlier in FIGS. 34 and 35, data retrieval proceeds differently depending upon whether the query specification is confined to a single cluster or spans two or more dynamically linked clusters. In the case of a single cluster query specification, the computer reads the first instance data set in the neutral form file at step 722. The computer then compares at step 724 the contents of this instance data set with the query specification, first with regard to data reference and then with regard to the constraint imposed on that data reference. The first time the computer detects a mismatch at step 726, it rejects the instance data set as non-complying 728 and proceeds to check the next instance data set at step 732 until all of the instance data sets in the neutral form file have been examined against the query specification. If the computer does not detect a mismatch at step 726, it saves the instance data set involved as a complying instance data set at 730 and proceeds to check the next instance data set at step 732 until all of the instance data sets in the neutral form file have been examined against the query specification.

Once all complying instance data sets have been determined, they are reported out to the operator as the result of step 734. If no further queries are to be performed and no further processing of the results is to occur, the computer then optionally stores the query result at step 736, closes the open files at step 738 and stops at step 740.

Figure 43:
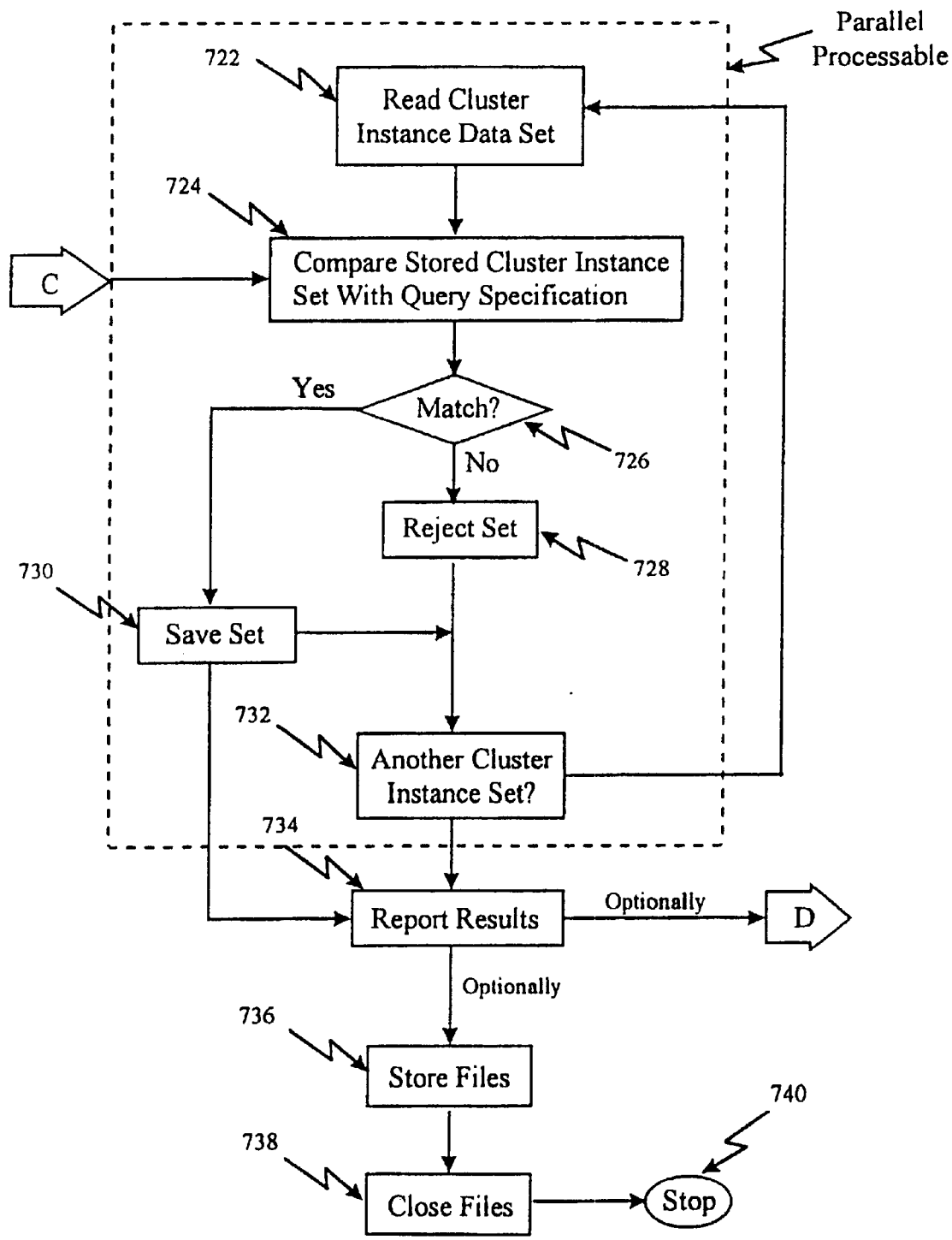
Figure 44:
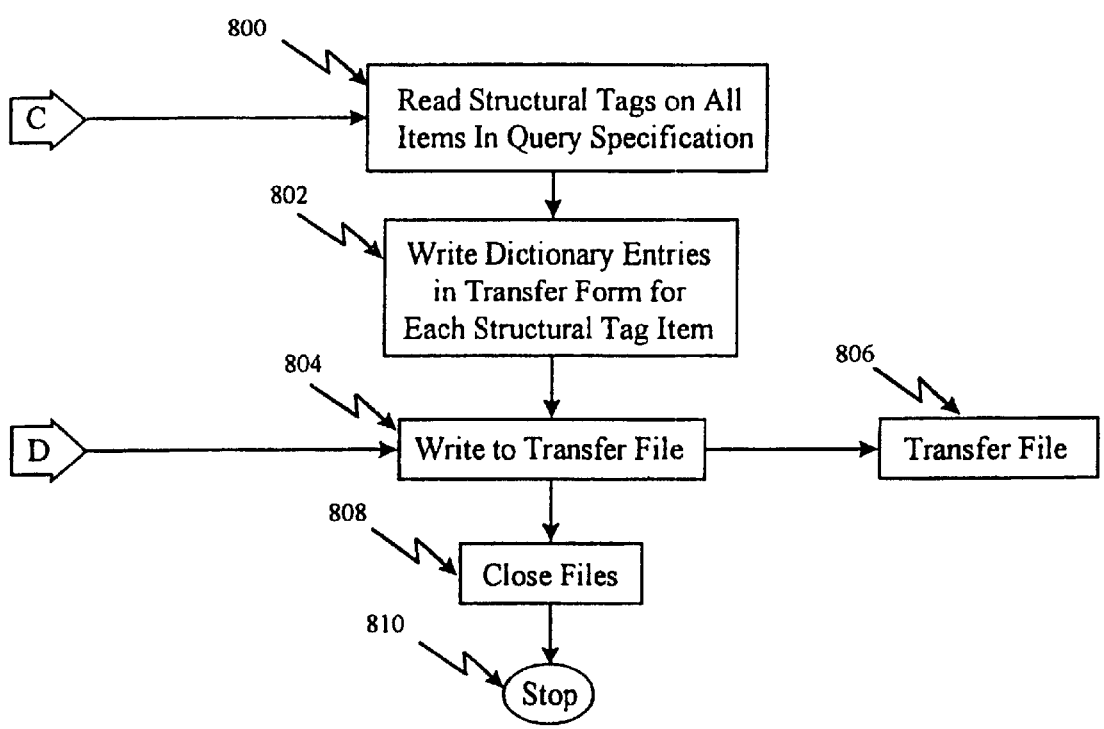

In the case of two clusters or more and as shown in FIG. 35, the computer first processes the clusters separately in the manner shown in the flow chart FIG. 43 and then processes the combination to find those cluster instances which jointly satisfy the query specifications for each of the separate cluster instances as well as that for the data reference set or sets that comprise the dynamic link. There is an opportunity for significant optimization of those searches where the query specification spans two or more clusters. The preferred path of such optimization depends upon the particular application involved. As previously noted, the existing art for optimization largely should be applicable to the present invention. In FIG. 43 dotted lines encompass those steps in the data retrieval process which can be performed in parallel by different microprocessors. Basically all of the computer operations involved in evaluating each instance data set taken from the neutral form file for compliance with a query specification at steps 722 through 732 can be performed in parallel by a collection of microprocessors.

Once a set of complying instance data sets comprised of either individual cluster instances or dynamically linked cluster instances has been retrieved from storage, data transfer can be performed. Assuming that such transfer operation proceeds immediately following the completion of the data retrieval process, the computer is already in operation and the operator merely turns control over to the computer so that the computer reads at step 800 the structural tags on all of the data items comprising the complying instance data sets. The computer then proceeds to assemble and write neutral form file records at step 802, one for each environment dictionary system entry that is required to understand and to interpret the meanings of each distinct element that comprises this set of structural tags. The neutral form involved is that outlined in FIG. 36 and the procedure employed for recording the contents of a dictionary entry are basically those illustrated in FIG. 37. Once all of the dictionary entries have been written into neutral form records, the transfer file is written at step 804 by organizing first the neutral form dictionary records and then the complying neutral form instance data set records consecutively. The resulting file formed at step 806 is now a stand-alone file that contains the complying instance data sets together with all of the information required to understand and interpret this information which is ready for immediate transfer or temporary storage and later transfer. The computer then closes the open files at step 808 and stops at step 810.

9.0 EXAMPLES

9.1 Example 1

Flash drums exist at a switchable number, such as ten (10), different locations in an example-postulated chemical manufacturing plant to partially separate the volatile components in a liquid mixture through sudden de-pressurization. Each flash drum has the basic characteristics summarized in FIG. 45, and the plant collects data on these characteristics on an hourly basis for each of the 10 flash drums.

The method of the present invention organizes this information so that it later can be stored or transferred. In the method of the present invention, information is organized through the division and modeling of the information in the context of one or more instance segments. The modeling presented in FIG. 46 is based upon a view of the flash drum problem as involving 4 separate and distinct instance segments—one for each stream entering or leaving the flash drum and one for the flash drum unit itself. Accordingly, four separate models are presented. Each is constructed consist with the procedures outlined previously in FIG. 12, and involves a single comprehensive cluster comprised of individual data references displayed in logical groups and sub-groups.

Figure 47:
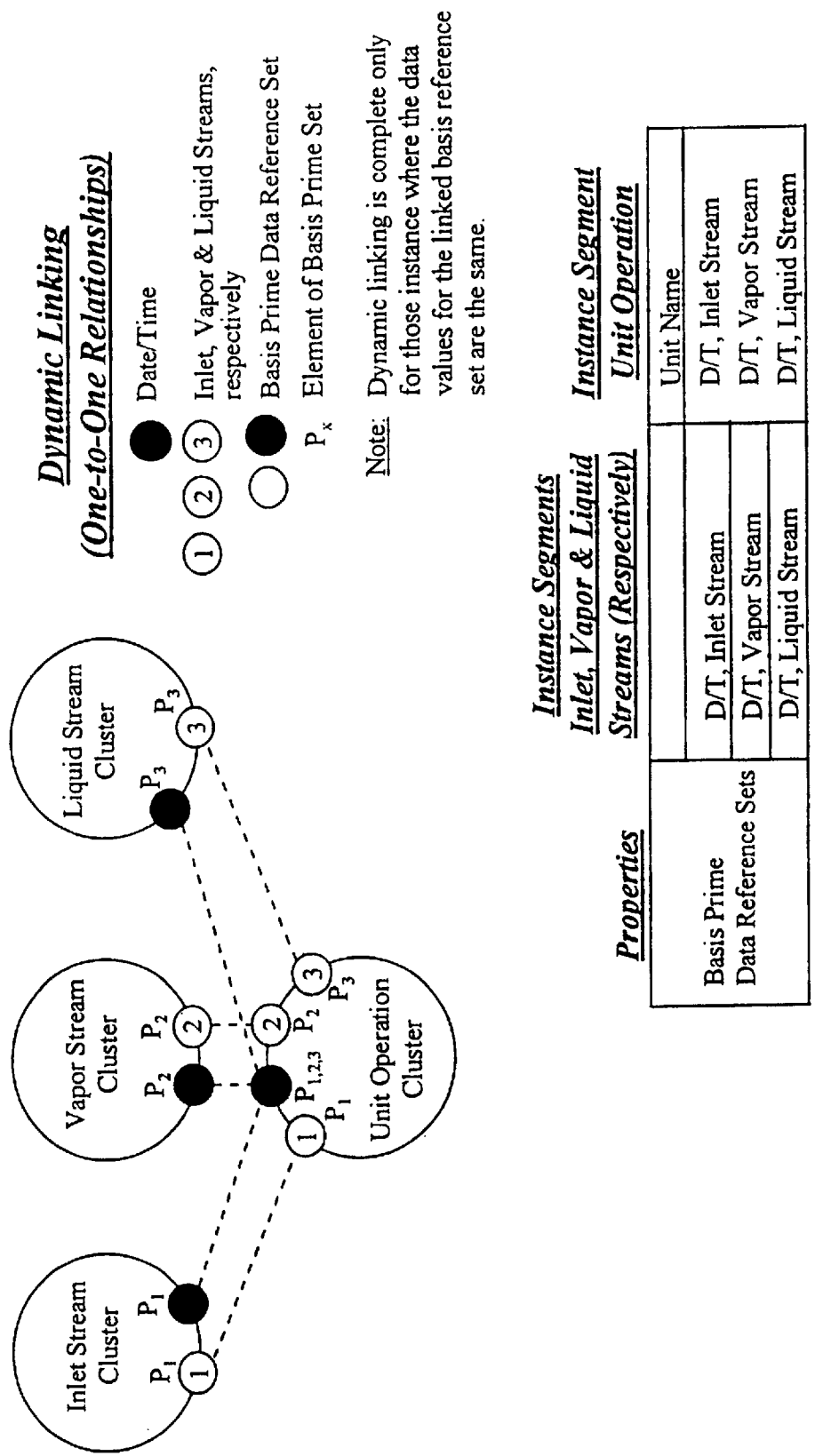

Each of the four defined instance segments stands alone as a set of information composed of instance data sets which characterize a particular flash drum and the streams entering it and leaving it, respectively, on an hourly basis. However, taken as a whole, this set of four instance segments also defines the universe of the instance for the flash drums. Accordingly and by the method of the present invention, the models of the four instance segments comprising this universe of an instance for flash drums must be dynamically linked (Refer to instance segments 2a through 2x in FIG. 4). FIG. 47 displays the technique of dynamic linking which occurs among the models of the particular four instance segments shown in FIG. 46 that make up the universe of the instance for flash drums. Through the power of dynamic linking, it has thus been possible to create smaller separate models which automatically dynamically link to form the larger equivalent model that could have been defined by initially establishing the scope of FIG. 45 as a single instance segment consisting of the flash unit and all input and output streams.

9.2 Example 2

Figure 45:
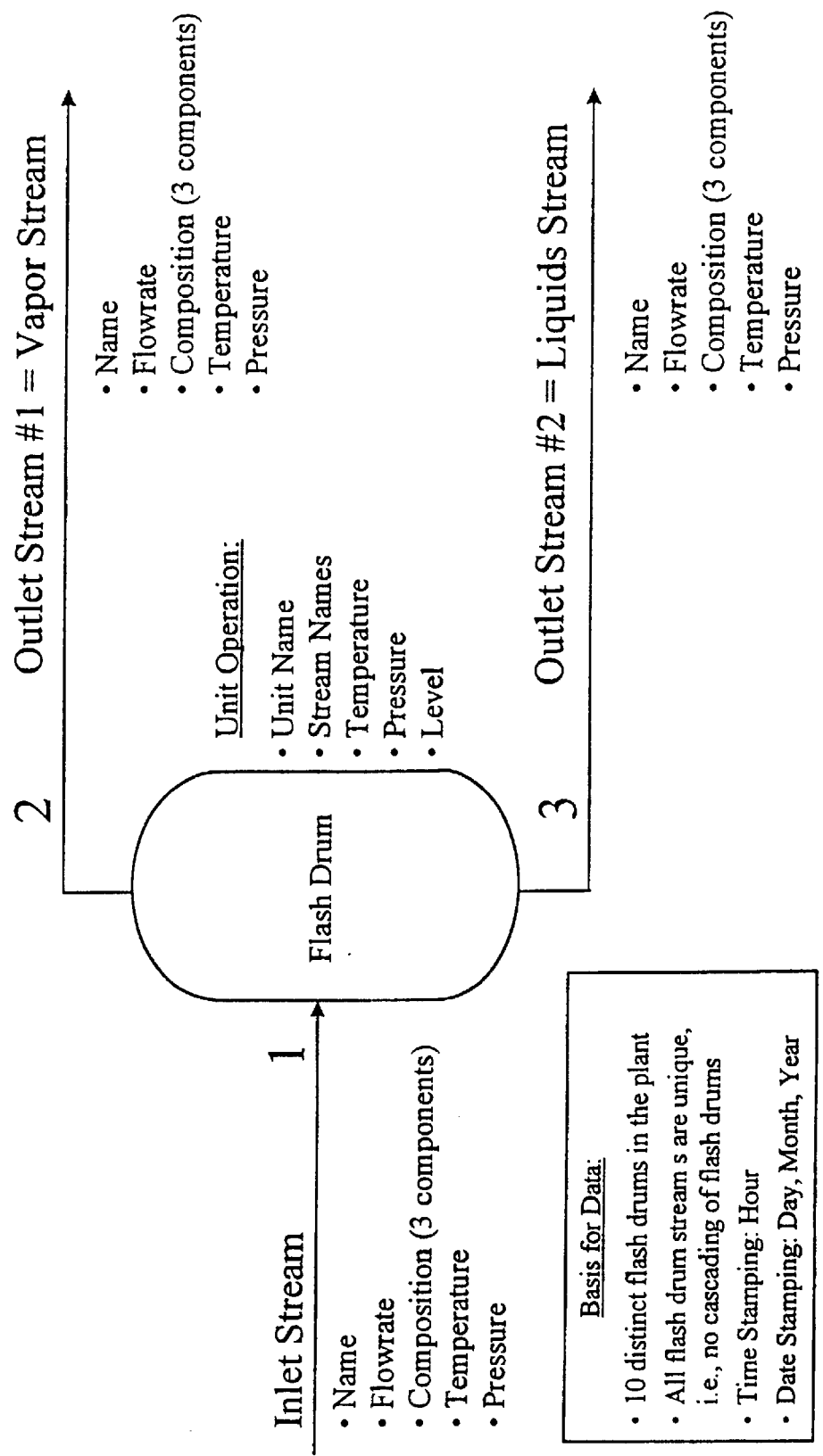

This example illustrates the modeling of the flash drum problem presented in FIG. 45 of example 1 as the universe of the flash drum instance rather than as a series of instance segments that comprise the universe of that instance. FIG. 48 illustrates this model. As before, individual data references spanning the scope of the instance are organized into logical groups and sub-groups within a single comprehensive cluster. This cluster model is equivalent to the set of four separate but dynamically linked cluster models presented previously in FIG. 47.

Figure 49:
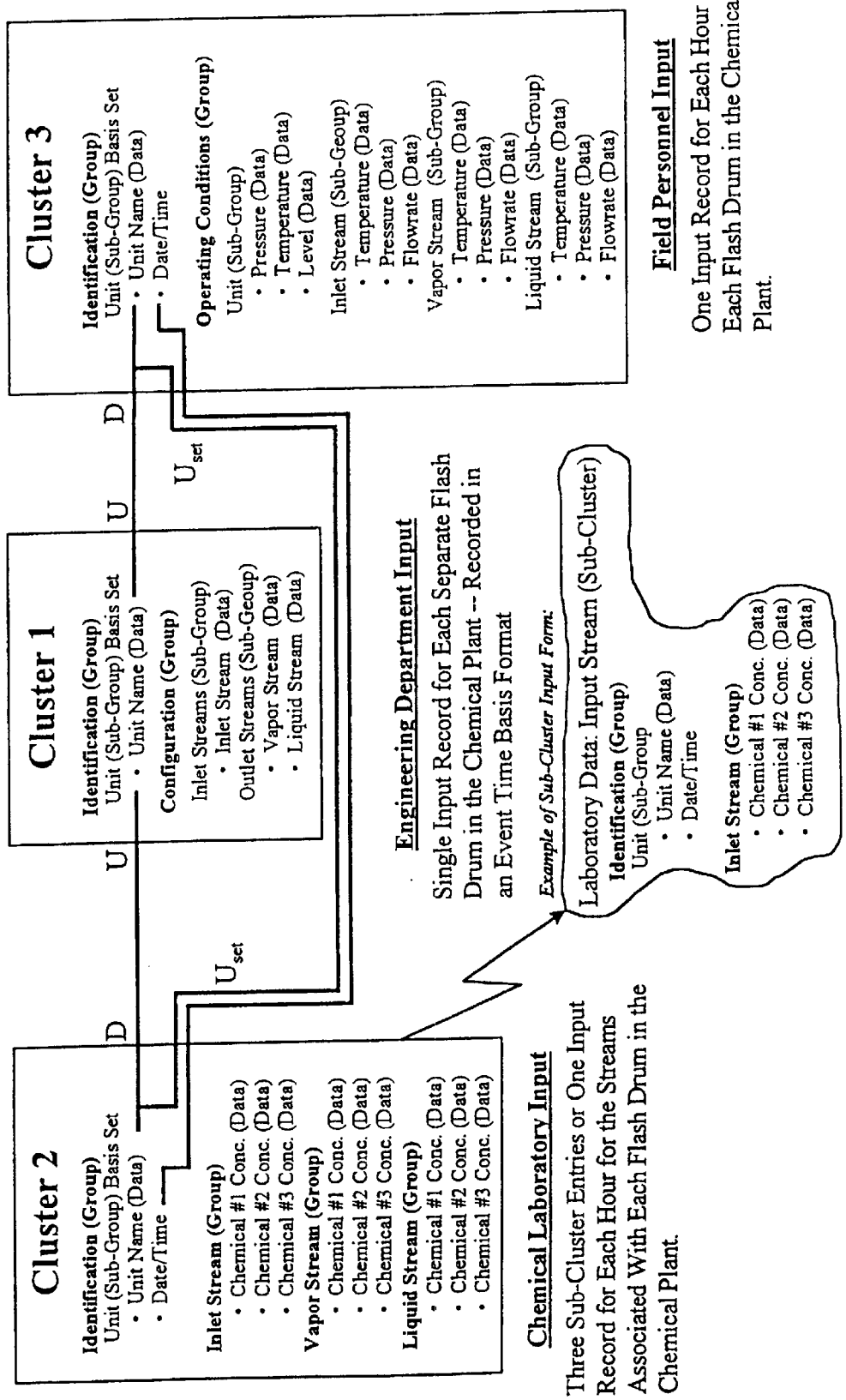

As described in FIG. 12 above, the single cluster in FIG. 48 can be re-constituted as a set of associated clusters to facilitate data loading where there are one-to-many relationships or a user desires to split out certain one-to-one relationships. One such reconstitution is presented in FIG. 49. Cluster 1 contains the characteristics of the flash unit which are invariant with time, i.e., cluster 1 has an event time basis. Accordingly, only one instance data set is necessary for each of the 10 flash drums, a more efficient data loading than is accomplished in the flash drum instance segment model shown previously as column five in FIG. 46. Cluster 2 is a one-to-many cluster that addresses the characteristics of the flash drum and its streams which are time dependent and determined by sample analysis at the chemical laboratory. Cluster 3 is also a one-to-many cluster and it addresses the operating characteristics of the flash drum and its streams which are time dependent and determined by field personnel. Clusters 2 and 3 are dynamically linked through the prime data reference set comprised of the data references Unit Name and Date/Time. This is a one-to-one dynamic link and it exists for those instances of clusters 2 and 3 that share the same values of Unit Name and Date/Time.

Both cluster 2 and cluster 3 can be divided into sub-clusters so that data entry can occur separately for stream and flash unit data. One case of such a sub-cluster is illustrated. Note that one prime data set from the cluster must appear as the same prime data set in each sub-cluster of that cluster. Alternatively, clusters 2 and 3 each could have been reconstituted as additional sets of associated clusters. The associated clusters shown in FIG. 49 were created following the procedures outlined in FIG. 12.

9.3 Example 3

This example illustrates the construction of a pair of dictionary entries for the modeling performed in both examples 1 and 2. The properties of two data references are cited: "pressure" as a characteristic of the flash drum itself and "pressure" as a characteristic of the inlet stream to the flash drum. Although these two data references share the same name and are authored by the same user, their schema are different, reflecting the differences in their overall meaning. Thus taken as a whole, the two data references with composite ID's of $Kid_a Sid_a Lid_a$ and $Kid_a Sid_b Lid_a$ are different as they must be, since, with the exception of the special case of nested data references, no data reference can be used more than once in an instance model. Note that constraints on data values for a data reference are readily included in the dictionary. In the cited example, flash drum pressure cannot exceed the pressure of the inlet stream and the inlet stream pressure cannot be less than the flash drum pressure.

9.4 Example 4

Figure 51:
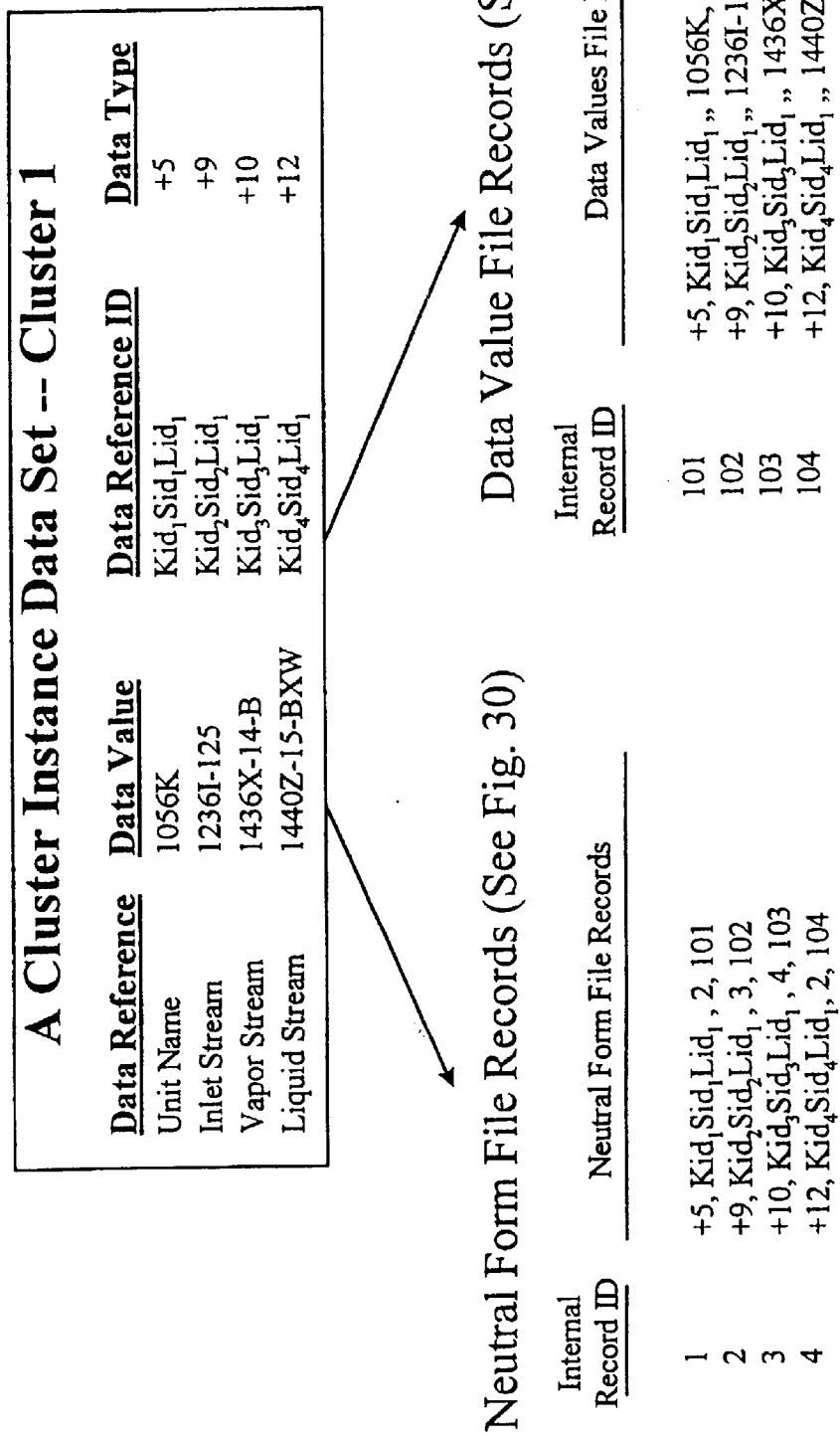

This example illustrates the expression of modeled cluster instance data sets in neutral form. Note that individual data sets for each cluster in a model stand alone and are stored in neutral form without knowledge or connection with the data sets from any other cluster, including those other clusters that may constitute an overall model. FIG. 51 illustrates the construction of one set of neutral form file records for one instance data set of cluster 1, which is one of the three clusters that constitute the model shown previously in FIG. 49. The particular form for the neutral file chosen for this example is that presented in the combination of FIGS. 30 and 33 for the neutral file and its corresponding data values file, respectively. Note that many other approaches to the construction of these files are possible and may be preferred as a function of the particular application involved. However, the approaches chosen here serve to illustrate the basic intent and technique for constructing neutral form files from the combination of the cluster model and its corresponding cluster instance data sets.

The foregoing disclosure and description of the invention are illustrative and explanatory thereof, and various changes in the details of the illustrated apparatus and construction and method of operation may be made without departing from the spirit of the invention.

We claim:

1. A method of modeling a set of information for storage in neutral form in a computer based environment, comprising the steps of:
   a) modeling the set of information into instance data sets, each composed of an instance cluster comprised of data instance nodes, each data instance node in an instance cluster containing an assigned distinguishing structural tag comprising:
      (1) a data reference
      (2) a data type
      (3) a data organization; and
   b) each structural tag having defined components for each data value in each instance cluster.

2. The method of claim 1, further including the step of:
   storing in the computer the assigned distinguishing structural tag for each of the data instance nodes.

3. The method of claim 1, wherein the data instance nodes in the cluster are organized into groups and subgroups for display purposes.

4. The method of claim 1, further including the steps of:
   a) dividing the data instance nodes into a plurality of sub-clusters; and
   b) designating as the basis a prime/distinct (P/D) data reference set of a cluster to appear in any data entry form for any sub-cluster that does not naturally contain it;
   wherein data entry occurs separately at a sub-cluster level without loss of relationship to its proper instance cluster.

5. The method of claim 1 further including the steps of:
   a) forming a new cluster and assigning it a name;
   b) identifying certain nodes within the existing cluster and moving them to the new cluster;
   c) excluding those members of the basis prime/distinct (P/D) data reference set during said step of identifying data instance nodes;
   d) copying the nodes of the excluded basis prime/distinct (P/D) data reference set in the existing cluster into the new cluster; and
   e) changing the designation of the copied prime/distinct (P/D) data reference set in the new cluster to the distinct form of the basis prime/distinct (P/D) data reference set if it had previously been acting as the prime form of basis prime/distinct (P/D) data reference set;
   wherein data entry occurs multiple times in the new cluster as separate cluster instance data sets without redundant data entry in the remaining portion of the existing cluster.

6. The method of claim 5, wherein said step of forming and assigning a new cluster is done on an event time basis.

7. The method of claim 5, further including the step of repeating such steps of claim 5 when the newly formed cluster itself contains a one-to-many relationship.

8. The method of claim 1, wherein existing components of structural tag elements stored in the environment are used wherever their definitions and properties match those required for a new data value.

9. The method of claim 1, wherein the definition of a new or an existing component of a structural tag element which is stored in the environment includes an indication of its equivalency to another existing component of the structural tag element stored in the environment.

10. The method of claim 1 wherein each data reference in the set of information has a granularity which does not exceed that of the basis prime/distinct (P/D) data reference set.

11. A memory storing a modeled set of information in neutral form for processing in a computer, comprising:
   a) the set of information being modeled into instance data sets, each composed of an instance cluster comprised of data instance nodes, each data instance node in an instance cluster containing an assigned distinguishing structural tag comprising:
      (1) a data reference
      (2) a data type
      (3) a data organization; and
   b) each structural tag having defined components for each data value in each instance cluster.

12. A data processing system, comprising:
   a) a memory;
   b) a central processing unit executing an application program on an organized set of information stored as a database in said memory;
   c) said database stored in neutral form in said memory as a set of information being modeled into instance data sets, each composed of an instance cluster comprised of data instance nodes, each data instance node in an instance cluster containing an assigned distinguishing structural tag comprising:
      (1) a data reference
      (2) a data type
      (3) a data organization; and
   d) each structural tag having defined components for each data value in each instance cluster.

13. A method of identifying a pool of data values formed from dynamic liking of two different instance clusters stored in a computer memory, comprising the steps of:
   a) selecting a cluster;
   b) determining the collection of prime/distinct data reference sets in the selected cluster;
   c) identifying another cluster which is on the same time basis and contains the same prime/distinct data reference set;
   d) for such another cluster, identifying those instance clusters in which the set of data values for the linking prime/distinct data reference set matches that of a selected cluster instance;
   e) for each identified instance cluster, combining the set of data values for that instance cluster with the matching set from the selected cluster to form a pool;
   f) removing from the pool any data value that is not part of the instance segment of the universe of the instance defined by the prime/distinct data set through which the dynamic link is occurring; and
   g) removing from the pool any respective instance cluster data sets for which the data values do not match any other prime/distinct data value sets that are common to both instance clusters.

14. The method of claim 13, further including the step of:
   repeating said step of identifying for other clusters in the computer memory.

15. The method of claim 13, further including the step of:
   repeating said step of identifying for other matching prime/distinct data reference sets.

16. The method of claim 13 wherein data values to be removed from the pool are those having a granularity lower than that of the linking prime/distinct data value set that is the basis for the pool.

17. The method of claim 13 wherein the instance segment defined by the linking prime/distinct data value set is a nested instance segment and further that a particular instance data value that is exclusive to the instance segment within which the nest exists is to be including in the pool, and further comprising the steps of:
   a) adding the data values that are exclusive to the instance segment within which the nesting is occurring; and
   b) removing from the pool any respective instance cluster data sets now so expanded for which there in not a match with the specified exclusive instance data value.

* * * * *